(12) United States Patent
Bello et al.

(10) Patent No.: US 11,876,693 B1
(45) Date of Patent: Jan. 16, 2024

(54) SYSTEM AND METHOD OF APPLICATION DISCOVERY USING COMMUNICATION PORT SIGNATURE IN COMPUTER NETWORKS

(71) Applicant: Virtual Instruments Worldwide, Inc., Palo Alto, CA (US)

(72) Inventors: Michael Bello, Mountain View, CA (US); Elizaveta Tavastcherna, San Jose, CA (US)

(73) Assignee: Virtual Instruments Worldwide, Inc., Palo Alto, CA (US)

( * ) Notice: Subject to any disclaimer, the term of this patent is extended or adjusted under 35 U.S.C. 154(b) by 0 days.

(21) Appl. No.: 18/153,296

(22) Filed: Jan. 11, 2023

Related U.S. Application Data

(60) Provisional application No. 63/476,162, filed on Dec. 19, 2022.

(51) Int. Cl.
*H04L 43/065* (2022.01)
*H04L 43/16* (2022.01)
*H04L 43/062* (2022.01)

(52) U.S. Cl.
CPC .......... *H04L 43/065* (2013.01); *H04L 43/062* (2013.01); *H04L 43/16* (2013.01)

(58) Field of Classification Search
CPC ..... H04L 43/065; H04L 43/062; H04L 43/16; H04L 67/51; H04L 43/026; H04L 47/2475; H04L 47/2483
See application file for complete search history.

(56) References Cited

U.S. PATENT DOCUMENTS

| | | | | |
|---|---|---|---|---|
| 11,394,770 B1* | 7/2022 | Bello | .................. | H04L 67/1097 |
| 11,647,073 B1* | 5/2023 | Bello | .................. | H04L 41/0803 709/223 |
| 2010/0250733 A1* | 9/2010 | Turanyi | .................. | H04L 47/10 709/224 |
| 2010/0284300 A1* | 11/2010 | Deshpande | ........... | H04L 43/026 370/253 |
| 2011/0040706 A1* | 2/2011 | Sen | ........................ | G06N 20/00 706/12 |
| 2016/0080236 A1* | 3/2016 | Nikolaev | .............. | H04L 43/026 709/224 |
| 2017/0053214 A1* | 2/2017 | Bellala | ................ | H04L 63/0227 |

(Continued)

*Primary Examiner* — Jerry B Dennison
(74) *Attorney, Agent, or Firm* — Ahmann Kloke LLP

(57) ABSTRACT

A method comprising identifying a plurality of compute resources of an enterprise network, the compute resources including ports associated with each compute resource, each port being in communication with entities within and outside the enterprise network, for each identified compute resources, identifying a subset of ports associated with a particular compute resource based on a number of connections and a port number of each port, and the ports of the subset of ports being an N most frequently used ports of a particular compute resource of the plurality of compute resources, determining a port signature associated with the particular compute resource based on the identified subset of ports, and determining one or more applications of the enterprise network being executed by the particular compute resource based on the port signature associated with the particular compute resource and providing a report of the one or more applications of the enterprise network.

20 Claims, 46 Drawing Sheets

(56) References Cited

U.S. PATENT DOCUMENTS

| | | | |
|---|---|---|---|
| 2019/0207860 A1* | 7/2019 | York | G06F 9/45558 |
| 2019/0279113 A1* | 9/2019 | Liu | G06N 20/00 |
| 2021/0203547 A1* | 7/2021 | Haggart | H04L 67/1097 |
| 2022/0239578 A1* | 7/2022 | Raleigh | H04L 43/026 |
| 2023/0198906 A1* | 6/2023 | Kamalakannan | H04L 47/125 370/230.1 |

* cited by examiner

| | alertsitenode | auto | cnas | com | corrserv | dc | design | dmzmgt | fedex | file |
|---|---|---|---|---|---|---|---|---|---|---|
| alertsitenode | 1.000000 | 0.352941 | 0.117647 | 0125000 | 0.190476 | 0.133333 | 0.210528 | 0.105263 | 0.333333 | 0.235294 |
| auto | 0.352941 | 1.000000 | 0.250000 | 0.285714 | 0.166667 | 0.000000 | 0.000000 | 0.200000 | 0.000000 | 0.000000 |
| cnas | 0.235294 | 0.250000 | 1.000000 | 0.285714 | 0.333333 | 0.333333 | 0.200000 | 0.000000 | 0.000000 | 0.000000 |
| com | 0.125000 | 0.285714 | 0.285714 | 1.000000 | 0.363636 | 0.400000 | 0.000000 | 0.222222 | 0.000000 | 0.000000 |
| corrserv | 0.190476 | 0.166667 | 0.333333 | 0.363636 | 1.000000 | 0.200000 | 0.142857 | 0.000000 | 0.153846 | 0.166667 |
| dc | 0.133333 | 0.000000 | 0.333333 | 0.400000 | 0.200000 | 1.000000 | 0.250000 | 0.250000 | 0.285714 | 0.000000 |
| design | 0.421053 | 0.000000 | 0.200000 | 0.000000 | 0.142857 | 0.250000 | 1.000000 | 0.333333 | 0363636 | 0.200000 |
| dmzmgt | 0.105263 | 0.200000 | 0.000000 | 0.222222 | 0.000000 | 0.250000 | 0.333333 | 1.000000 | 0.181818 | 0.000000 |
| fedex | 0.333333 | 0.000000 | 0.000000 | 0.000000 | 0.153846 | 0.285714 | 0.363636 | 0.181818 | 1.000000 | 0.444444 |
| file | 0.235294 | 0.000000 | 0.000000 | 0.000000 | 0.166667 | 0.000000 | 0.200000 | 0.000000 | 0.444444 | 1.000000 |

FIG. 5

| VMs Traffic | Total Mb/s | VM Incoming Mb/s | VM outgoing Mb/s |
|---|---|---|---|
| vm to external | 1.26 | 1.16 | 0.1 |
| vm to internal | 952.91 | 187.89 | 765.02 |
| vm to vm | 8.56 | 8.56 | 8.56 |
| Total Traffic to VMs | 962.73 | 197.61 | 773.68 |

| | A | B | C | D |
|---|---|---|---|---|
| 1 | DateTime | VI-SVCS-VW-VM007-5 | DateTime | |
| 2 | | | | |
| 3 | 11/16/2017 12:00 AM PST | 69.781 | 11/16/2017 12:00 AM PST | 103.4496 |
| 4 | | | | |
| 5 | 11/16/2017 12:05 AM PST | 6.5768 | 11/16/2017 12:05 AM PST | 0.1698 |
| 6 | | | | |
| 7 | 11/16/2017 12:10 AM PST | 23.9348 | 11/16/2017 12:10 AM PST | 38.5 |
| 8 | | | | |
| 9 | 11/16/2017 12:15 AM PST | 21.9148 | 11/16/2017 12:15 AM PST | 5.0194 |
| 10 | | | | |
| 11 | 11/16/2017 12:20 AM PST | 100.513 | 11/16/2017 12:20 AM PST | 36.5062 |
| 12 | | | | |
| 13 | 11/16/2017 12:25 AM PST | 75.076 | 11/16/2017 12:25 AM PST | 95.7002 |
| 14 | | | | |
| 15 | 11/16/2017 12:30 AM PST | 2.0136 | 11/16/2017 12:30 AM PST | 53.1338 |
| 16 | | | | |
| 17 | 11/16/2017 12:35 AM PST | 3.3878 | 11/16/2017 12:35 AM PST | 0.122 |
| 18 | | | | |
| 19 | 11/16/2017 12:40 AM PST | 1.0696 | 11/16/2017 12:40 AM PST | 0 |

FIG. 21

| Application | Virtual Machines | Azure Instance | Azure Disk Type | Instance Monthly Cost | App Monthly Cost |
|---|---|---|---|---|---|
| Analysis | VM014-523-2TB | L8s | P30 | $449.28 | $725.76 |
|  | VM016-523-1TB | D4sv3 | P15 | $276.48 |  |
| Management | VM001-523-64gig | F16v2 | P10 | $937.44 | $937.44 |
| Automation | VM027-522-HF1 | L4s | P40 | $224.64 | $224.64 |
| WinTel1 | Del-030318 | D2sv3 | P20 | $69.12 | $69.12 |
| WinTel16 | Del-030318 | D2sv3 | P20 | $69.12 | $69.12 |
| Grand Total |  |  |  |  | $25,407 |

FIG. 23

Estimated Monthly Cost for One CSP Table 2600

| Application | Virtual Machines | Azure Instance | Azure Disk Type | Instance Monthly Cost | App Monthly Cost |
|---|---|---|---|---|---|
| Analysis | VM014-523-2TB | L8s | P30 | $449.28 | $725.76 |
| | VM016-523-1TB | D4sv3 | P15 | $276.48 | |
| Management | VM001-523-64gig | F16v2 | P10 | $937.44 | $937.44 |
| Automation | VM027-522-HF1 | L4s | P40 | $224.64 | $224.64 |
| WinTel1 | Del-030318 | D2sv3 | P20 | $69.12 | $69.12 |
| ... | | | | | |
| WinTel16 | Del-030318 | D2sv3 | P20 | $69.12 | $69.12 |
| Grand Total | | | | | $25,407 |

FIG. 26

Port Frequency Distribution Table 3100

| Entity | Port | Protocol | Count | IP Address | |
|---|---|---|---|---|---|
| VM-123 | 53 | UDP | 2741419 | IPA | ← ROW 3110 |
| VM-123 | 80 | TCP | 4512 | IPB | ← ROW 3130 |
| VM-123 | 161 | UDP | 1947771 | IPC | |
| SERV-17 | 243 | TCP | 4512 | IPD | ← ROW 3140 |
| SERV-17 | 443 | UDP | 5412 | IPE | ← ROW 3150 |
| HOST-45 | 5353 | UDP | 754 | IPF | ← ROW 3120 |

Similarity Matrix 3900

| | host_1 | host_2 | host_3 | host_4 | host_5 | host_6 | host_7 | host_8 |
|---|---|---|---|---|---|---|---|---|
| host_1 | 1 | | | | | | | |
| host_2 | 0.001489 | 1 | | | | | | |
| host_3 | 0.948292 | 0.000455 | 1 | | | | | |
| host_4 | 0 | 0 | 0 | 1 | | | | |
| host_5 | 0.993918 | 0.001758 | 0.976951 | 0 | 1 | | | |
| host_6 | 0.000158 | 0.88821 | 0.000109 | 0 | 0.000407 | 1 | | |
| host_7 | 0.000366 | 0.037389 | 0.000224 | 0 | 0 | 1 | 1 | |
| host_8 | 0.699511 | 0.008361 | 0.729497 | 0 | 0.71769 | 0 | 0.004107 | 1 |

3910, 3920, 3930, 3940, 3950

Port-Application Interface
4000

| Application | Ports | Protocol | Optional Ports | Optional Count | Optional |
|---|---|---|---|---|---|
| Autodesk Network License Manager | 27000, 2080 | tcp | | | FLEXlm |
| Bit9 | 41002 | tcp | | | |
| Citrix | 1494 | tcp | | 2598 | |
| Citrix | 1494 | udp | | 2598 | |
| Citrix License Server | 27000, 7279 | tcp | | | FLEXlm |
| Citrix Target Device | | udp | 6901, 6902, 6905 | 1 | |
| DNS Server | 53 | tcp | | | |
| Domain Controller | 389, 88 | tcp | | 1 | DNS Server |
| Enterprise Vault | 5114 | tcp | | | |
| FLEXlm | | tcp | 27000-27009 | 1 | |
| MS SQL DB Engine | 1433 | tcp | 4022,1434 | 1 | |
| MS SQL DB Engine | | udp | 1434 | | |
| NetBackup | 1556 | tcp | | | |
| Oracle | | tcp | 1521,1630 | 1 | |
| Panorama/Palo Alto | 3978 | tcp | | | |
| SIP Phone | 5060 | tcp | | | |
| Skype | 5061 | tcp | 5062,5060 | 2 | SIP Phone |
| Skype Chat | 5041 | tcp | | | |
| SolarWinds | 17777 | tcp | 17776,17778 17780,17790,17791,1 | 2 | |

FIG. 40

SYSTEM AND METHOD OF APPLICATION DISCOVERY USING COMMUNICATION PORT SIGNATURE IN COMPUTER NETWORKS

CROSS-REFERENCE TO RELATED APPLICATIONS

This application claims priority to U.S. Provisional Patent Application No. 63/476,162, filed on Dec. 19, 2022, and entitled "Method of Host Grouping and Application Discovery in Computer Networks by Using Communication Port Signature," which is incorporated herein by reference in its entirety.

FIELD OF THE INVENTION(S)

Embodiments of the present invention(s) generally relate to application discovery system for enterprise systems and, in particular, using communication port signatures to discover enterprise system applications.

BACKGROUND

The complexity of enterprise networks has increased to a point where even information technology (IT) administrators may not have a clear picture of the network utilization of the enterprise network. Enterprise networks are increasingly moving towards a combination of on-premise and cloud-based infrastructure or making the ability to determine computing and storage resources associated with the business-related application more difficult.

IT environments are becoming very dynamic, with new applications being installed, compute resources to existing applications being added, hardware and network being updated, and storage and processing being migrated to cloud-based infrastructure. In such an environment, even the most disciplined and thorough enterprise system can hardly keep up with documenting all the changes.

Hosts with similar network connections are more likely to execute the same enterprise application. Grouping compute resources by application enables efficient management of compute resources as it links compute resources directly to the respective business purpose(s) of these resources. Criticality, business owners, and the like may be subsequently determined based on business purpose(s). Application grouping becomes especially important in case of migration of the compute and network resources.

A port is a virtual point where network connections of a network start and end and data are exchanged between programs and services of the network. Ports are software-based and managed by a computer's operating system. Each port may be associated with a specific process or service. A port may be identified for each transport protocol. Two examples of transport protocols include Transmission Control Protocol (TCP) and User Datagram Protocol (UDP). Each port is associated with an internet protocol (IP) address.

Network-based services may include programs running on a computing device that other computers on the network can access. Service ports identify network communication or connections that are being sent or received by a particular port. Service ports may be assigned numerical identifiers. Service port numbers range from 0 to 65535. Port numbers in the range 1 to 1023 are coordinated by the Internet Assigned Numbers Authority (IANA).

Higher number ports, with port numbers in the range of 1024 to 65535, may be dynamically assigned to a client port end of a network connection. The combination of a client port and server port number pair, their respective internet protocol (IP) host address, and the transport protocol is used uniquely to identify the network connection.

SUMMARY

A system comprising at least one processor and memory including executable instructions that are executable by the at least one processor to identify a plurality of compute resources of an enterprise network, each of the plurality of compute resources including a plurality of ports associated with each compute resource, each of the plurality of ports being in communication with entities within the enterprise network and outside the enterprise network, for each of the identified plurality of compute resources identify a subset of ports of the plurality of ports associated with a particular compute resource, the subset of ports being identified based on a number of connections of each port of the subset of ports and a port number of each port of the subset of ports, and the ports of the subset of ports being an N most frequently used ports of a particular compute resource of the plurality of compute resources, determine a port signature associated with the particular compute resource based on the identified subset of ports, and determine one or more applications of the enterprise network being executed by the particular compute resource based on the port signature associated with the particular compute resource, and provide a report of the one or more applications of the enterprise network.

In some embodiments, the executable instructions that are executable by the at least one processor to receive network traffic data to identify at least some of the plurality of compute resources of the enterprise network, the network traffic data identifying communication between entities of the enterprise network.

In various embodiments, the network traffic data is received from a network traffic monitoring platform, the network traffic monitoring platform being in communication with the enterprise network. In one example, one or more applications of the enterprise network is determined by comparing the port signature associated with the particular compute resource with port signatures of known applications. In some embodiments, the number of connections of each port of the subset of ports is greater than a predetermined connection threshold. In one example, each port of the subset of ports has a port number in the range 1 to 49151.

In one example, one or more applications of the enterprise network are determined using a cosine similarity, where the cosine similarity is applied to the port signature of two of the plurality of compute resources of the enterprise network to group similar compute resources based on distance. In various embodiments, the similar compute resources are determined using a similarity matrix that indicates, for each host, a result of the cosine similarity with another host. In another example, one or more applications of the enterprise network are determined using a Jensen-Shannon divergence. In some embodiments, one or more applications of the enterprise network are determined by comparing the port signature associated with the particular compute resource with port signatures of known applications.

An example computer readable medium including instructions, the instructions being executable by a processor to perform a method, the method comprising: identifying a plurality of compute resources of an enterprise network, each of the plurality of compute resources including a plurality of ports associated with each compute resource, each of the plurality of ports being in communication with entities within the enterprise network and outside the enterprise network, for each of the identified plurality of compute resources: identifying a subset of ports of the plurality of ports associated with a particular compute resource, the subset of ports being identified based on a number of connections of each port of the subset of ports and a port number of each port of the subset of ports, and the ports of the subset of ports being an N most frequently used ports of a particular compute resource of the plurality of compute resources, determining a port signature associated with the particular compute resource based on the identified subset of ports, and determining one or more applications of the enterprise network being executed by the particular compute resource based on the port signature associated with the particular compute resource, and providing a report of the one or more applications of the enterprise network.

An example method comprising identifying a plurality of compute resources of an enterprise network, each of the plurality of compute resources including a plurality of ports associated with each compute resource, each of the plurality of ports being in communication with entities within the enterprise network and outside the enterprise network, for each of the identified plurality of compute resources: identifying a subset of ports of the plurality of ports associated with a particular compute resource, the subset of ports being identified based on a number of connections of each port of the subset of ports and a port number of each port of the subset of ports, and the ports of the subset of ports being an N most frequently used ports of a particular compute resource of the plurality of compute resources, determining a port signature associated with the particular compute resource based on the identified subset of ports, and determining one or more applications of the enterprise network being executed by the particular compute resource based on the port signature associated with the particular compute resource, and providing a report of the one or more applications of the enterprise network.

BRIEF DESCRIPTION OF THE DRAWINGS

FIG. 5 depicts a matrix with organized distance values as an example in some embodiments.

FIG. 21 is a table comprising temporal data capturing utilization levels of an example workload according to some embodiments.

FIG. 23 is a chart depicting cloud configuration and the cost of example applications of the enterprise network according to some embodiments.

FIG. 26 depicts an example output of the CMR playback phase according to some embodiments.

FIG. 31 depicts an example port frequency distribution table for an entity of the enterprise network according to some embodiments.

FIG. 39 depicts a table of a similarity matrix according to some embodiments.

FIG. 40 depicts an example interface of application-port registrations according to some embodiments.

DETAILED DESCRIPTION

Figure 1:
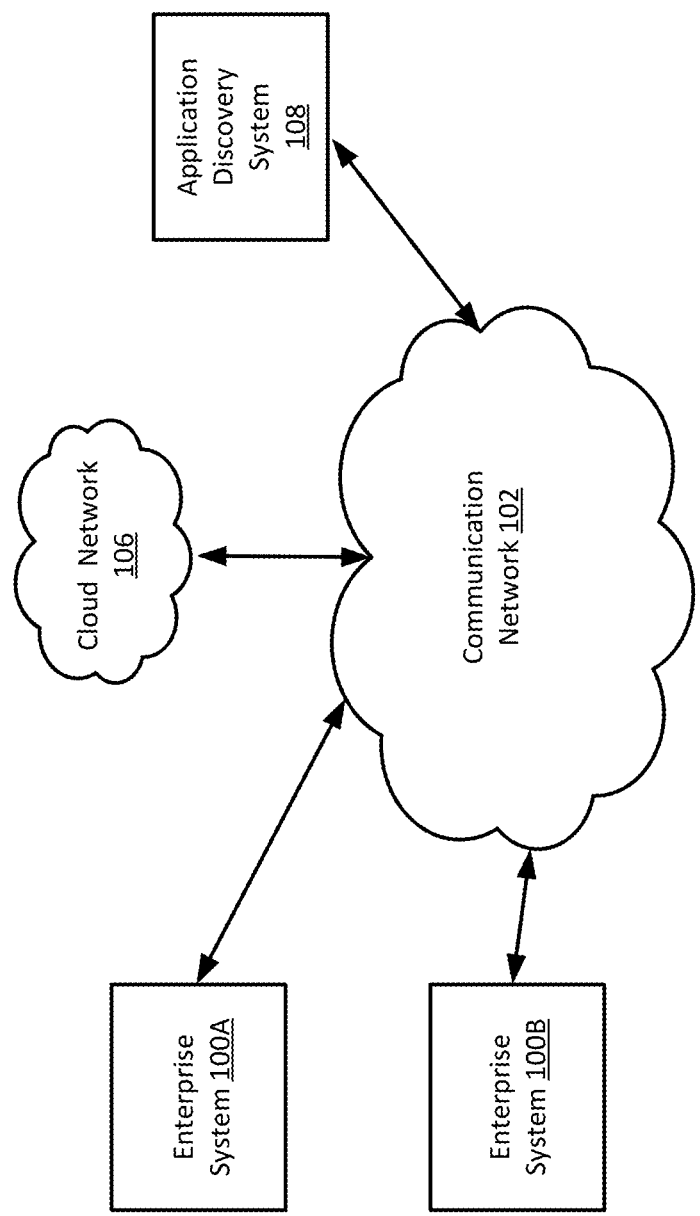
FIG. 1 is an example environment in some embodiments.

Grouping compute resources enable efficient management. Grouping compute resources may link the resources directly to the business purpose of these resources. Criticality, business owners, and the like for the compute resources may be subsequently determined based on business purpose(s).

Application grouping may enable efficient resource management and identification of network problems and/or may also become important in the case of migration of the compute and network resources (e.g., migration of all or some resources to a cloud implementation and/or local implementation). Such migrations might include physical relocation of the compute resources between data centers, transition to a new distributed environment, or migration to a public or private cloud.

Although useful, applications may be defined in the context of compute resources in a data center. The process for identifying applications may be different from customer to customer based on customer needs, business, and characterizations. In practice, the application grouping may be supported by management tools, provided manually by customers, or not supported at all. In the latter case it is highly desirable to provide a method for automatic discovery and grouping of the compute resources that customers can identify as applications.

It may be appreciated that enterprise IT professionals may encode purposes of compute resources or applications these resources serve in the hostnames of these resources. In many cases, it is possible to guess the application (e.g., guess application names) and form groups of the resources based on the hostnames.

For example, consider a list of compute resources (VMs or hosts) with host names formed as follows:

Vm1_xyz_web_dev_001
Vm2_xyz_web_dev_002
Vm3_xyz_app_prod_001
Vm1_xyz_web_prod_001
Vm2_xyz_sql_dev_001
Vm1_xyz_sql_prod_001
Vm1_uvw_web_dev_001
Vm2_uvw_web_dev_002
Vm1_uvw_web_prod_001
Vm1_uvw_sql_dev_001
Vm1_uvw_sql_prod_001
Vm2_uvw_app_prod_002

In this example, there is a naming pattern in the hostnames. This naming pattern allows an IT person to categorize a compute resource by name and manually group them together based on the enterprise's definition of application.

For instance, a customer's definition of the application might include a definition of a multi-tier application. In the above case, only "xyz" and "uvw" parts of the hostname are identifiers of an application and all resources may be grouped into two groups: application xyz and application uvw. Other customers name their applications differently and might consider "sql," "web," or "app" be a part of the application definition.

It will be appreciated that different parts of an enterprise may have different naming conventions. Various embodiments and processes discussed herein may identify compute resources using different names across different parts of the enterprise regardless of whether the naming conventions are consistent.

Some enterprise users may wish to migrate to the cloud but do not have a configuration management database (CMDB) such as ServiceNow CMDB. In some embodiments, the enterprise users, data sources, network monitors, and/or the like may have a list of hosts, servers, and virtual machines. Systems and methods described herein may assist in using a list of hostnames of compute resources (e.g., the host, server, and virtual machines) to find commonality of function or relationship to enable grouping of the compute resources for movement to the cloud and/or other location.

It may be appreciated that users tend to identify the purposes or functions of the compute resources and include an indication in the names of servers, virtual machines, and the like. Unlike devices which often take the names of owners or physical locations, many users (e.g., IT professionals) utilize a way to represent the application in the name of the compute resources.

FIG. 1 is an example environment in some embodiments. FIG. 1 depicts different enterprise systems 100*a-b*, a cloud network 106, and an application discovery system 108 that communicate over a communication network 102.

The enterprise systems 100*a* and 100*b* may be systems run by separate enterprises. Each enterprise may be an independent entity. An enterprise system may refer to the physical, virtual and logical design of one or more enterprise networks and how the various software, hardware, and protocols work together to transmit data.

An enterprise system may include any number of digital devices for performing services, supporting communication, and the like for the enterprise. An enterprise system may include any number of digital device communicating over any number of networks. The enterprise system may include compute resources from multiple physical locations (e.g., many buildings within a city, state, country, continent, or combination of continents). An enterprise system may communicate and receive services from cloud networks (e.g., public or private cloud networks) such as cloud network 106.

In some embodiments, the communication network 102 represents one or more computer networks (e.g., LANs, WANs, and/or the like). The communication network 102 may provide communication between or among an enterprise system (e.g., enterprise systems 100a or b), cloud network 106, and the application discovery system 108. In some implementations, the communication network 102 comprises computer devices, routers, cables, uses, and/or other network topologies. In some embodiments, the communication network 102 may be wired and/or wireless. In various embodiments, the communication network 102 may comprise the Internet, one or more networks that may be public, private, IP-based, non-IP based, and so forth.

The cloud network 106 includes an infrastructure in which some or all of one or more enterprise's network capabilities and resources are hosted. The cloud network 106 may be a public or private cloud platform, managed in-house or by a service provider, and available on demand.

While there is only one cloud network 106 depicted in FIG. 1, it may be appreciated that there may be any number of cloud networks operated by any number of different entities providing services to the enterprises. Further, in some embodiments, the enterprise that owns and/or controls the enterprise network may own or operate the cloud network 106 or purchase serves from the cloud network 106.

Further, cloud network 106 is depicted in FIG. 1. It may be appreciated that the cloud network 106 is optional (e.g., there may not be a cloud network).

Different enterprises may utilize services within their own enterprise network and/or the cloud network 106.

The application discovery system 108 may be a digital device that communicates with the enterprise network 100A and/or enterprise network 100B. It will be appreciated that the application discovery system 108 may be a part of an enterprise network 100A (e.g., there may be a separate application discovery system 108 for each enterprise system). In some embodiments, the application discovery system 108 may communicate over the communication network 102 to assist in identifying any number of applications from any number of enterprises.

The application discovery system 108 may receive and/or retrieve any number of hostnames of compute resources, filter the hostnames to create feature values, determine distances between features values (e.g., using one or more metrics), and group feature values using the distances to identify related compute resources (e.g., by application or performance of on objective). As discussed herein, by identifying the applications on an enterprise network, priority, criticality, and service may be effectively prioritized and addressed. Further, by grouping compute resources that work together, a maintenance system may monitor and correct network misconfigurations and problems that impact a service rather than assessing compute resources individually without consideration for context and impact of the collective system.

Figure 2:
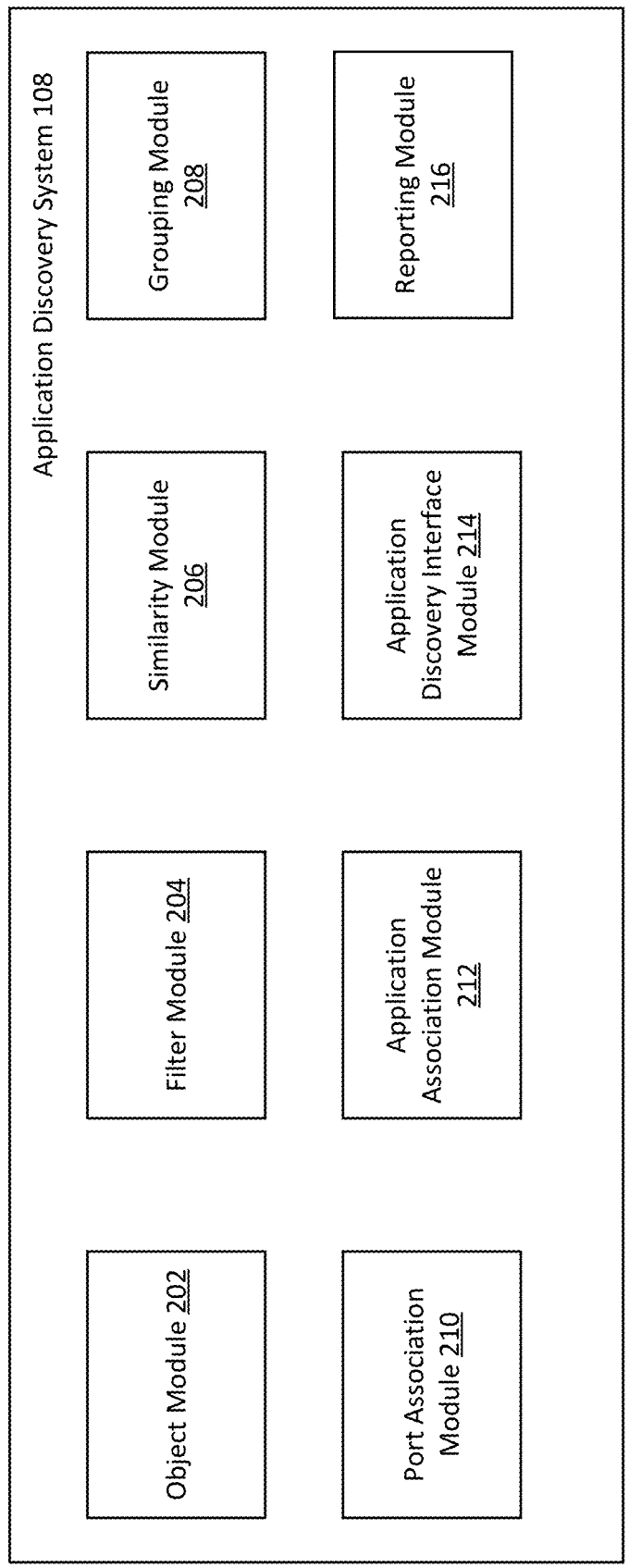
FIG. 2 depicts the application discovery module in some embodiments.

FIG. 2 depicts the application discovery system 108 in some embodiments. The application discovery system 108 comprises an object module 202, a filter module 204, a similarity module 206, a grouping module 208, a port association module 210, an application association module 212, an application discovery interface module 214, and a reporting module 216.

The object module 202 may receive a list of names (e.g., hostnames) of enterprise objects that perform functions within an enterprise network. The enterprise objects may perform software functions. For example, the list of hostnames of enterprise objects may comprise hosts, physical hosts, servers, virtual machines, and/or the like. The enterprise objects may be compute resources. In various embodiments, a list of hostnames of enterprise objects may include a table, database, file, or any other data structure (or combination of data structures).

The object module 202 may receive the list of hostnames of enterprise objects in any number of ways. In various embodiments, a user (such as an administrator, operations manager, IT specialist, or the like) may provide a list of compute resources. The list of compute resources may, for example, be provided by an IT professional of the enterprise network, a monitoring system such as ServiceNow, and/or a system for assessing information flows (e.g., using TAPs as discussed herein). The IT professional may maintain a list of compute resources, retrieve a list of the compute resources through network monitoring software, data sources, from network traffic, and/or the like. The compute resources may include names of any number of enterprise objects active on the enterprise network.

In various embodiments, the object module 202 may obtain (e.g., retrieve and/or access) the list of hostnames of enterprise objects from one or more data sources. The data sources may be a part of or in communication with the enterprise network. In one example, a list of data sources may be provided to the object module 202. The list of data sources may include a location (e.g., file location) where names of one or more enterprise objects may be found. The object module 202 may subsequently retrieve the names of the one or more enterprise objects from the different data sources. In some embodiments, the object module 202 may retrieve the names of the one or more enterprise objects from the different data sources at different times or intervals thereby allowing names of new enterprise objects to be found and allow for names of deleted enterprise objects to be removed.

The data sources may store any number of names of enterprise objects. In one example, one data source may store names of applications that engage with storage area networks while another data source may store any number of names of enterprise objects related to virtual machines that assist with processing communications. It will be appreciated that there may be any number of data sources storing any number of names of different enterprise objects.

In various embodiments, the object module 202 may create a list of enterprise object names received from the user and/or retrieved from any number of data sources.

The filter module 204 may examine each name of the list of enterprise object names. The filter module 204 may remove from the name, the dashes, underscores, symbols, characters, and numbers that are not indicative of an application to generate a feature value. For example, 0, 1, 3, or 6 are not normally used to code the application. These numbers, however, may refer to a virtual machine or host that made the application. As such, the numbers may be filtered or removed from the name to generate a feature value. A feature value is a hostname that has been analyzed to identify if removable data is present in the name (e.g., dashes, underscores, symbols, characters and numbers that are not indicative of an application) and, if removable data is present in the hostname, then the filter module 204 removes the removable data and generate the feature value based on the remaining data (e.g., the feature value is the hostname without the removable data).

If removable data is not present in the hostname, then the feature value is the hostname. For example, a hostname that has nothing removed or filtered by the filter module 204 because there are no qualifying dashes, underscores, symbols, and/or numbers to remove, then the hostname is a feature value.

In some embodiments, the filter module 204 may receive a list of removable data to be removed from each hostname. A list of removable data may be provided by the particular enterprise network that utilizes the compute resources. It will be appreciated that different enterprises may utilize different items in their hostnames. As such, different enterprises may identify a list of items that may be removed from their hostnames to assist in identifying applications associated with the compute resources. For example, one enterprise may utilize symbols to associate applications with compute resources while another enterprise may utilize symbols only to differentiate the compute resources from each other. By providing a list of removable data to exclude from whose names of compute resources, and enterprise may assist in application discovery.

In some embodiments, the enterprise (e.g., IT professionals employed by the enterprise 100A) may provide a list of removable data and/or a list of preservable data. The list of removable data may include any dashes, underscores, symbols, characters, combination of characters, and/or numbers to remove from names of compute resources. The list of removable data includes information that is not helpful in identifying applications, purposes, and/or functions of the associated compute resources. As discussed herein, an enterprise may include highly customized or standard processes that enable a list of removable data to be created to assist in removing unhelpful information from the list of names of compute resources. In some embodiments, the filter module 204 may ignore capitalizations, retain capitalizations, or change all capitalizations/non-capitalizations to make them consistent in making the feature values.

The list of preservable data may include a list of dashes, underscores, symbols, characters, combination of characters, and/or numbers to retain in the names of compute resources. Just as some enterprises may be able to identify information within a name of compute resources that is unhelpful, some enterprises may be able to identify information within the name of compute resources that is helpful in identifying applications, purposes, and/or functions of the associated compute resources.

If the filter module 204 receives a list of preservable data, the filter module 204 may identify preservable data in hostnames based on the list of preservable data and ensure that the information is not removed when the feature values are generated. In some embodiments, the filter module 204 may retain only the preservable data from hostnames when generating the features values.

It may be appreciated that the list of removable data and the list of preservable data many include individual list of dashes, underscores, symbols, characters, combination of characters, and/or numbers to retain or preserve. Further, in some embodiments, the list of removable data and the list of preservable data may include individual and/or specific combinations (e.g., ordered) of dashes, underscores, symbols, characters, combination of characters, and/or numbers to retain or preserve.

The filter module 204 may analyze each hostname for removable data and/or preservable data and then generate feature values after removable data is removed and/or preservable data is retained. As discussed herein, the filter module 204 may generate a feature value that is the same as a hostname if the hostname has no removable data and/or preservable data.

Optionally, in some embodiments, the filter module 204 may reorder the list of hostnames before filtering (e.g., sort, organize, alphabetize, and/or rank all or some of the hostnames in the list) before filtering (e.g., before feature values are generated by removing items from the hostnames). In other embodiments, the filter module 204 may not reorder or sort the list of hostnames.

Similarly, the filter module 204 may optionally reorder the list of feature values after filtering (e.g., sort, organize, alphabetize, and/or rank all or some of the feature values in the list) after filtering (e.g., after feature values are generated by removing items from the hostnames). In other embodiments, the filter module 204 may not reorder or sort the list of feature values.

The similarity module 206 may determine a distance between a feature value and one or more other feature values using one or more metrics. In some embodiments, the similarity module 206 may determine a distance between a feature value and every other feature value.

The distance between two strings may be found in any number of ways. For example, the similarity module 206 may utilize the Pythong Difflib such as ratio( ). Ratio( ) may return a measure of similarity between strings as a float in the range of 0-1. In one example, T is the total number of elements in both feature values, and M is the number of matches: 2.0*M/T. In this example, 1 is if the features values are identical and 0 is where they have nothing in common. It may be appreciated that any metrics may be used. For example, the distance between two or more feature values may be determined using Hamming distance, Levenshtein distance, Damerau-Levenshtein distance, or Jaro-Wrinkler distance may be utilized.

It will be appreciated that the similarity module 206 may determine the distance between feature values based on one or more metrics.

The grouping module 208 may group the feature values using the distances to assist in proposing possible groups of feature values (e.g., and their corresponding hostnames) that work together for the same or similar application, purpose, or business objective. A user may receive a list of recommended applications based on the groupings.

The grouping module 208 may group or cluster the feature values in any number of ways. Further, the grouping module 208 may group or cluster the feature values in multiple ways. In various embodiments, each group or cluster may include feature values that are not members of any other group or cluster. For example, each feature value may be a member of only one group or cluster.

In one example, the grouping module 208 utilizes hierarchical clustering (HCA). The grouping module 208 may utilize the distances generated by the similarity module 206 to perform HCA on the feature values. The grouping module 208 may perform HCA on the feature values in any number of ways. For example, the grouping module 208 may utilize a bottom-up approach where each feature value starts in its own cluster and pairs of clusters may be merged based on the metric(s) and linkage criteria while moving up the hierarchy. In another example, the grouping module 208 may utilize a top-down approach where all feature values start in one cluster and splits are performed based on the metric(s) and linkage criteria recursively while moving down the hierarchy.

Optionally, the grouping module 208 may provide a name for each cluster (e.g., identify the cluster by a name and a number to indicate the cluster). For example, the grouping module 208 may names each HAC grouping as HACCluster #(where the "#" symbol represents an integer). Every feature value that is associated with a particular name of a HAC grouping may be a part of that particular cluster.

It will be appreciated that the grouping module 208 may name the clusters or groups in any number of ways including, for example, utilizing common strings, substrings, characters, and the like of the hostnames or feature values shared by members of the group or cluster.

The grouping module 208 may group or cluster the feature values using two or more different approaches. For example, in addition to hierarchical cluster analysis, the grouping module 208 may utilize the same or different metrics (e.g., calculated by the similarity module 206) to cluster based on other approaches, such as an auto-optimization approach. In this approach, the grouping module 208 may cluster or group feature values by assessing feature values in an order (e.g., going down the column of feature values presented in FIG. 4) and collecting high values (e.g., distance and/or metric values) to cluster close feature value names (e.g., based on a threshold and/or other clustering criteria). Feature values that are clustered using this approach may then be removed such that high values of new feature values may be compared to unclustered feature values to consider for new clusters.

The application association module 212 may recommend applications (e.g., groupings or clusterings) based on one or more different approaches (e.g., the HCA approach and the auto-optimization approach). If only one approach is utilized, the application association module 212 may recommend the output of that approach. If two or more approaches are utilized for different clusterings or groupings, the application association module 212 may compare the output of different approaches for each filter or groups of filters. If the approaches provide the same outcome, the application association module 212 may recommend the shared outcome as an associated application for those feature values and the related hostnames. If the approaches are different, the application association module 212 may aggregate the output and/or weight the different approaches to make a recommendation. A user (e.g., IT professional) of the enterprise may provide the weightings.

In some embodiments, the application association module 212 may receive further information to assist with recommendations. For example, the port association module 210 may associate ports with network traffic transmitted or received with the enterprise objects (e.g., compute resources) associated with different hostnames. As discussed herein, the migration module 804 may optionally determine if each of the ports identified based on the data packets received from the network traffic analyzing software platform is a relevant port. The network traffic analyzing software platform may also identify (e.g., based on network traffic) the data received and/or transmitted by one or more compute resources (identified by hostname by the object module 202) as well as ports associated with the one or more compute resources.

As discussed herein, the port association module 210 and/or the migration module 804 may optionally determine if one or more of the identified ports of entities of the enterprise network are registered with an organization such as IANA. If ports utilized by compute resources are registered, the port may be categorized by the IANA. A categorized port by the IANA may indicate the application, purpose, or business objective (e.g., based on the IANA categorization).

The application association module 212 may base recommendations on one or more grouping approaches and port registrations that receive or transmit network data associated with compute resources that are clustered in each grouping. In this example, if the application association module 212 determines that the members of an HCA cluster share a similar port as opposed to the members of an alternative grouping methodology (that share different ports), the application association module 212 may recommend the HCA cluster over the alternative grouping methodology. It may be appreciated that the application association module 212 may make recommendations based on different methodologies based on the same list of feature values (e.g., three different groups based on HCA and two other groups of different feature values based on auto-optimization) using the port information.

Further, the application association module 212 may identify applications based on the registration of ports utilized by members of a group. For example, if the members of a group utilize a port associated with web traffic (e.g., based on the IANA registration of the port), then the application association module 212 may name the cluster based on the IANA registration. In some embodiments, the application association module 212 may indicate if the clustered has been named based on the IANA registration.

While the IANA registrations of ports may be helpful, it will be appreciated that such registrations are not required to be followed by different enterprises. As such, a user may instruct the application association module 212 to disregard or not assess port network traffic because that particular enterprise does not follow the port standard(s).

The application discovery interface module 214 may provide or display the recommendations as well as any other information such as the list of hostnames of compute resources collected, feature values, different clustering provided by the different clustering approaches, recommendations, and/or the like. The application discovery interface module 214 may be the same or different from the application discovery interface module 214.

The reporting module 216 may provide a report regarding the recommendations as well as any other information such as the list of hostnames of compute resources collected, feature values, different clustering provided by the different clustering approaches, recommendations, and/or the like.

As discussed herein, the application discovery system 208 may assist in grouping feature values and their related hostnames together using a variety of different approaches. The application discovery interface module 214 may provide one or more recommendations of groupings or allow the user to select a proposed grouping from one or more of the proposed approaches (e.g., see blank list of recommendations 410 of FIG. 4). In some embodiments, the application discovery interface module 214 provides any number of recommendations and the user may keep or overwrite the recommendations for their preferences or based on further analysis.

In some embodiments, the groupings of hostnames and their related functions may allow a user or enterprise to assess performance of the functions by considering different enterprise objects that impact, support, and/or share functionality. Further, the groupings may assist the user to validate existing lists of hostnames and associated functions (e.g., from one or more CMDBs). In some embodiments, the groupings may allow the user to identify grouped enterprise objects to assess interdependence, function, criticality, and priority for tier of service and maintenance priorities. Further, the groupings may allow the enterprise to consider which compute resources may be good candidates for migration to another server or the cloud as well as potential impacts on cost. The groupings may also be utilized for synthetic workloads as discussed herein when considering cloud migration readiness.

Figure 3:
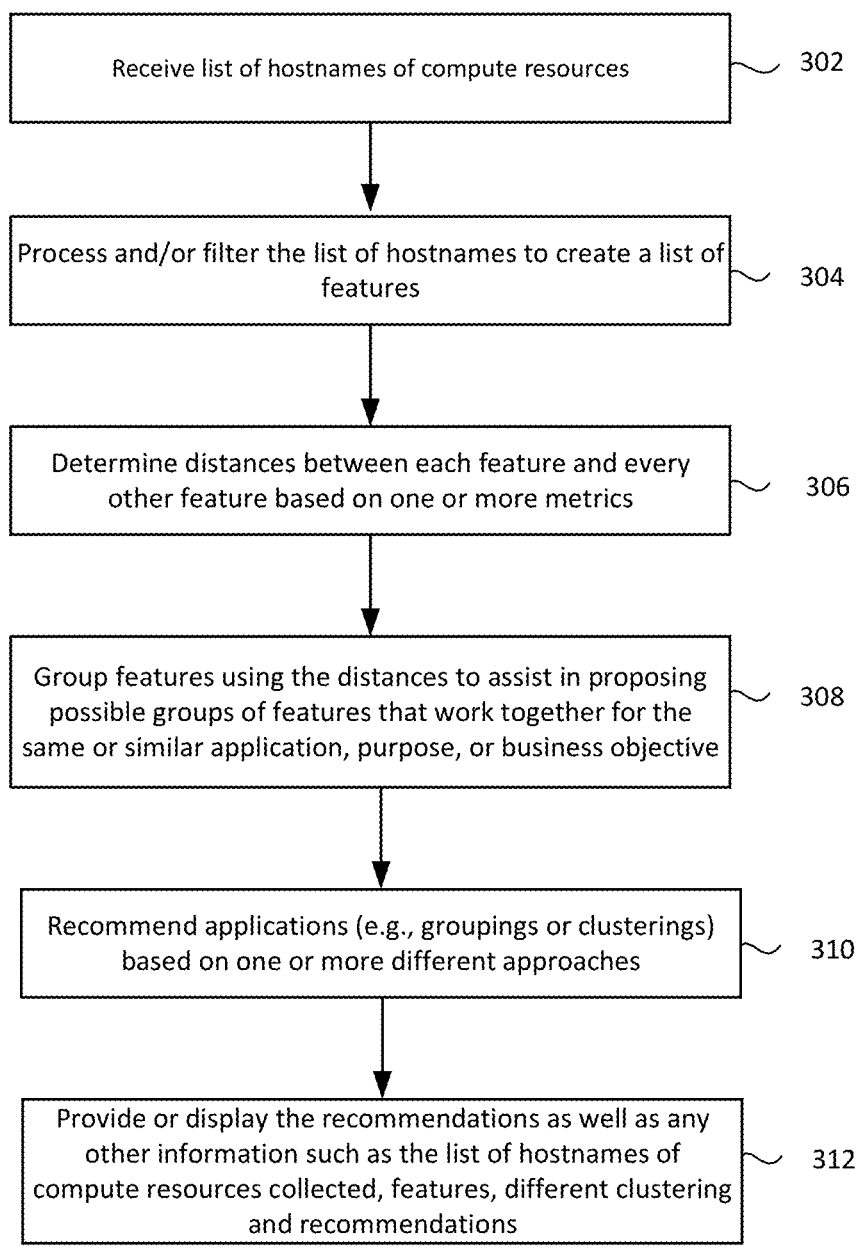
FIG. 3 is a flowchart for assessing a list of hostnames and grouping compute resources by possible applications in some embodiments.

FIG. 3 is a flowchart for assessing a list of hostnames and grouping compute resources by possible applications in some embodiments. In step 302, the object module 202 receives a list of hostnames. The list of hostnames may be a list of names of any compute resources (e.g., not just hosts). The object module 202 may receive any number of lists of hostnames from any number of sources (e.g., users, network monitoring software, data sources, and/or the like). The object module 202 may receive or retrieve a list of hostnames periodically or only once.

Figure 4:
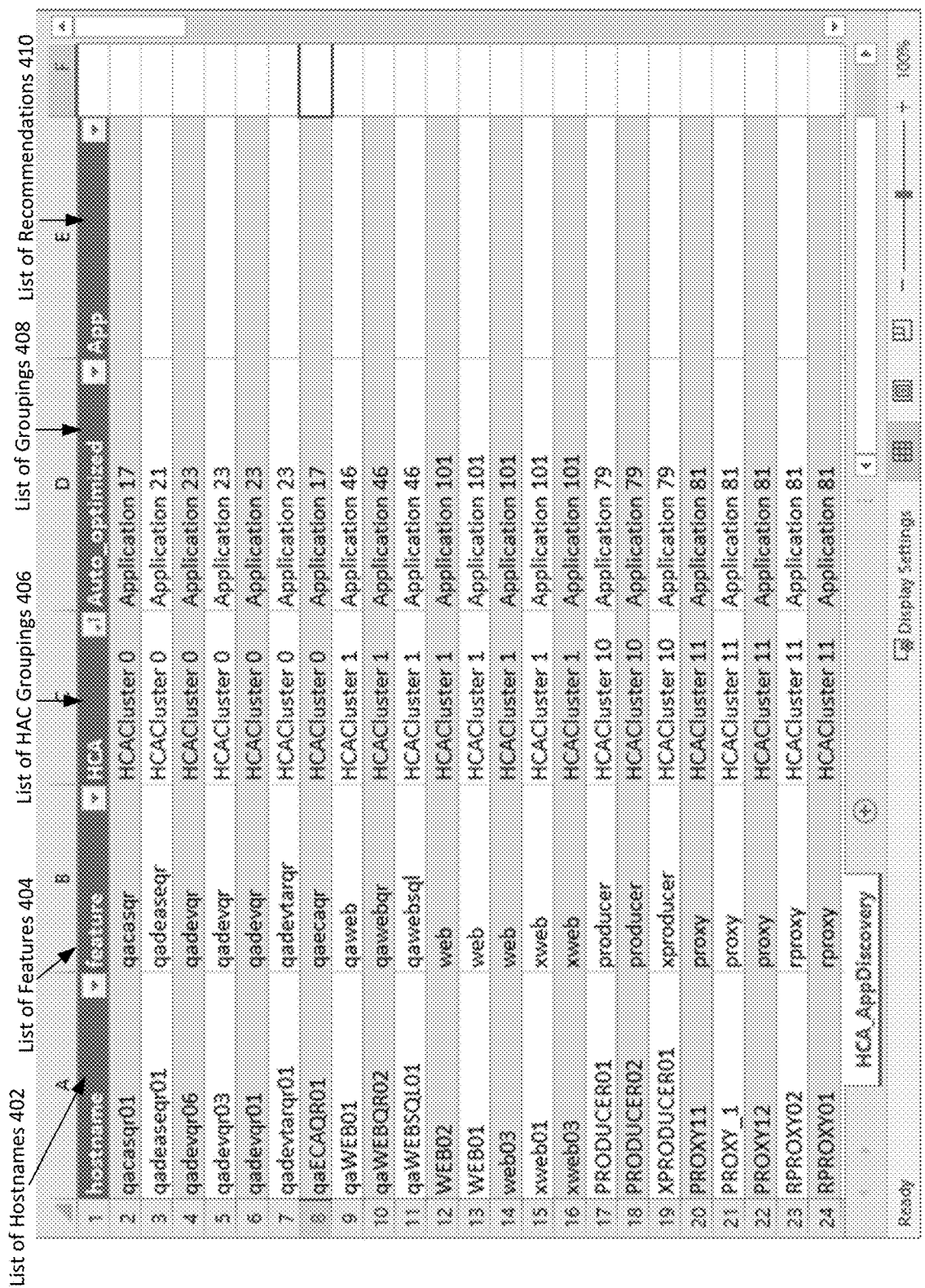
FIG. 4 depicts an example list of hostnames, feature values, and groupings.

FIG. 4 depicts an example list of hostnames, feature values, and groupings. The chart includes, for example, a list of hostnames 402 that the object module 202 may receive or retrieve.

In various embodiments, the object module 202 may process, organize, alphabetize, and/or sort any number of hostnames from any number of lists.

In step 304, the filter module 204 may process and/or filter the list of hostnames to create a list of feature values. As discussed herein, the filter module 204 may filter or modify the hostnames (e.g., list of hostnames 402) of the compute resources. In some embodiments, the filter module 204 may remove a portion of the hostname including, for example, dashes, underscores, symbols, and numbers that are not indicative of an application. For example, 0, 1, 3, or 6 are not normally used to code the application. As discussed herein, the removable data may include individual or combinations of underscores, symbols, and/or numbers.

The filter module 204 may remove removable data (e.g., from a list of removable data) from a hostname to generate a feature value and/or preserve preservable data (e.g., from a list of preservable data) to generate a feature value.

FIG. 4 depicts an example list of feature values 404. In some embodiments, the filter module 204 may optionally sort, organize, alphabetize, and/or rank the feature values. If the filter module 204 changes the order of the feature values, the filter module 204 may similarly reorder the hostnames such that the hostnames remain associated with their respective feature values.

In step 306, the similarity module 206 determines distances between each feature value and every other feature value based on one or more metrics. As discussed herein, the similarity module 206 may determine a distance between features (e.g., strings) in any number of ways. For example, the similarity module 206 may utilize ratio( ) of the Python Difflib. Each distance, for example, may be a value between 0 and 1. In some embodiments, the similarity module 206 may normalize and/or scale distances.

In various embodiments, the similarity module 206 determines distances between each feature value and every other feature value. In some embodiments, the similarity module 206 may determine a distance between each feature value and one or more hostnames. For example, if the particular hostname was not modified by the filter module 204 (e.g., the particular hostname did not have any dashes, underscores, symbols, and numbers to be removed), then the similarity module 206 may check a hostname against every other feature value as well as every other hostname that does not have a corresponding feature value. Similarly, the similarity module 206 may check a feature value against every other feature value and every other hostname without a corresponding feature value.

In some embodiments, the similarity module 206 may organize or store the distances in any number of ways. FIG. 5 depicts a matrix with organized distance values as an example in some embodiments. The similarity module 206 may organize the distances in the matrix indicating a distance (e.g., degree of similarity) between rows and columns.

For example, the similarity module 206 may generate an LPA matrix (e.g., M×M or M×M/2 matrix) where columns and rows correspond to the feature values and the cells of the matrix are rational numbers representing a measure of proximity between two strings:

$D(s1, s2)$

This measure may vary from 0 to 1, with 1 corresponding a string being measured with itself $D(s1, s1)=1$ and 0 corresponding to 2 strings having no common characters.

In step 308, the grouping module 208 groups feature values using the distances to assist in proposing possible groups of feature values (e.g., and their corresponding hostnames) that work together for the same or similar application, purpose, or business objective. A user may receive a list of recommended applications based on the groupings.

The grouping module 208 may group or cluster the feature values in any number of ways. Further, the grouping module 208 may group or cluster the feature values in multiple ways.

In one example, the grouping module 208 utilizes hierarchical clustering (HCA). The grouping module 208 may utilize the distances generated by the similarity module 206 to perform HCA on the feature values. The grouping module 208 may group any number of feature values within a cluster.

Figure 6:
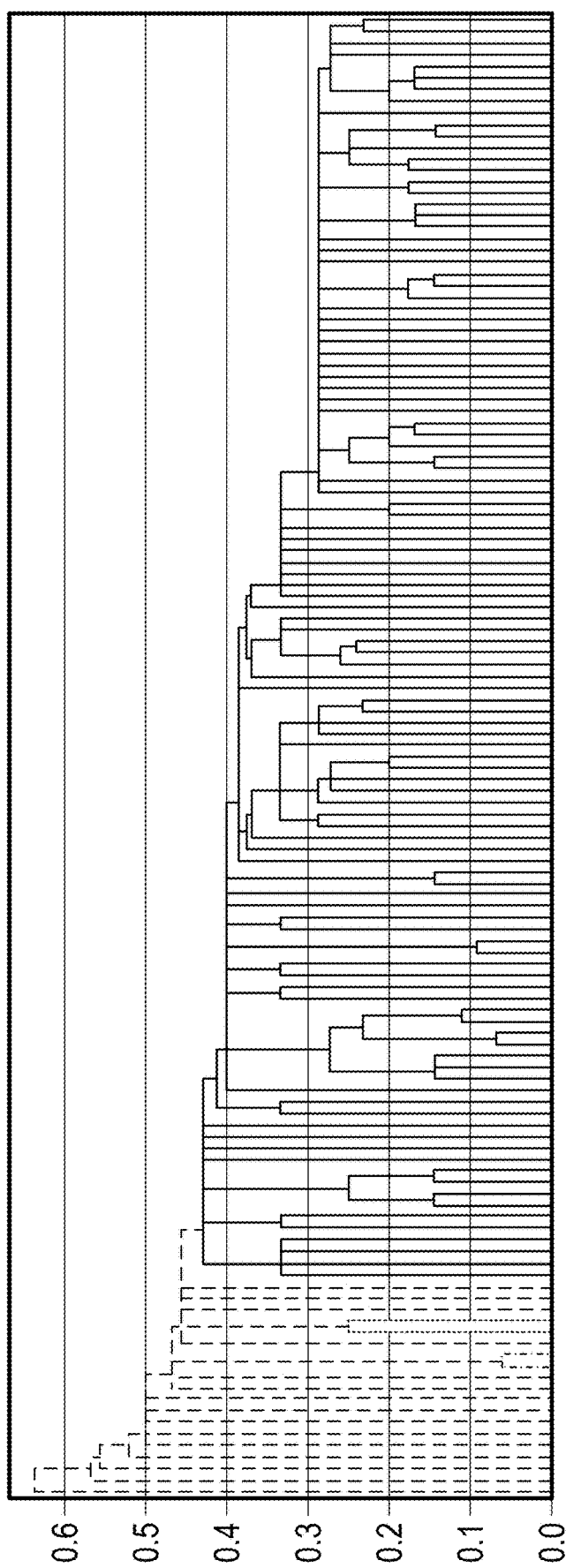
FIG. 6 depicts an example dendrogram depicting groupings by hierarchical clustering (HCA).

FIG. 6 depicts an example dendrogram depicting groupings by hierarchical clustering (HCA). In this example, the grouping module 208 may utilize a linking configuration (e.g., values being depicted along the y axis of the dendrogram) to make groupings.

Optionally, the grouping module 208 may provide a name for each cluster (e.g., identify the cluster by a name and a number to indicate the cluster). FIG. 4 depicts an example list of HCA groupings 406. In the example depicted in FIG. 4, the grouping module 208 names each HAC grouping as HACCluster #(where the "#" symbol represents an integer). Every feature value that is associated with a particular name of a HAC grouping may be a part of that particular cluster. For example, in FIG. 4, compute resources with the hostnames jpcasqr01, jpdeaseqr01, jpdevqr06, jpdevqr03, jpdevqr01, jpdevtarqr01, and JPECAQR01 are identified by the grouping module 208 as belonging to HACCluster 0.

It will be appreciated that the grouping module 208 may name the clusters or groups in any number of ways including, for example, utilizing common strings, substrings, characters, and the like of the hostnames or feature values shared by members of the group or cluster.

In step 308, the grouping module 208 may group or cluster the feature values using two or more different approaches. For example, FIG. 4 depicts a list of alternative clusters 408 that were grouped using auto-optimization. In this example, Although FIG. 4 depicts two alternative lists of groupings, it will be appreciated that there may be any number of groupings performed by the grouping module 208 in any number of ways and using shared metrics or different metrics (e.g., using different distance metrics or the same metrics between the different clustering approaches).

In step 310, the application association module 212 may recommend applications (e.g., groupings or clusterings)

based on one or more different approaches (e.g., the HCA approach and the auto-optimization approach). If there are two or more grouping approaches that provide different groupings, the application association module 212 may aggregate the output and/or weight the different approaches to make a recommendation. A user (e.g., IT professional) of the enterprise may provide the weightings. FIG. 4 depicts spaces for a list of recommendations 410. In various embodiments, the application association module 212 may make recommendations and allow users to change one or more recommendations or groupings (e.g., by making changes in the spreadsheet).

In some embodiments, the application association module 212 may receive further information to assist with recommendations. For example, the port association module 210 may associate ports with network traffic transmitted or received with the enterprise objects (e.g., compute resources) associated with different hostnames. The port association module 210 and/or the migration module 804 may optionally determine if one or more of the identified ports of entities of the enterprise network are registered with an organization such as IANA. If ports utilized by compute resources are registered, the port may be categorized by the IANA. A categorized port by the IANA may indicate the application, purpose, or business objective (e.g., based on the IANA categorization).

The application association module 212 may base recommendations on one or more grouping approaches and port registrations that receive or transmit network data associated with compute resources that are clustered in each grouping. In this example, if the application association module 212 determines that the members of an HCA cluster share a similar port as opposed to the members of an alternative grouping methodology (that share different ports), the application association module 212 may recommend the HCA cluster over the alternative grouping methodology. It may be appreciated that the application association module 212 may make recommendations based on different methodologies based on the same list of feature values (e.g., three different groups based on HCA and two other groups of different feature values based on auto-optimization) using the port information.

Further, the application association module 212 may identify applications based on registration of ports utilized by members of a group. For example, if the members of a group utilize a port associated with web traffic (e.g., based on the IANA registration of the port), then the application association module 212 may name the cluster based on the IANA registration. In some embodiments, the application association module 212 may indicate if the clustered has been named based on the IANA registration.

In optional step 312, the application discovery interface module 214 may provide or display the recommendations as well as any other information such as the list of hostnames of compute resources collected, feature values, different clustering provided by the different clustering approaches, recommendations, and/or the like. The application discovery interface module 214 may be the same or different from the application discovery interface module 214.

In various embodiments, the application discovery interface module 214 may provide a user options to accept recommendations, make changes to the recommendations, rejection recommendations, and/or enter their own application names and/or groupings.

The optional reporting module 216 may provide a report regarding the recommendations as well as any other information such as the list of hostnames of compute resources collected, feature values, different clustering provided by the different clustering approaches, recommendations, and/or the like.

In various embodiments, the groups of compute resources may be assessed for cloud migration including performance, services required, criticality, and costs. Applications, purposes, and business objectives of the groups may be assessed to determine criticality, dependencies, and the like for loud migration assessment as discussed herein.

While FIG. 4 depicts a list of hostnames 402 and space for a list of recommendations 410, it will be appreciated that the application discovery system 108 may receive different lists of hostnames and perform filtering, metrics, and clustering on each of the lists separately. For example, the application discovery system 108 may receive a list of hostnames 402 of physical hosts. Subsequently, the application discovery system 108 may perform filtering, metrics, and clustering on the list of names of physical hosts. At another time, the application discovery system 108 may receive a list of hostnames of virtual machines. Subsequently, the application discovery system 108 may perform filtering, metrics, and clustering on the names (e.g., associated feature values) of virtual machines. In some embodiments, the application discovery system 108 may add the previously received list of hostnames of physical hosts to the newly received list of hostnames of virtual machines and perform filtering, metrics, and clustering on the names/feature values of the combined list. The application discovery system 108 may combine any number of lists obtained at any time regarding any type or combination of types of virtual and/or physical objects.

For example, once one or more recommended groups of compute resources are identified by the methods described herein, the system (e.g., discussed herein) may identify a plurality of workloads of the enterprise network, the identify the plurality of workloads being based on received utilization performance measurements of at least one recommended group, generate a discovery report based on the identified plurality of workloads, the discovery report including at least one of the plurality of designated server ports and at least one of the plurality of designed client ports associated with the identified plurality of workloads, determine at least one representative synthetic workload for each recommended group, the at least one representative synthetic workload including at least one of the subset of designated server ports and at least one of the subset of designated client ports opened, determine at least one cloud service provider (CSP)'s cloud services based on performance of the representative synthetic workloads, and generate a report for at least one of the representative synthetic workloads, the report identifying the at least one of the representative synthetic workloads, the determination that at least one of the subset and the at least one CSP's cloud services including cloud workload cost, the cloud workload cost being based on a periodic cost associated with executing the at least one of the representative synthetic workload on the at least one CSP's cloud services.

Many of the systems discussed herein may be utilized together to assist in the assessment and validation of groups of recommended compute resources as well as workload assessment (e.g., synthetic workload) of the compute resources of the group for evaluation for cloud migration.

Migration of some or all parts of an enterprise network onto a cloud-based infrastructure usually requires IT administrators to rewrite or customize the code for enterprise network applications. Example enterprise network applications include, but are not limited to, email service, web service, database, customer relationship management (CRM), data file, virtual desktop infrastructure (VDI), and the like. Often customized code links enterprise network applications to resources offered by a cloud provider. Such approaches can turn into unproductive and costly endeavors due to time-consuming post re-configurations, failure to achieve the original workload performance or unnecessary overprovisioning of resources.

There are several steps involved in the migration of enterprise network applications. One of the many challenges is to cause as little disruption to the enterprise network as possible. A source of disruption can be a breakdown in communication between programs or components of the enterprise network. For example, one source of disruption may be caused by a misconfigured firewall or router that inadvertently blocks communication between an application in the cloud and another program that has not been migrated to the cloud-based infrastructure.

The firewall or router may monitor network traffic coming into and out of entities of the enterprise network and may determine whether to allow or block traffic based on a defined set of rules. Rules specify the type of data traffic or transport protocol and the required service port(s). For example, web service may use the Hypertext Transfer Protocol (HTTP), which uses the Transmission Control Protocol (TCP) and port 80.

It is important to keep track of the service ports being used by each entity of the enterprise network and the service as they are moved from on-premises to cloud-based infrastructure. One method of obtaining service port and data traffic information (e.g., the type of data traffic used by the service port) is to utilize ss commands or netstat commands. The ss command may be used to dump socket statistics and display information in a manner that is faster than netstat. Not all systems have such commands. Further using such commands to track communication over time is complex, difficult, and may be computationally inefficient.

Another method of obtaining service port and data traffic information involves installing agent software on an entity of the enterprise network. The agent software may capture communication statistics to a predefined service or respond to poll requests. Many companies and users prefer to avoid installing extra software such as the agent software because the agent software adds potential security risks, increases the complexity of the system, and further slows computation efficiency.

As discussed herein, the need to lift all or some of the computational needs to the cloud is a problem that has been created by computers and networks. As such, solutions to determining computational readiness and identifying agent and server software solve problems that have been brought about by computers and networks.

In other instances, an enterprise may take the "lift and shift" approach, in which the enterprise makes minimal or zero changes to the code for enterprise network applications. In such instances, the IT administrator may lift the storage requirements of the on-premises infrastructure and shift or replicate the storage requirements in the cloud-based infrastructure. This may result in an over-estimation of required cloud resources and would run contrary to an overall goal of an enterprise of profitability. Every corporation must strike a balance between the cost of additional storage versus performance, reliability, and redundancy benefits of the additional storage resources.

Another approach is to choose the right on-premise configurations before migration. Although this approach is an improvement over replicating the existing on-premise configuration, this approach does not lead directly to a right-sized cloud configuration. The CSPs use high scalable and heavily customized hypervisors. CPUs, memory, and IOPs performance will vary significantly between on-premise and CSPs hypervisors. The outcome of current approaches results in migration projects that take longer and cost more than expected and, in many cases, leads to costly failures.

Various embodiments discussed herein leverage performance analytics, workload utilization profiling, and cloud simulation to determine which workloads of the enterprise network can be migrated to a cloud infrastructure as a service (IasS) and their associated cost. As a result, these systems may provide insight into the performance and suitability of applications of the enterprise network in different cloud service providers (CSP)s. For example, systems discussed herein may reduce the risk of large-scale migrations of workloads or applications to a public and/or private cloud before migrating the actual workloads to the cloud.

The "end to end" migration process to an Infrastructure as a Service (IaaS) cloud is a challenging undertaking consisting of many critical phases and spanning IT infrastructure and application organizations. "Lift and Shift" or "Re-hosting" migrations to the cloud are inherently risky due to many unknown answers to fundamental evaluate critical questions. In "lift and shift" migrations, the enterprise may utilize applications in the cloud that are effectively a clone of the existing data center implementation. In the "re-hosting" migration, the application may be similar to the existing data center implementation, but individual services may be replaced with cloud-native services. In some embodiments, there may be a combination of the two where some applications are a clone of the existing data center implementation while others are replaced with cloud-native services.

A common approach to cloud migration is to replicate the existing on-premise configuration in the cloud. Such approaches can turn into unproductive and costly endeavors due to time-consuming post re-configurations, failure to achieve the original workload performance or unnecessary overprovisioning of resources. In many cases, the outcome may be repatriation back to the on-premise data center.

Another approach is to right-size the on-premise configurations before migration. Although this approach is an improvement over replicating the existing on-premise configuration, it still does not lead directly to a right-sized cloud configuration. The CSPs use high scalable and heavily customized hypervisors. CPUs, memory, and IOPs performance will vary significantly between on-premise and CSPs hypervisors.

In the absence of workload simulation, workload performance can only be verified by moving the actual application to the cloud and there is no guarantee that the CSP will support the resource demands of the workloads and deliver acceptable performance.

Even if cloud configurations adjustments are made to the original workloads after the migration, the operating cost may be significantly higher than expected, which could lead to repatriation due to an unsustainable and unjustifiable investment.

The outcome of current approaches results in projects that take longer and cost more than expected and, in many cases, leading to very costly failures.

Some embodiments described herein include a unique consultative iterative approach to the discovery and understanding of the workload's or application's dependencies. Some embodiments blend a consultative approach that leverages an agile data discovery, data manipulation, and analysis implemented by experienced data scientists together with automation. In one example, the approach may be designed to handle the initial surge of raw and unstructured data collected during the first iteration. During the following iterations, the focus may be gradually tuned to the priorities and data characteristics revealed during each iteration. By the third iteration, the dependency mapping may be stable and available to create the "move groups" and "move events." After the final iteration, customers may be offered the option to access a SaaS platform to continue the dependency mapping data manipulation.

In one example, a system may identify and determine workload characteristics, baseline on-premises service level agreements (SLAs), and dependencies between compute, networking, and storage elements of the enterprise network. The system may then identify workloads of the enterprise network and categorize them into affinity groups, which are used to create synthetic workloads. A synthetic workload on CSP profiles may be used to simulate the synthetic workload on different CSPs to estimate the performance and cost of migrating the workload onto different CSPs. In some embodiments, after the customer chooses a particular CSP, the system may monitor actual workloads after the cloud migration to identify unforeseen performance or capacity issues.

A cloud migration readiness (CMR) service system may be used to give IT administrators an awareness of the dependencies of the various elements of the enterprise system. For example, the CMR service system may utilize an application discovery system and flow source discovery system to analyze the performance of applications of the enterprise network and profile workload utilization to determine workloads that may be migrated to a CSP.

The application discovery system may give IT administrators and operators awareness of applications and related network infrastructure. The system may obtain real-time views of the infrastructure that is relevant to the network and usage of the network. In addition, the application discovery system may determine entities of the infrastructure where important applications are located, monitor application behavior, and assess/monitor their effect on infrastructure resources. The CMR service system may utilize the output of the application discovery system to provide real-time visibility into the performance, health, and utilization of applications across physical, virtual, and cloud computing environments. Entities are logical and intuitive groupings of systemwide devices and workloads that may be based on function, correlation, and/or interdependency. Entities enable users to logically group system-wide resources, from physical devices to application workloads, in order to provide the authoritative insights required to understand how resources and applications are performing. IT teams may configure entities to show all of the resources supporting a specific application, business unit, or tier of service.

Flow source discovery system may collect traffic data in the form of data packets from a wide variety of routers and switches manufactured by different companies. The results of the data flow source discovery process may be used to detect network anomalies, control bandwidth utilization, optimize application performance, and/or troubleshoot problems. Examples of network anomalies include DDoS attacks, SPAM, BotNets, abnormal downloads/uploads, or the like. The data flow source discovery system may control bandwidth utilization by monitoring data traffic metrics and providing alarms or alerts for various data traffic metrics such as read response time, fabric transmission errors, link errors, link transmission errors, network usage rate, port utilization, etc. The CMR service system may utilize the output of the flow source discovery system to determine a traffic dependency of internal and external entities of the enterprise network.

A network device such as a router or firewall may monitor network traffic coming into and out of an enterprise network. The network device may determine whether to allow or block network traffic based on a defined set of network rules. Network rules may specify a type of network traffic and a port (e.g., of a router, switch, and/or firewall) that needs to be open in order to allow the type of network traffic to pass. In some embodiments, the port may correspond to a port of an entity of the enterprise network associated with the network rule. An entity may be or represent an abstract of an individual network device, individual network, group of networks, group of subnets, an application, server, and/or the like.

A communication port of an entity, or the "entity port," may be a communication endpoint. The port may be identified for each transport protocol and a port number. Two examples of the transport protocol include TCP and the User Datagram Protocol (UDP). A port number associated with an entity of the enterprise network, such as a host, may be associated with an internet protocol (IP) address of the host.

Data traffic may be captured using network traffic analyzing software such as Netflow (i.e., a network protocol developed by CISCO for collecting IP traffic information and monitoring network flow). Although Netflow is described as network traffic analyzing software, it will be appreciated that any different network traffic analyzing software may be used.

In various embodiments, the network traffic analyzing software may identify internet protocol (IP) address and ports associated with a source and destination of the data traffic. In some embodiments, the network traffic analyzing software may provide attributes of the data traffic. For example, the network traffic analyzing software may provide attributes of the data in the form of a communication message or tuple in a format of (IP 1, Port 1, IP 2, Port 2), where IP 1 and IP 2 corresponding to the source IP address and destination IP address respectively, while Port 1 and Port 2 corresponds to a source port and destination port respectively. The communication tuple may be different depending on the directionality of the communication.

Systems and methods discussed herein may review this information over time to create an understanding regarding how different network components (e.g., hardware, applications, virtual machines, and the like) communicate over the network. The information may then be used to assess how communication may flow across the network, identify applications, identify servers, and/or identify ports to open and configure routers accordingly. All or some of the information and configuration(s) may be required for planning, simulating, and ultimately moving all or some of an enterprise network to cloud-based services.

Figure 7:
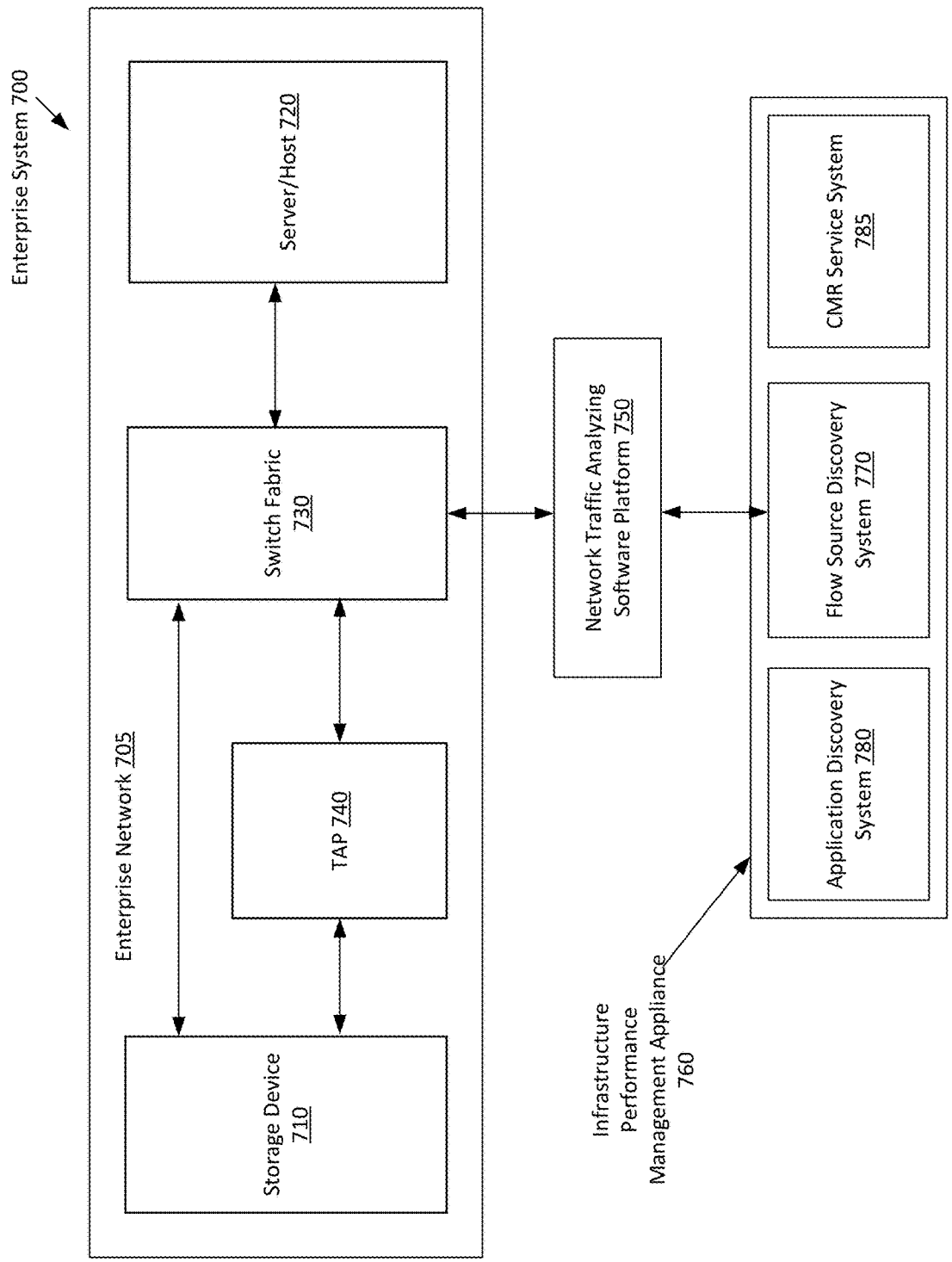
FIG. 7 depicts a block diagram of a cloud migration readiness (CMR) service system which discovers, profiles, and performs playback for migration of one or more entities of the enterprise network onto a cloud service provider (CSP).

FIG. 7 depicts a block diagram of an enterprise system 700, including a CMR service system 785, capable of simulating a synthetic workload on different CSPs to estimate the performance and cost of migrating one or more applications of the enterprise network onto different CSPs. In this example, the enterprise system 700 comprises an enterprise network 705, a network traffic analyzing software platform 750, and an infrastructure performance management (IPM) appliance 760. The enterprise network 705 includes a storage device 710, a server/host 720, a switch Fabric 730, and traffic access points (TAP) 740. The IPM appliance 760 includes a flow source discovery system 770, an application discovery system 780, and the CMR service system 785.

Storage devices 710 of the enterprise system 700 includes any number of storage devices that store data. In one embodiment, the storage devices 710 include one or more disk arrays. For example, the storage devices 710 may include a storage array network (SAN). In various embodiments, the storage device is cloud storage.

Server/host 720 may be any digital device with an instance of an operating system. For example, any number of hosts 720 may be a physical computer managed by Microsoft Windows. Hosts 720 may include instances of UNIX, Red Hat, Linux and/or others. The hosts 720 may include one or more virtual machines.

The switch Fabric 730 may provide communication between any two entities of the enterprise system 700, such as the storage devices 710, the server/host 720, the TAP 740, and the network traffic analyzing software platform 750. The switch Fabric 730 may use packet switching to receive, process, and forward data from a source device to a destination device. The switch Fabric 730 may refer to switches (e.g., flow sources) that are used to direct and assist in the communication of information of the enterprise network 705.

The TAP 740 may provide connectivity to links between storage ports of the storage device 710 and switches of the switch Fabric 730. In various embodiments, the TAP 740 may provide connectivity on both sides of fabric-based storage virtualizers. In one example, the TAP 740 is an optical splitter that provides a copy of data passing through a fiber optic channel of the enterprise network 705 without affecting the integrity of the data. In this example, the fiber optic channel may connect storage devices (of a SAN) with servers of the enterprise network. The copy of the data may be used for real-time performance monitoring of traffic traveling through the fiber optic channel and/or to assist with application discovery.

The network traffic analyzing software platform 750 may discover flow sources on the enterprise network 705. The network traffic analyzing software platform 750 may be any third-party platform that is integrated into routers or switches by their respective manufacturers to aid users in monitoring the performance of traffic data entering and exiting that specific switching hardware. An example of a network traffic analyzing software platform 750 is Netflow. Although the network traffic analyzing software platform 750 of a particular provider may perform some flow source detection, the network traffic analyzing software platform 750 may provide only limited information about the flow sources (e.g., limited metrics) and may not include other switches of other manufacturers (i.e., that is not a part of that particular providers network traffic analyzing software platform 750).

The application discovery system 780 may be different from the application discovery system 108. In this example, the application discovery system 780 may receive from the flow source discovery system 770 possible roles of network endpoints. These possible network endpoint roles may be used by the application discovery system 780 to discover applications through heuristic analysis. For example, data received from a known flow source (e.g., discovered by the flow source discovery system 770) may be assessed to determine what applications provided and/or received information from the data. Data received from a known flow source may be, in one example, intercepted or copied from a TAP that interfaces with communication paths of the enterprise network 705. Based on that information as well as the type of communication, the frequency of communication, and/or the like, the application discovery system 780 or the flow source discovery system 770 may label a network endpoint with one or more roles performed within the enterprise network 705. The output of the application discovery system 780 may be a list of applications on the enterprise network and entities of the enterprise system associated with each of the applications.

In various embodiments, the application discovery system 780 may discover applications: (1) based on information from flow sources (e.g., to determine applications that provided and/or received data), and (2) discover applications by filtering hostnames to generate feature values, identifying distances between feature values, and grouping the feature values (e.g., using HAC and/or other methodologies). In some embodiments, the application discovery system 780 only performs (1) above. In still other embodiments, the application discovery system 780 only performs (2) above.

The CMR service system 785 may utilize data from the network traffic analyzing software platform 750, the flow source discovery system 770, and the application discovery system 780 to identify applications and determine traffic dependency of internal and external entities of the enterprise network. The CMR service system 785 may receive the identified application and traffic dependencies of internal and external entities of the enterprise network and categorize workloads of the enterprise network into multiple affinity groups. The CMR service system 785 may determine representative synthetic workload for the multiple affinity groups. The CMR service system 785 may use simulated cloud service providers and the representative synthetic workload to simulate the representative synthetic workload on different CSPs to estimate the performance and cost of migrating the workload onto different CSPs. During each phase of the cloud migration readiness process, the CMR service system 785 may provide a user interface during each phase of the cloud migration readiness process. The user interface may provide a chart depicting traffic dependencies of internal and external network traffic, such as an example chart of FIG. 13A. The cloud migration readiness process may include four phases, a discovery phase, a profiling phase, a playback phase, and a monitor phase. More details of these four phases of the cloud migration readiness process will be discussed in FIG. 9.

The output of the CMR service system 785 may be an estimated performance and cost of moving one or more applications or portions of one or more applications. A customer may utilize this information to determine the applications or portions of the application to migrate to a CSP. After the migration is completed, the CMR service system 785 may monitor the workloads associated with the application to identify unforeseen performance or capacity issues.

It will be appreciated that some embodiments may provide a variety of different services beyond cloud migration readiness. For example, the CMR service system 785 may provide infrastructure performance assessment. In this example, the CMR service system 785 may enable mitigation of the risk of major infrastructure initiatives and optimize infrastructure performance through application discovery, identification of workgroups, categorization of workgroups into affinity groups, creation of representative synthetic workloads, and simulation of the representative synthetic workloads into different representative infrastructure initiatives. This process may provide definitive insight into current and planned workload and performance. Further, this process may be utilized in customer planning technology refreshes, migrations, consolidations, or new deployments.

Further, the CMR service system 785 may provide storage performance validation in some embodiments. For example, the CMR service system 785 may provide accurate workload modeling and guidance for storage infrastructure validation. Through application discovery, identification of workgroups, categorization of workgroups into affinity groups, creation of representative synthetic workloads, and simulation of the representative synthetic workloads into different representative infrastructure initiatives, the CMR service system 785 may enable accurate application workload validation models may be built to validate storage. This process may be used to enable the evaluation and testing of storage infrastructure.

Figure 8:
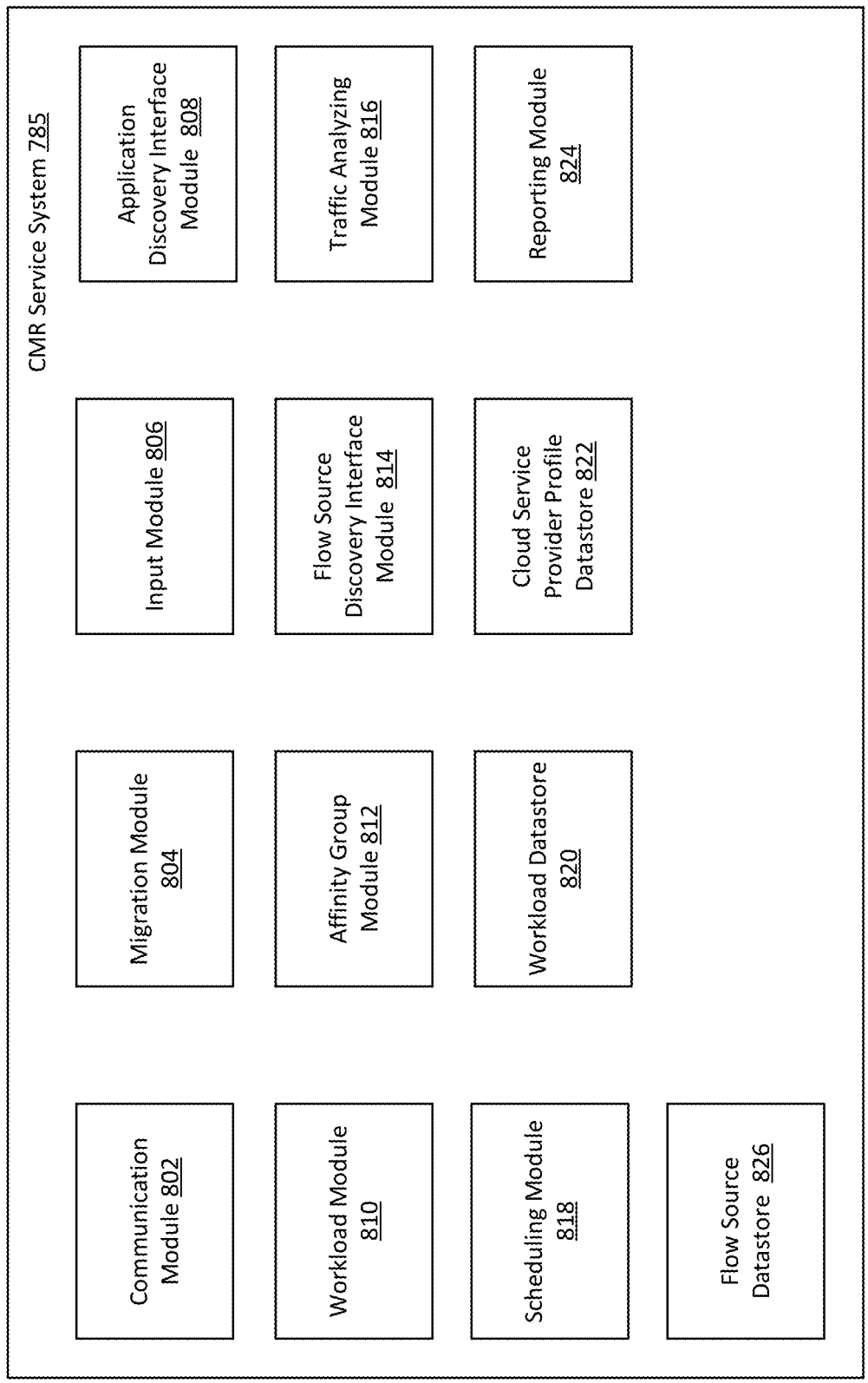
FIG. 8 depicts a block diagram of an example CMR service system according to some embodiments.

FIG. 8 depicts a block diagram of an example CMR service system 785 according to some embodiments. The CMR service system 785 includes a communication module 802, a migration module 804, an input module 806, an application discovery interface module 808, a workload module 810, an affinity group module 812, a flow source discovery interface module 814, a traffic analyzing module 816, a scheduling module 818, a workload datastore 820, a cloud service provider profile datastore 822, a reporting module 824, and a flow source datastore 826.

The communication module 802 may send and receive requests or data between any of the CMR service system 785, the network traffic analyzing software platform 750, the application discovery system 780, and the flow source discovery system 770. The communication module 802 may receive a request from the IT administrator of the enterprise network 705 to commence the cloud migration readiness process. In some embodiments, the communication module 802 may send a request to the application discovery system 780 for data regarding applications of the enterprise network 705 discovered by the application discovery system 780.

The communication module 802 may receive from the network traffic analyzing software platform 750 any number of data packets. The communication module 802 may send a request to the flow source discovery system 770 for discovered flow source(s) and their associated attributes (e.g., in a table, chart, graph, or the like). In some embodiments, the communication module 802 may receive a request from the reporting module 824 to provide, in the form of charts or graphs, traffic dependencies of internal and external network traffic.

The migration module 804 may manage the cloud migration readiness process and/or may commence the cloud migration readiness process. The migration module 804 may commence the cloud migration readiness process when the migration module 804 determines that any number of trigger conditions is satisfied. For example, a trigger condition may include the scheduling module 818, determining that a current time equals a scheduled cloud migration readiness process start time. In some embodiments, one of the trigger conditions includes receiving from the input module 806 a request to commence the cloud migration readiness process. Upon the reception of the request to commence the cloud migration readiness process from the scheduling module 818 or the input module 806, the migration module 804 may commence the cloud migration readiness process.

The migration module 804 may suspend the flow source discovery process when the migration module 804 determines that a trigger condition is satisfied. For example, a trigger condition may include the scheduling module 818 determining that a current time equals the scheduled cloud migration readiness process end time. In this example, a scheduling module 818 may determine or be configured to identify a time when resources are being used by the enterprise (e.g., peak times or business hours), which may satisfy the trigger continue to suspend the flow source discovery process (e.g., thereby conserving resources for use by the enterprise. Similarly, there may be a time during the evenings or off-peak times identified by the scheduling module 818, which may trigger a transition from suspend to re-engaging the flow source discovery process. In some embodiments, the migration module 804 may flag or bookmark one or more points (e.g., at suspension points or any point) in the flow source discovery process such that when the process is re-engaged after being suspended, the flow source discovery process may begin at or near the point in the flow source discovery process when the process was suspended.

In some embodiments, one of the trigger conditions includes receiving from the input module 806 a request to suspend the cloud migration readiness process. Upon the reception of the request to commence the flow source discovery from the scheduling module 818 or the input module 806, the migration module 804 may suspend the cloud migration readiness process.

In some embodiments, the migration module 804 manages a commencement or suspension of any one of the multiple phases of the cloud migration readiness process. For example, the migration module 804 may commence the discovery phase of the cloud migration readiness process when the migration module 804 determines that any number of trigger conditions is satisfied. In one embodiment, the discovery phase of the cloud migration readiness process lasts two to four weeks. In various embodiments, the profiling phase lasts two weeks, the playback phase lasts two weeks, and the monitoring phase lasts four weeks.

The input module 806 may initiate the cloud migration readiness process or a phase of the cloud migration readiness process (e.g., based on receiving a request from the IT administrator of the enterprise network 705). In some embodiments, the input module 806 may receive a request to start an application discovery process. In various embodiments, the input module 806 may receive a request to start a flow source discovery process. In some embodiments, the input module 806 receives a schedule of the cloud migration readiness process. For example, the input module 806 may receive a start date and time of the cloud migration readiness process start time. In some embodiments, the input module 806 may receive, from the IT administrator of the enterprise network 705, known workloads.

The application discovery interface module 808 interfaces with the application discovery system 780. In some embodiments, the application discovery interface module 808 may send the output of the application discovery process to the input module 806. The output of the application discovery process may include a list of application entries found in the enterprise network 705. Each application entry may include attributes or characteristics (e.g., metrics) of the discovered application, such as a suggested name of the discovered application, as well as attributes associated with the entities which make up the discovered application. The application discovery process will be discussed further in FIG. 11.

During the discovery phase of the cloud migration readiness process, the workload module 810 may identify multiple workloads of the enterprise network 705. In some embodiments, a workload represents the amount of work or processing accomplished by an entity of the enterprise network 705. Entities of the enterprise network 705 may include compute devices, network elements, and storage elements. In one embodiment, entities of the enterprise network 705 include enterprise network applications. In some embodiments, entities of the enterprise network include virtual machines.

In various embodiments, a workload may comprise multiple workloads. For example, the workload represents the amount of work or processing accomplished by an application of the enterprise network 705. Thereby, one workload representing the email service application of the enterprise network comprises multiple virtual machine workloads and server workloads, which function as part of the email service application.

In some embodiments, during the discovery phase of the cloud migration readiness process, the workload module 810 may determine the characteristics of the workload. Characteristics of the workload may include attributes of the entity associated with the workload. For example, a workload of a virtual machine may include attributes of the virtual machine such as applications of the enterprise network 705 associated with the virtual machine and utilization such as maximum read speed, maximum write speed, central processing unit (CPU) MHz, memory utilization percentage, storage demand, and input/output operations per second (IOPS). For example, a workload of a storage device may include attributes of the storage device such as read and write latency.

In some embodiments, the workload module 810 may send a list of workloads identified by the workload module 810 to the affinity group module 812. The affinity group module 812 may receive the list of workloads and categorize or group some or all of the received workloads into one or more affinity groups. In some embodiments, each workload is categorized into one affinity group. The affinity group module 812 may group any number of workloads into synthetic workloads based, at least in part, on resource utilization (e.g., CPU utilization, memory utilization, storage utilization and/or the like).

The workload module 810 may determine workload interdependencies (e.g., how workloads depend on one another). Workload interdependencies help to determine the sequence of workloads, how services are migrated to the cloud, and what workloads and services should stay on-premise.

The affinity group module 812 may categorize workloads identified by the workload module 810 into affinity groups. As discussed herein, affinity groups (e.g., representative synthetic workloads) may consist of workloads with similar resource utilization levels and temporal or time-based characteristics. For example, workloads with similar read speed and write speeds may be grouped together into the same affinity group. In one example, workloads that have a CPU usage of greater than 90% during a particular time frame each day may be placed in the same affinity groups. In some embodiments, a workload may belong to more than one affinity group. In other embodiments, each workload may only belong to one affinity group.

In one method, the CMR service system 785 may utilize a machine learning algorithm to categorize or group workloads into affinity groups. In some embodiments, the workload module may apply a k-means clustering algorithm to the multiple workloads identified by the workload module 810. The k-means clustering algorithm may have a feature value set represented by average, a percentile of maximum values of utilization metrics. In some embodiments, utilization metrics include CPU utilization, memory utilization, input/out (IO) read utilization, IO write utilization, IO number of reads, IO number of writes, network receive rate, and network transmit rate.

In another method, the affinity group module 812 groups workloads by their maximum or percentile utilization metric fitness into available cloud instances for a specific CSP. This method may be utilized when a particular CSP to use has already been determined.

Once the affinity group module 812 determines the workloads that belong to each affinity group, the affinity group module 812 may determine the representative synthetic workload for each affinity group. The representative synthetic workload for each affinity group may be a sum of the multiple workloads which make up the affinity group. In various embodiments, the representative synthetic workload for each affinity group may be a weighted sum of the multiple workloads which make up the affinity group, with each of the multiple workloads given a weight based on attributes or characteristics of the workload. In some embodiments, the affinity group module 812 may send a request to the workload datastore 820 to store the representative synthetic workload associated with each affinity group.

The affinity group module 812 may generate a table or chart which comprises temporal data capturing utilization level for some or all of the utilization metrics. An example of this may be seen in FIG. 21. Table 2100 of FIG. 21 contains temporal data capturing utilization levels of two example workloads of the enterprise network 705. The columns of the example table 2100 are associated pairs of date/time of data and the name of the workload that is being monitored by the infrastructure performance management appliance 760 for a particular utilization metric. The number of column pairs is equal to the number of workloads being monitored by the workload module 810. For example, column 2110 provides a timestamp for measuring the particular utilization metric, while column 2120 provides the measurement for the particular utilization metric associated with the timestamp in the same row.

The flow source discovery interface module 814 interfaces with the flow source discovery system 770. In some embodiments, the flow source discovery interface module 814 may send the output of the flow source discovery process to the input module 806. The output of the flow source discovery process may include a list of flow source entries. The list of flow source entries may include attributes associated with discovered flow sources. Attributes may include the type of flow source, total byte count, incoming/outgoing byte count, incoming/outgoing bit rate, total packet rate, and/or incoming/outgoing endpoint count. In some embodiments, attributes associated with flow source entries may include applications associated with the flow source. The flow source discovery process will be discussed further in FIG. 12. In some embodiments, the flow source discovery interface module 814 interfaces with the network traffic analyzing software platform 750. In some embodiments, the flow source discovery interface module 814 may send a request to the flow source datastore 826 to store the flow source entries.

The traffic analyzing module 816 analyzes network traffic received from the flow source discovery system 770. In some embodiments, the traffic analyzing module 816 receives network traffic from the network traffic analyzing software platform 750. The traffic analyzing module 816 may analyze IP communications between entities of the enterprise network 705 as well as IP communications between entities of the enterprise network and entities that are external to the enterprise network 705. The traffic analyzing module 816 may provide the output of traffic dependency on internal and external network traffic. An example of this can be seen in FIG. 13A. Example chart 1300 depicts the amount and type of traffic that goes through a particular virtual machine. Row 1310 depicts the amount of traffic between the particular virtual machine to external entities of the enterprise network 705. Network traffic is separated by incoming and outgoing network traffic. Similarly, row 1320 depicts the amount of traffic between the particular virtual machine to other entities, which are not virtual machines, of the enterprise network 705. Row 1330 depicts the amount of traffic between the particular virtual machine and other virtual machines of the enterprise network 705. The traffic analyzing module 816 may output the traffic dependency in forms other than a table. An example of this can be seen in FIG. 13B. An example output interface 1350 depicts the same information as the example chart 1300 of FIG. 13A, but in the form of a state diagram.

Figure 17A:
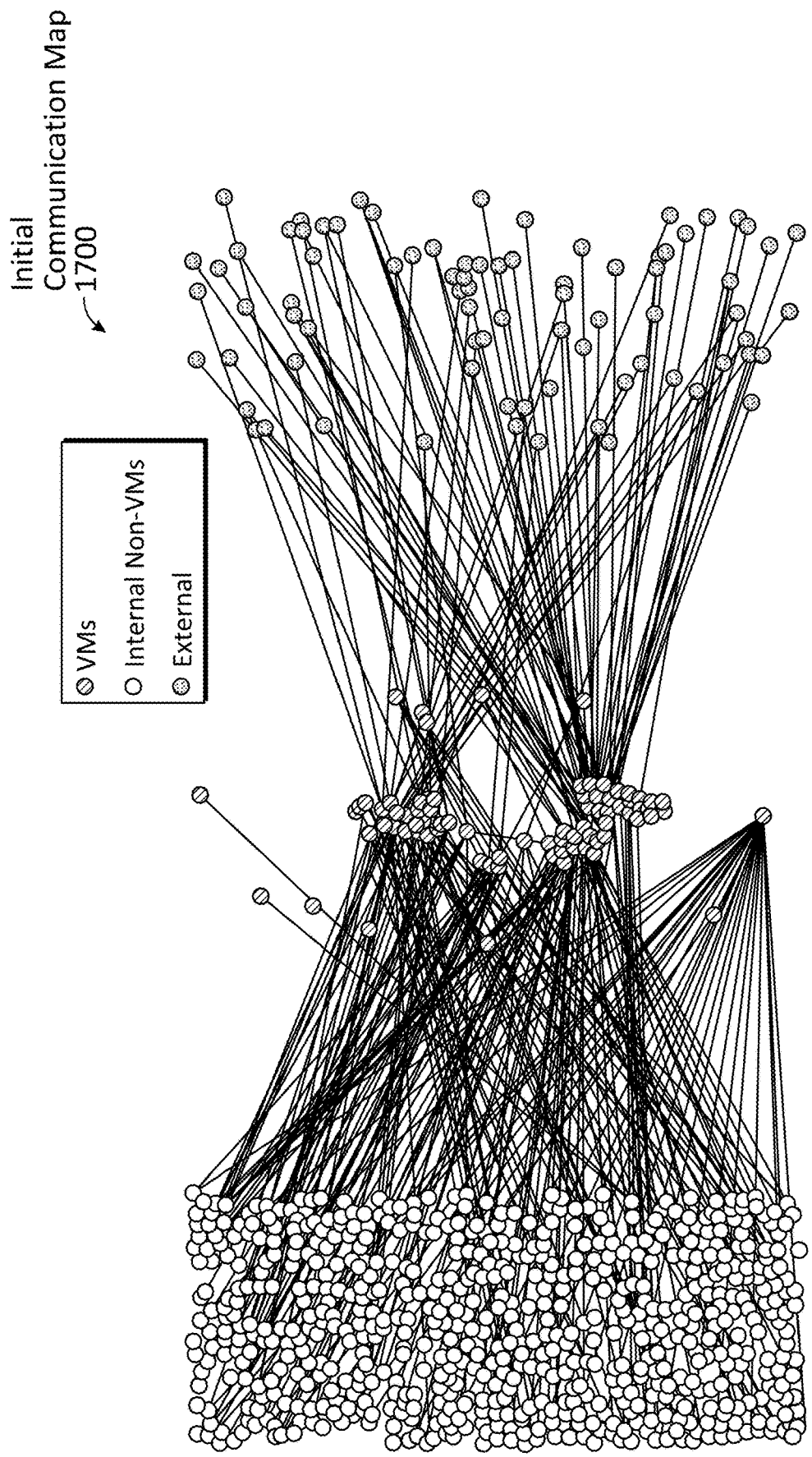
FIG. 17A depicts an initial communication map between internal and external virtual machines according to some embodiments.
Figure 17B:
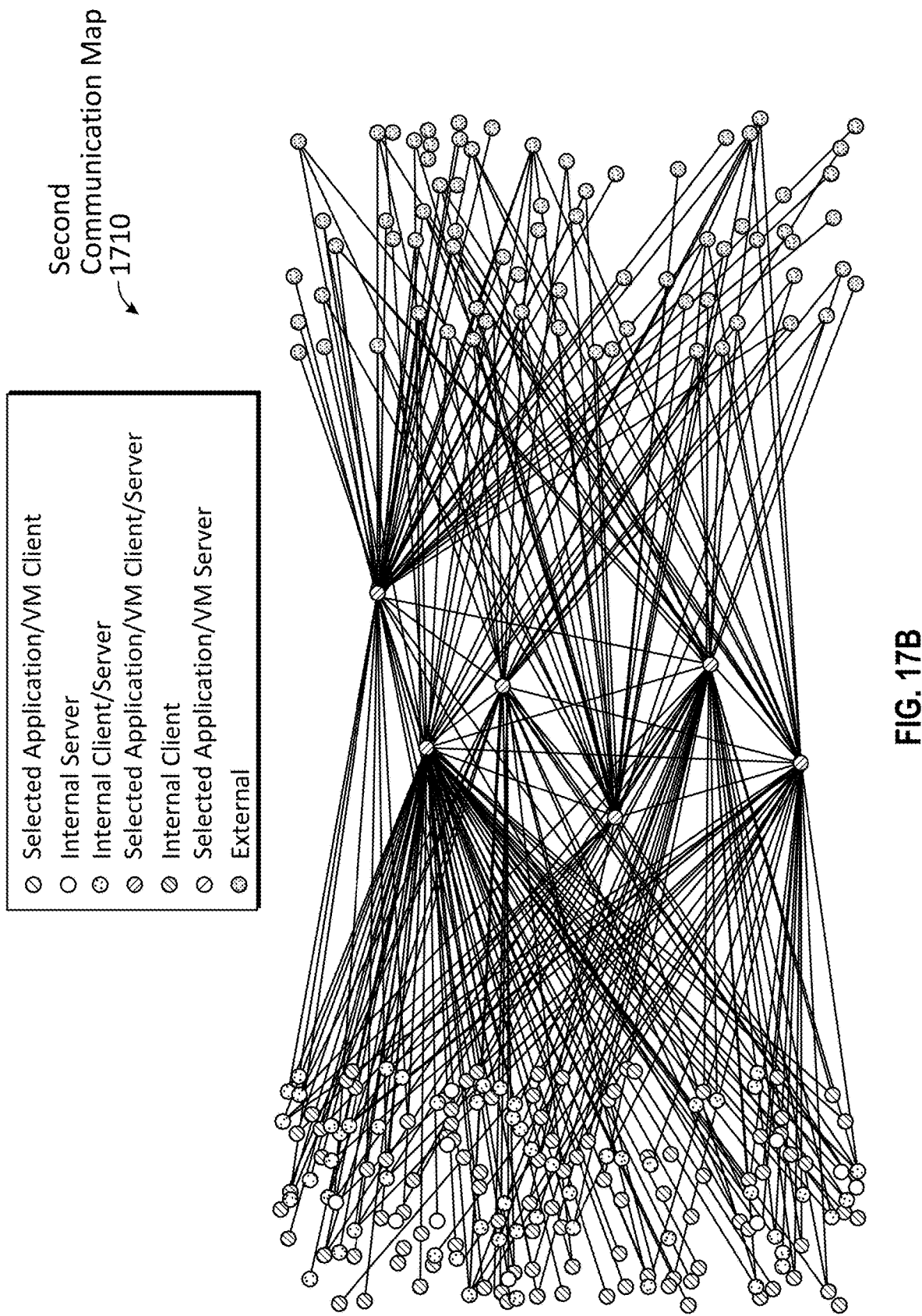
FIG. 17B depicts a second communication map between internal and external virtual machines according to some embodiments.
Figure 17C:
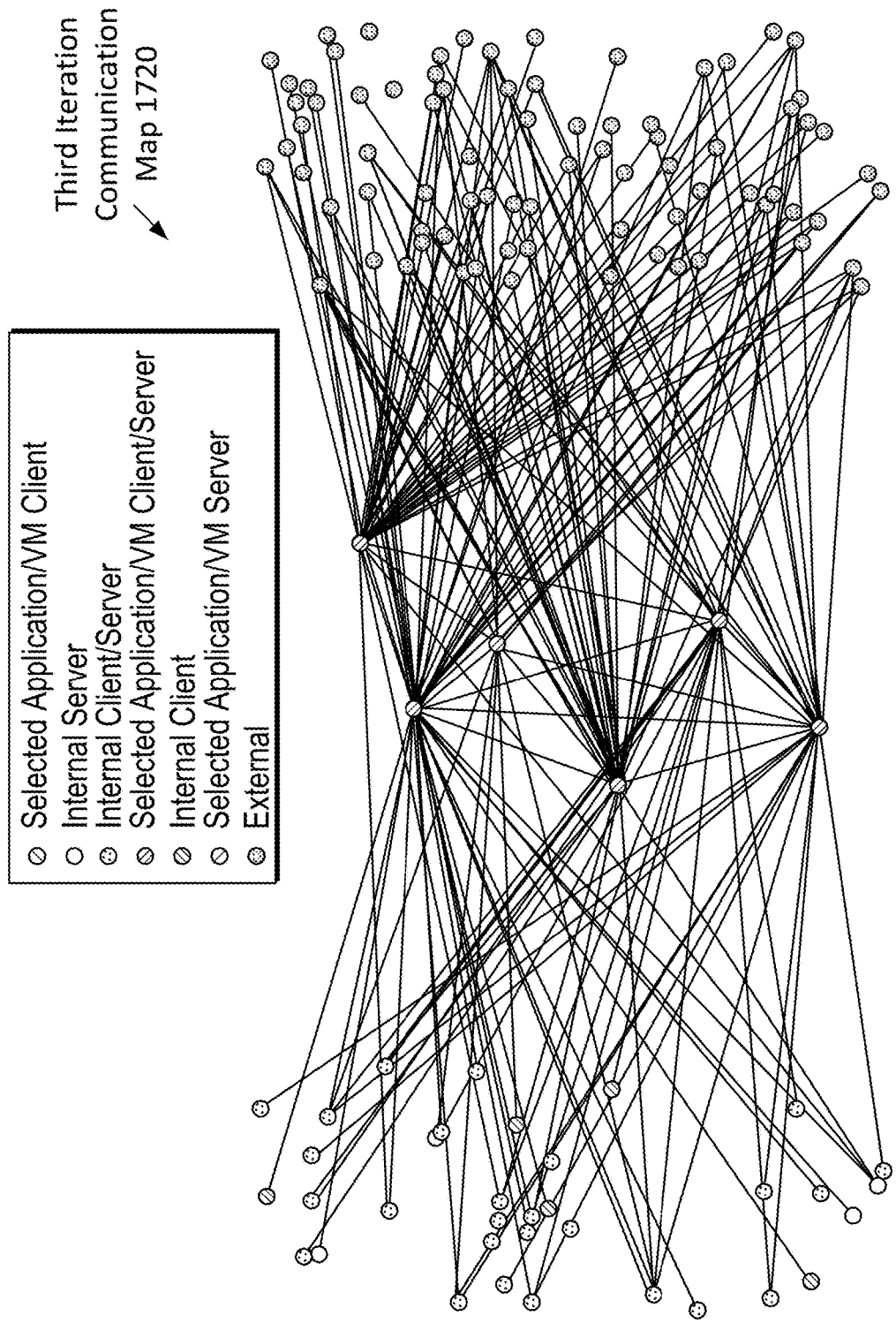
FIG. 17C depicts a third communication map between internal and external virtual machines according to some embodiments.

In one embodiment, the traffic analyzing module 816 may provide a traffic dependency mapping of the various entities or workloads of the enterprise network 705. The dependency mapping of entities or workloads of the enterprise network may be done iteratively. For example, an initial internal and external communication map may be produced and reviewed by a customer, or alternately, the external communication map may be reviewed by an analytical system. The initial communication map may provide an overall view of the enterprise network. The customer or analytical system may review the overall view of the enterprise network to identify and filter entities or workloads which are not of interest and tune priorities and data characteristics reveal during each iteration. An example of an initial communication map may be seen in FIG. 17A. The customer or analytical system may receive an example initial communication map 1700. Subsequent to receiving the initial communication map 1700 of FIG. 17A, the customer or analytical system may refine the IP addresses or entities to focus on a particular set of entities to produce a second communication map 1710 of FIG. 17B. Subsequently, a third iteration of the communication map 1720 of FIG. 17C may be produced. The initial communication map 1700, the second communication map 1710, and the third communication map 1720 may be used to determine or identify bully virtual machines and zombie virtual machines. A bully virtual machine is a virtual machine that utilizes too many resources and causes other virtual machines to be without resources. A bully virtual machine may cause cluster performance to degrade. Identifying bully virtual machines may help in analyzing whether one or more of these virtual machines need additional resources or need to be re-routed to other applications or workloads.

A zombie virtual machine is inactive or is used by very few or no applications or workloads. In one example, a virtual machine is considered a zombie when it is powered on but does fewer than 30 IOPS and receives or transfers fewer than 1000 bytes per day for the past 30 days. To prevent host resource wastage, zombie virtual machines need to be removed or re-routed to other applications or workloads.

In some embodiments, the traffic analyzing module 816 may receive network traffic data from the network traffic analyzing software platform 750 or the flow source discovery system 770 after the network traffic analyzing software platform 750 has performed flow source detection for a predetermined period of time. In some embodiments, the predetermined period of time is at least two weeks.

The scheduling module 818 may receive from the input module 806 the start time or end time of one or more of the phases of the cloud migration readiness process. In some embodiments, the scheduling module 818 may suspend the cloud migration readiness process or any phase of the cloud migration readiness process when any number of trigger conditions is satisfied.

The workload datastore 820 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The workload datastore 820 may store the representative synthetic workload associated with each affinity group. In some embodiments, the workload datastore 820 may create a workload entry for each workload identified by the migration module 804. Each workload entry may include metrics or attributes associated with the workload. The attributes of the workload may depend on what the workload represents. For example, if the workload represents an application, the attributes of the workload may include attributes of the application, such as identifiers of the entities associated with the enterprise network 705, tier, or criticality of the application. In another example, if the workload represents a virtual machine, attributes of the workload may include attributes of the virtual machine such as maximum read speed, maximum write speed, central processing unit (CPU) MHz, memory utilization percentage, storage demand, and IOPS.

The cloud service provider profile datastore 822 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The cloud service provider profile datastore 822 may store a CSP profile entry for various CSPs such as Microsoft Azure, IBM Cloud, and the like. Each CSP profile entry may include attributes of the CSP such as available memory storage, types of security levels available, cost per gigabyte, methods of retrieving data stored on the cloud, and types of deployment available to a consumer. The migration module 804 may utilize the cloud service provider profile datastore 822 to suggest one or more CSP to the customer.

Figure 14:
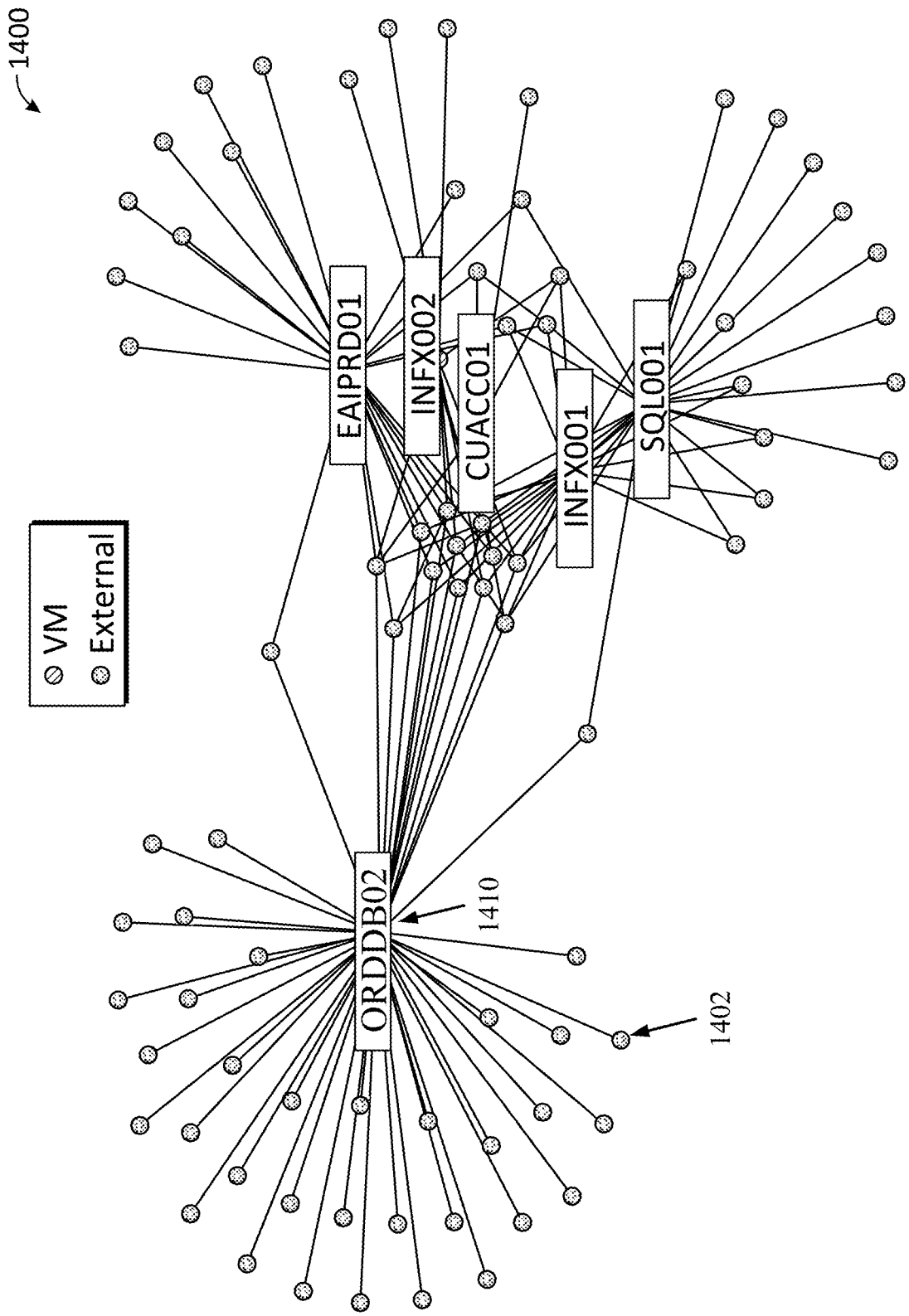
FIG. 14 depicts an example output of virtual machine and external entity traffic according to some embodiments.

The reporting module 824 may receive a request to provide an example output of the network traffic between a particular virtual machine and external entities, such as the example output 1400 of FIG. 14. During the discovery phase of the cloud migration readiness process, the reporting module 824 may provide the example output 1400, which depicts a virtual machine 1410, given an identifier "ORDDB02." The example output 1400 also depicts identifiers of other virtual machines that are in communication with the "ORDDB02" virtual machine. Element 1402 of FIG. 14 depicts an entity external to the enterprise network, or an external entity that is in communication with the "ORDDB02" virtual machine 1410. The reporting module 824 may receive a request to provide example outputs from various phases of the cloud migration readiness process, such as the example workload utilization table 2100 of FIG. 21.

A module may be hardware or software. In some embodiments, the module may configure one or more processors to perform functions associated with the module. Although different modules are discussed herein, it will be appreciated that the CMR service system 785 may include any number of modules performing any or all functionality discussed herein.

Figure 9:
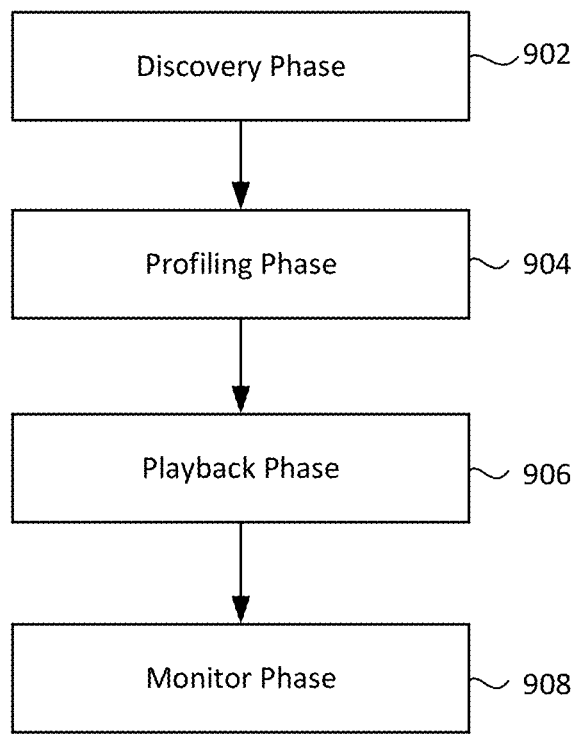
FIG. 9 depicts a flowchart of a cloud migration process of an enterprise system according to some embodiments.

FIG. 9 depicts a flowchart of a cloud migration readiness process 900 of an enterprise system according to some embodiments. The cloud migration readiness process 900 includes a discovery phase 902, a profiling phase 904, a playback phase 906, and a monitor phase 908.

Figure 18A:
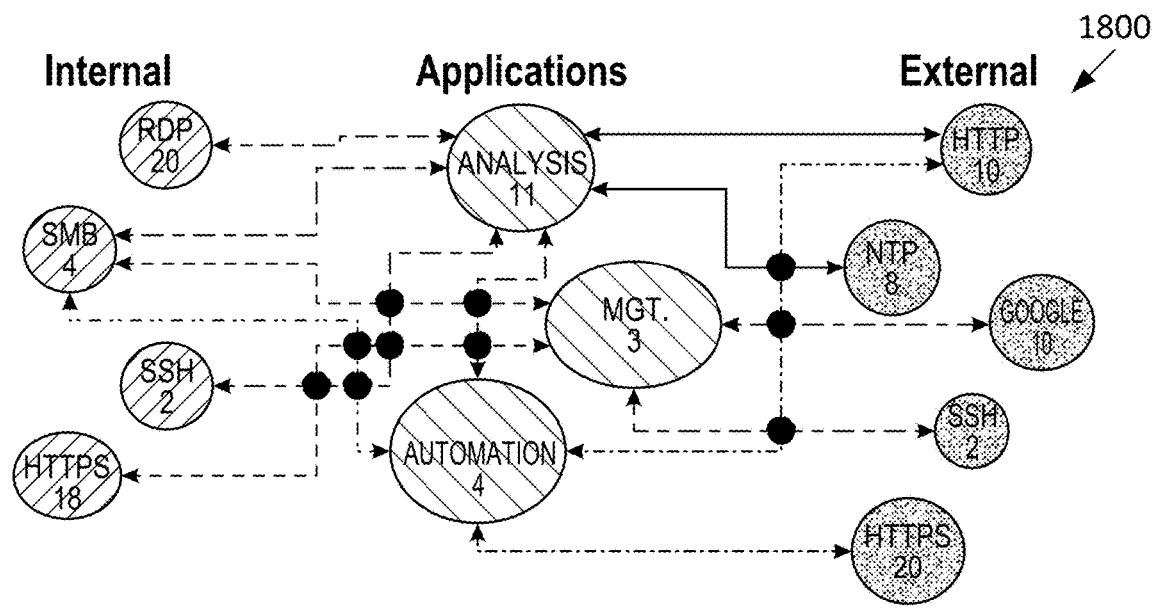
FIG. 18A depicts an example of an on-premises application external and internal dependencies before migration according to some embodiments.

During the discovery phase 902, the CMR service system 785 may identify applications and data flow on the enterprise network to determine an initial internal and external communication map. In some embodiments, the customer may provide business objectives, known applications of the enterprise network, a targeted workload which may include mission-critical applications or virtual machines that have been causing problems, critical peak business time period, and desired completion dates. The CMR service system 785 may use some or all of this information during the discovery phase 902 and other phases of the cloud migration readiness process to generate a report identifying workloads and the cost of migrating the identified workload to different CSPs. Some examples output of the discovery phase 902 may be targeted workload inventory, target workload dependency matrices, and a baseline assessment of the health, utilization, and performance aspects of the workloads' on-premises infrastructure. In some embodiments, the discovery phase 902 may have a duration between 2 to 4 weeks. The customer may receive some or all of the output of the discovery phase 902 to determine workloads to profile in the profiling phase 904 of the cloud migration readiness process. The determination of the workloads may be done based on the customer's goals. For example, based on the characterization of the applications of the enterprise network, the customer may decide to migrate a database application to a cloud-based infrastructure—diagram 1800 of FIG. 18A depicts an example of multiple application's external and internal dependencies before migration. As seen in diagram 1800, the internal and external dependencies of three categories of applications of the enterprise network 705 can be seen. For example, the analysis application is dependent on an internal SMB application and an external HTTP application.

During the profiling phase 904, the CMR service system 785 may receive from the customer, workloads to profile and categorize the workloads into affinity groups. The number of workloads profiled in this phase of the cloud migration readiness process may range from hundreds to thousands. Workloads may be categorized into affinity groups based on utilization levels and temporal characteristics. The workload profiling includes CPU, memory, TO, and network utilization for all on-premises workloads that have been targeted for migration to the cloud. It will be appreciated that in some embodiments, the affinity groups may each be a representative synthetic workgroup. Alternately, in some embodiments, once affinity groups have been created, the CMR service system 785 creates representative synthetic workloads for each affinity group.

In various embodiments, the representative synthetic workload may be a sum of the multiple workloads. Based on the representative synthetic workloads, the CMR service system 785 may select initial cloud configuration choices and presented to the customer. Some example output of the profiling phase may include targeted workload profile, workload affinity group definitions, synthetic workloads, candidate cloud configuration, and candidate cloud configuration costs. In some embodiments, the profiling phase 904 may have a duration of 2 weeks. The customer may receive some or all of the output of the profiling phase to determine workloads for the playback phase.

In some embodiments, during the discovery phase 902 and/or the profiling phase 904, the existing network may be monitored using Netflow or other network software. In some embodiments, the existing network may include any number of hardware probes that assess data passing through network cables (e.g., optical cables) to further learn about the existing network. Further, in some embodiments, the existing network may include appliances and network devices that may monitor data flows within the network. The hardware probes, appliances, network software, and/or network devices may provide the logged information, monitored information, and/or reports to the CMR service system 785. The CMR service system 785 may collect and/or aggregate the information from any number of the sources (e.g., the hardware probes, appliances, network software, and/or network devices). The CMR service system 785 may identify applications, ports, virtual applications, storage devices, storage networks, configurations, network devices, and the like to assist with playback discussed herein. Further, the CMR service system 785 may utilize the received information to identify ports (as discussed herein) to configure software, hardware, and/or virtual network devices to ensure needed ports are open (and, optionally, to close any unneeded ports or ports that may represent a security risk).

During the playback phase 906, the CMR service system 785 may target workloads to target for the playback phase and plays back the workloads into a profile of different CSPs. In some embodiments, the CMR service system 785 may select one or more synthetic representative workloads as target workloads. In various embodiments, a user may select the one or more synthetic representative workloads as target workloads. It will be appreciated that, in some embodiments, all of the synthetic representative workloads are target workloads.

Figure 18B:
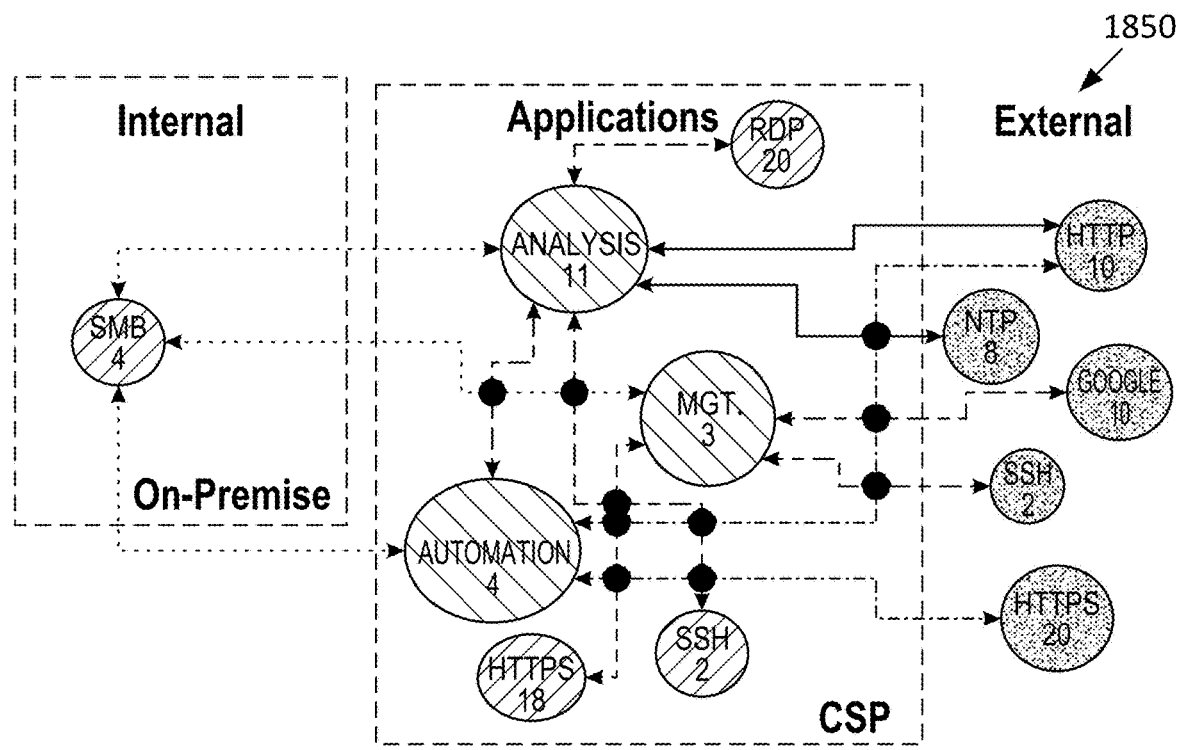
FIG. 18B depicts an example of an application's external and internal dependencies after migration according to some embodiments.

The output of the playback may be a simulated performance of the workload(s) on a particular CSP (or a variety of CSPs). The on-premises performance level is compared to the simulated performance, and costs estimates are re-calculated. Some example output of the playback phase 906 includes a synthetic workload cloud performance report, an updated candidate cloud configuration, and an updated candidate cloud configuration costs. The output of the playback phase 906 may be one or more recommendations of which workloads of the enterprise network to migrate to a CSP and which CSP may be best suited for the customer's needs. In some embodiments, the playback phase 906 may have a duration of 2 weeks. The customer may receive some or all of the output of the playback phase to determine workloads or applications to migrate to a CSP and a particular CSP to use. Diagram 1850 of FIG. 18B depicts an example of multiple application's external and internal dependencies after migration. As seen in diagram 1850, the CMR service system 785 may provide a recommendation to all internal applications except the SMB application to a cloud-based infrastructure.

The optional monitor phase 908 takes place after the customer migrates the workload or application to a CSP. During the monitor phase 908, the CMR service system 785 verifies that the applications' performance remains within acceptable levels. Some example outputs of the monitor phase may include cloud workload performance report and cloud configuration report, and post-migration recommendations. In one example, the monitor phase 908 may have a duration of 4 weeks. The customer may receive some or all of the output of the monitor phase, determine if fewer or more resources from the cloud infrastructure are required. Further details of each of the phases of the cloud migration readiness process 900 are discussed in FIGS. 10, 19, 24, and 27.

Figure 10:
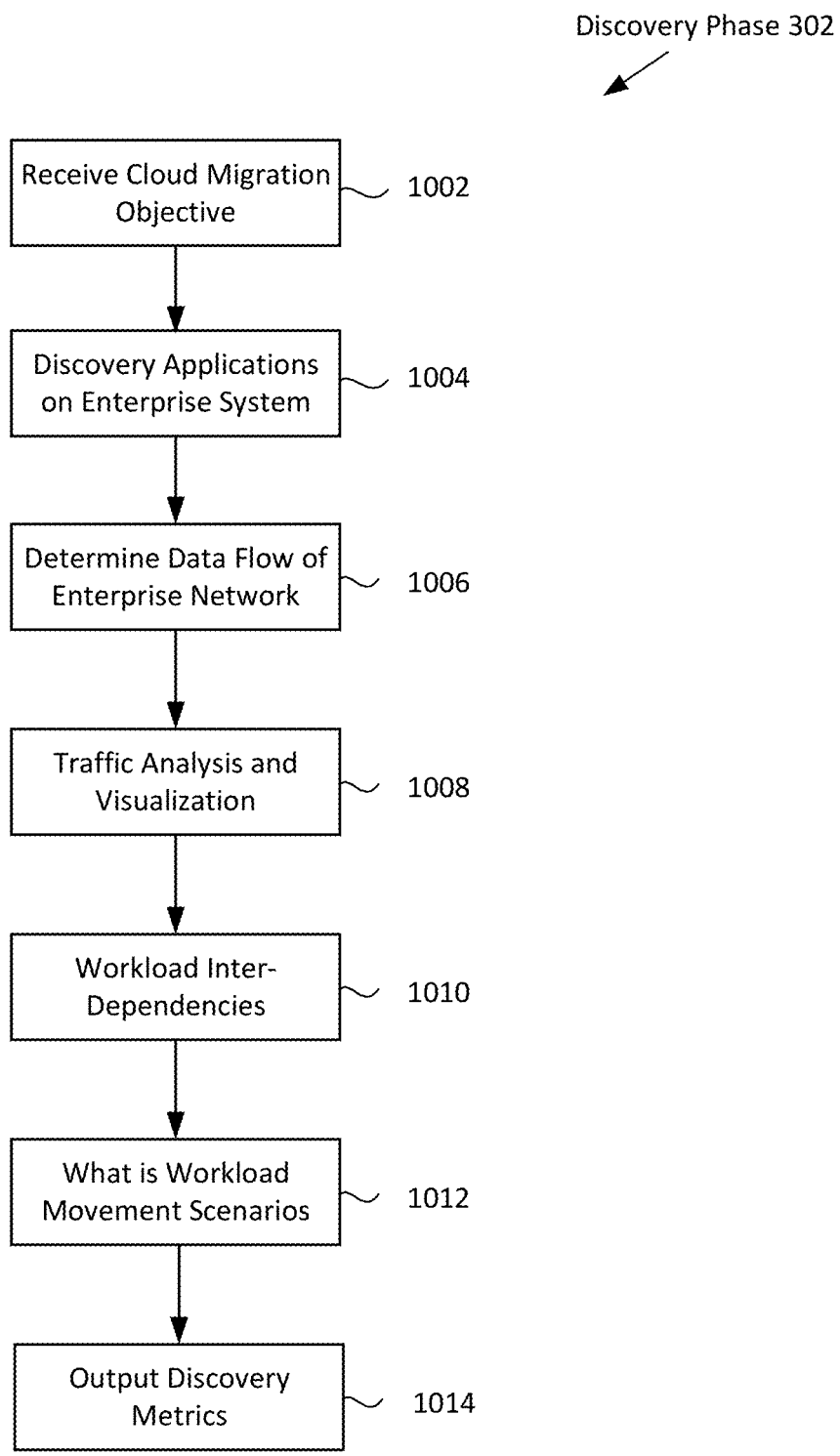
FIG. 10 depicts in further detail the discovery phase of the cloud migration process according to some embodiments.

FIG. 10 depicts in further detail the discovery phase 902 of the cloud migration process according to some embodiments. In step 1002, the input module 806 may receive one or more cloud migration objectives. Cloud migration objectives may include a request that the playback phase is completed before a particular date so that the enterprise may make a decision regarding the cloud migration of one or more applications of the enterprise network. In some embodiments, cloud migration objectives may include one or more choices of CSP or a required level of security for some or all of the applications or workloads that need to be migrated to a cloud infrastructure, a required level of performance for some or all applications or workloads that need to be migrated to the cloud infrastructure, and/or the like.

In various embodiments, the migration module 804 may create an inventory of workloads of the enterprise network 705. The migration module 804 may send a request to the reporting module 824 to provide an inventory table or inventory chart, documenting the workloads of the enterprise network's on-premises infrastructure. The inventory table may include the workloads' on-premises configuration, such as the number of virtual central processing units (vCPUs), memory size, and configured storage. The information collected may serve as a reference to understand the on-premise resource demands and requirements of the targeted workloads. One or more phases of the cloud migration readiness process may require at least some of the cloud migration objectives obtained in step 1002.

In step 1004, the CMR service system 785 may send a request to the application discovery system 780 to discover applications of the enterprise network 705. The application discovery system 780 may receive from the flow source discovery system 770 possible roles of network endpoints. These possible network endpoint roles may be used by the application discovery system 780 to discover applications through heuristic analysis. The output of the application discovery system 780 may be a list of applications on the enterprise network and entities of the enterprise system associated with each of the applications. The application discovery system 780 may send the list of applications to the application discovery interface module 808. The migration module 804 may send a request to the workload datastore 820 to create a workload entry for one or more applications in the list of applications received from the application discovery system 780. Further details of the application discovery process are discussed in FIG. 11.

In step 1006, the CMR service system 785 may send a request to the flow source discovery system 770 to determine one or more flows of data in the enterprise network. A flow in an enterprise network may represent communication between a source internet protocol (IP) address and a destination IP address. The output of the flow source discovery system 770 may include a list of flow source entries. The list of flow source entries may include attributes associated with discovered flow sources. Attributes may include the type of flow source, total byte count, incoming/outgoing byte count, incoming/outgoing bit rate, total packet rate, and/or incoming/outgoing endpoint count. In some embodiments, attributes associated with flow source entries may include applications associated with the flow source. The flow source discovery system 770 may send the list of flow source entries to the flow source discovery interface module 814. The migration module 804 may store the list of flow source entries to the flow source datastore 826. Further details of the flow source discovery process are discussed in FIG. 12.

Using data from the application discovery system 780 and the flow source discovery system 770, the CMR service system 785 may be able to create an on-premise inventory of workloads of the enterprise network 705. Workloads of the enterprise network 705 may be entities or applications of the enterprise network 705. In some embodiments, the reporting module 824 may provide to the customer an inventory table or inventory chart, documenting the workloads of the enterprise network's on-premises infrastructure. The inventory table may include the workloads' on-premises configuration, such as the number of virtual central processing units (vCPU), memory size, and configured storage. The information collected may serve as a reference to understand the on-premise resource demands and requirements of the targeted workloads.

Figures 13A, 13B:
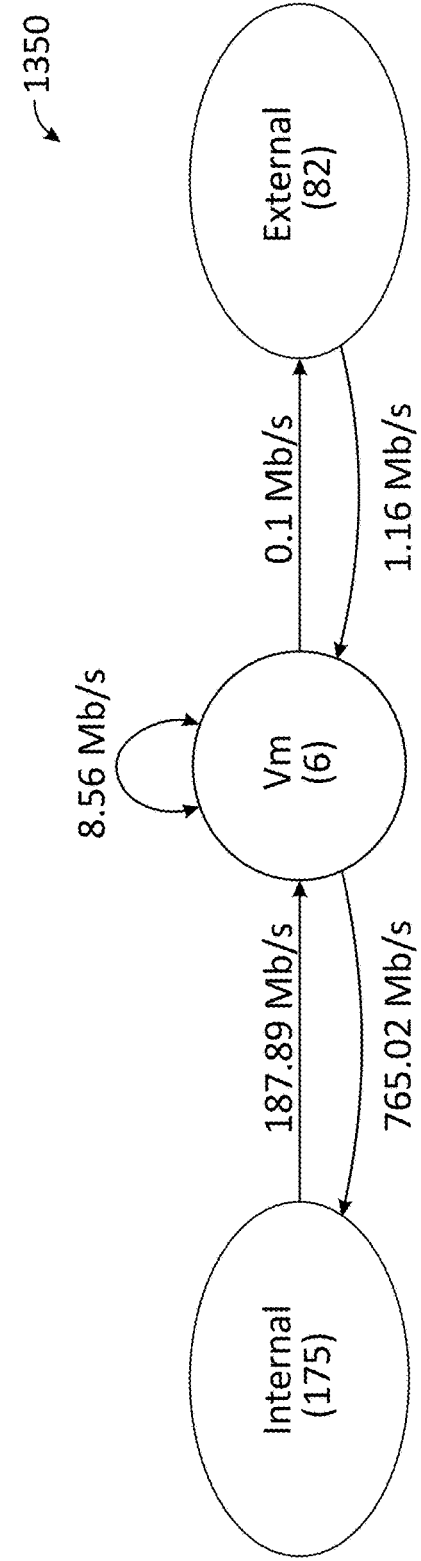
FIG. 13A is a chart depicting traffic dependency of internal and external network traffic according to some embodiments.
FIG. 13B is a diagram depicting the traffic dependency of internal and external network traffic according to some embodiments.

In step 1008, the traffic analyzing module 816 analyzes network traffic received from the flow source discovery system 770. The traffic analyzing module 816 may receive network traffic data from a "peak business" period. The peak business period may be a period of at least one week. The data received from the flow source discovery system may be stored in the flow source datastore 826. The traffic analyzing module 816 may determine the amount of data traffic that originates or terminates at a particular virtual machine or another entity of the enterprise network 705 and output this information to the customer in the form of a table or a graphic. An example of this output may be seen in FIGS. 13A and 13B. Example chart 1300 of FIG. 13A depicts the amount and type of traffic that goes through a particular virtual machine. Row 1310 depicts the amount of traffic between the particular virtual machine to external entities of the enterprise network 705—example output interface 1350 of FIG. 13B depicts the same information as the example chart 1300 of FIG. 13A. Virtual machine 1360 represents the particular virtual machine, while element 1370 represents all entities external to the enterprise network 705, which is in communication with the virtual machine 1360. Arrows 1380 and 1385 depicts the directional of the data traffic and the amount of data traffic.

In step 1010, the workload module 810 may identify any number of workloads of the enterprise network 705 and the interdependencies of those workloads. In some embodiments, the interdependencies may be utilized to assist in identifying workloads.

Figure 15:
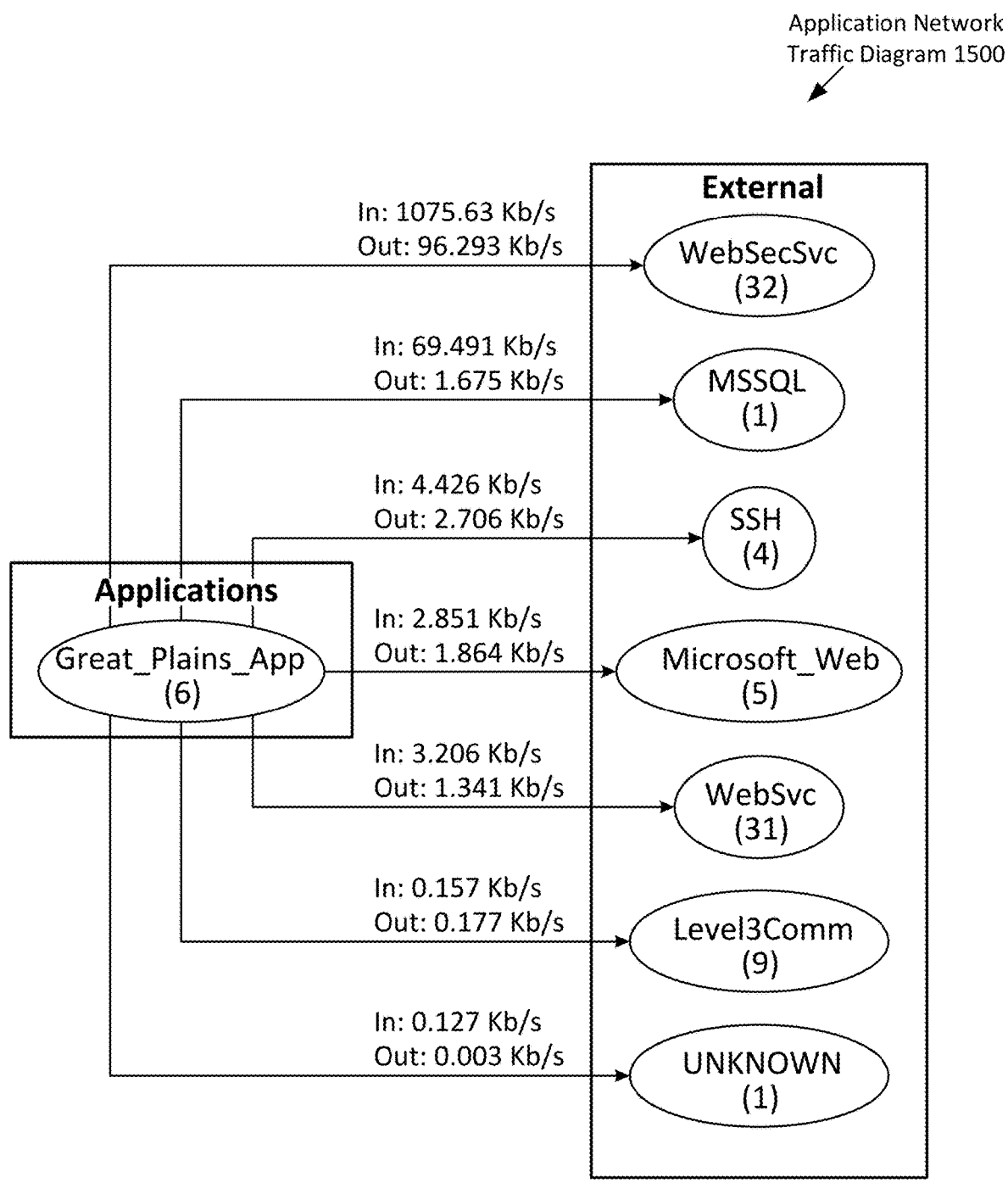
FIG. 15 is a diagram depicting an example application, external sources, and the amount of network traffic between the two according to some embodiments.

In some embodiments, the traffic analyzing module 816 may receive a request from the workload module 810 for network traffic between two or more workloads of the enterprise network 705. The workload module may determine the amount of data traffic that originates from a particular application of the enterprise network 705. Example application network traffic diagram 1500 of FIG. 15 depicts an example application, "Great_Plains_App," and the external entities with which this application may communicate. Furthermore, the example application network traffic diagram 1500 depicts an average amount of network traffic that originates or terminates at the "Great_Plains_App" application.

When the workload module 810 identifies a workload, the workload module may send a request to the workload datastore 820 to create a workload entry. Each workload entry may include metrics or attributes associated with the workload. The attributes of the workload may depend on what the workload represents. For example, if the workload represents a virtual machine, the attributes of the workload may include attributes of the virtual machine such as maximum read speed, maximum write speed, central processing unit (CPU) MHz, memory utilization percentage, storage demand, and IOPS.

Figure 16A:
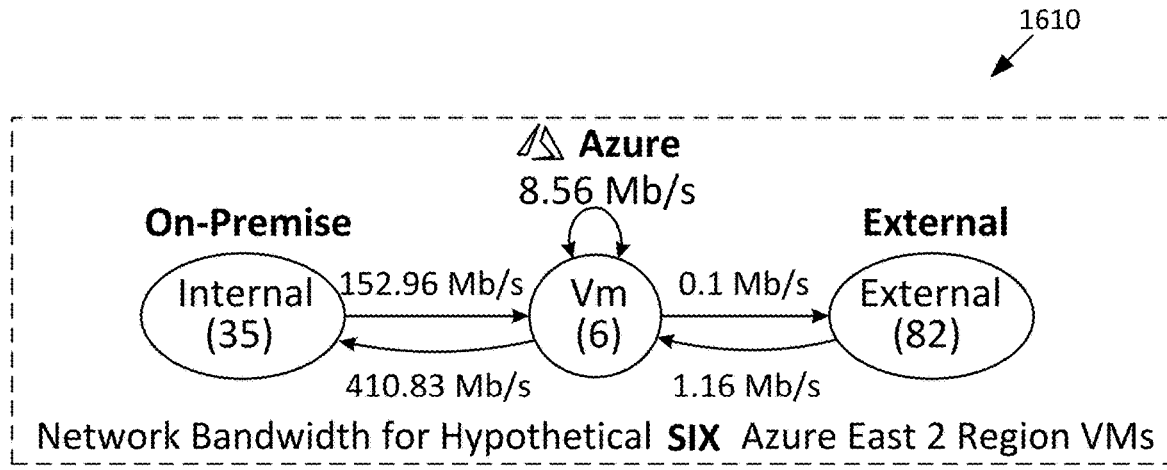
FIG. 16A depicts three examples of "what if" workload movements scenario according to some embodiments.
Figure 16A:
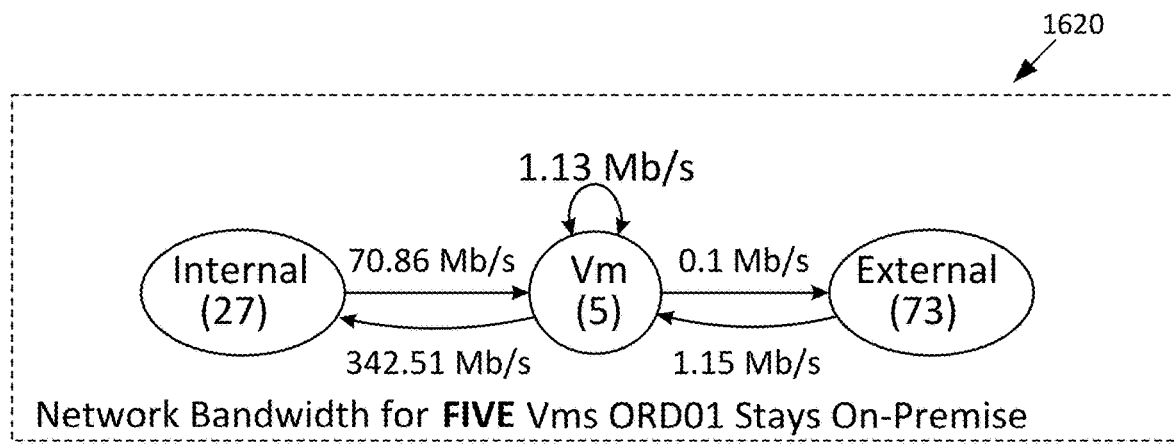
Figure 16A:
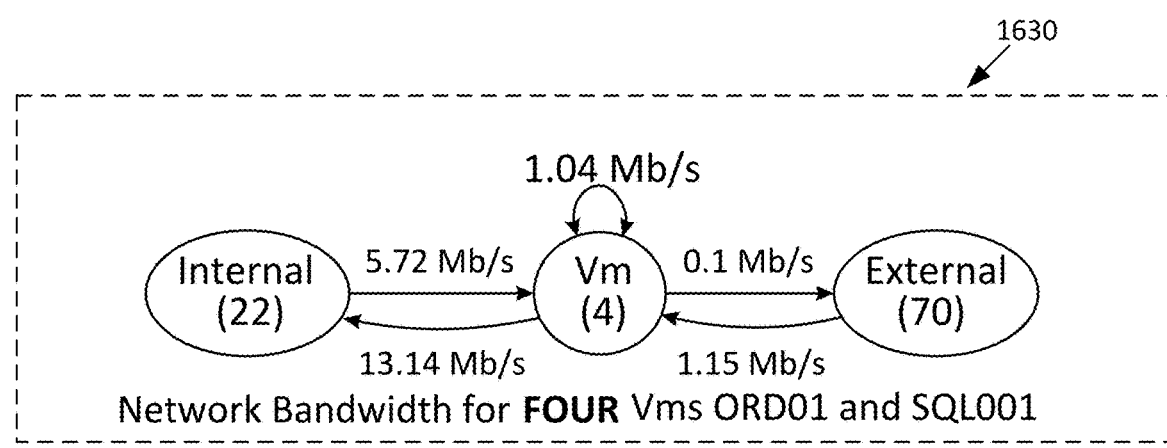

In optional step 1012, the workload module 810 may generate "what if" workload movement scenarios, which exposes possible scenarios to aid in deciding to migration one or more workloads based on their bandwidth consumption, dependency on other workloads, and the potential cost associated with which scenario or cloud-on premises network configurations—for example, FIG. 16A depicts three examples of "what if" workload movement scenarios.

Figure 16B:
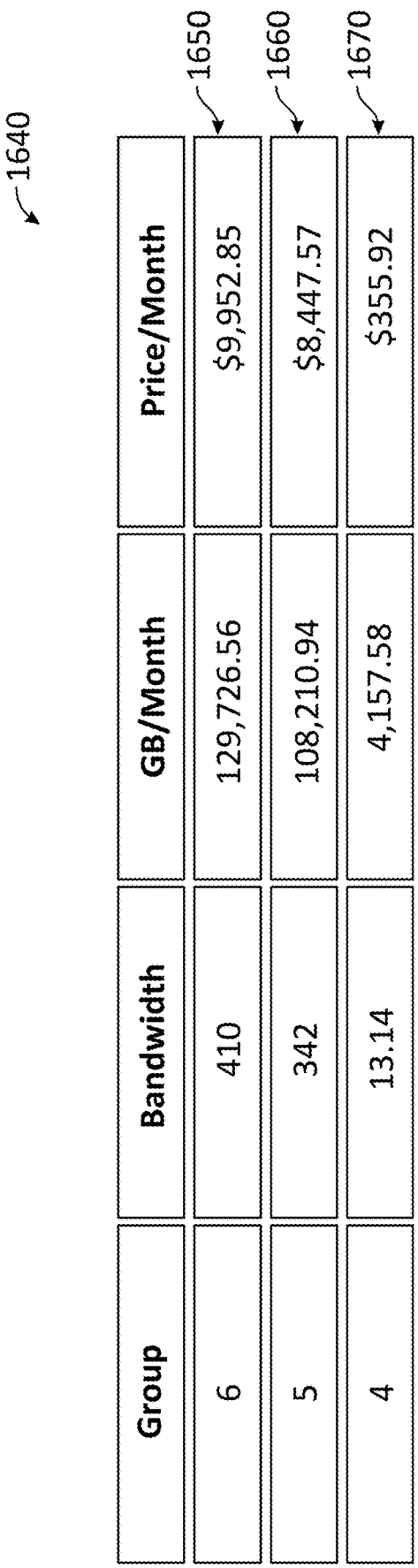
FIG. 16B is a chart depicting the bandwidth and cost associated with each of the "what if" workload movement scenarios of FIG. 16A.

In "what if" scenario 1610, six workloads were chosen to be hypothetically moved to a cloud-based infrastructure such as Microsoft Azure. The workload module 810 may determine the bandwidth requirement for these six virtual machines. The workload module 810 may determine the sum of the amount of network traffic between the six virtual machines, the amount of incoming and outgoing network traffic between any one of the six virtual machines and other virtual machines or entities of the enterprise network 705, and the amount of incoming and outgoing network traffic between any one of the six virtual machines and other entities outside the enterprise network. The sum of these may determine the bandwidth requirement of the six virtual machines. The workload module 810 may send a request to the cloud service provider profile datastore 822 for the Azure CSP profile entry. The workload module 810 may determine the memory storage requirement, the required type of security, and cost per gigabyte to estimate the cost of storing the six workloads into Azure. The reporting module 824 may receive a request from the workload module 810 to provide an estimated cost per month of storing the "what if" scenario 1000 in Azure. Row 1650 of chart 1640 of FIG. 16B provides the estimated cost per month of storing the "what if" scenario 1000 in Azure, along with the bandwidth requirement of the six virtual machines.

In "what if" scenario 1620, five workloads were chosen to be hypothetically moved to Microsoft Azure. The workload module 810 may determine the bandwidth requirement for these five virtual machines. The workload module 810 may determine the sum of the amount of network traffic between the five virtual machines, the amount of incoming and outgoing network traffic between any one of the five virtual machines and other virtual machines or entities of the enterprise network 705, and the amount of incoming and outgoing network traffic between any one of the five virtual machines and other entities outside the enterprise network. The sum of these may determine the bandwidth requirement of the five virtual machines. The workload module 810 may send a request to the cloud service provider profile datastore 822 for the Azure CSP profile entry. The reporting module 824 may receive a request from the workload module 810 to provide an estimated cost per month of storing the "what if" scenario 1020 in Azure. Row 1660 of chart 1640 of FIG. 16B provides the estimated cost per month of storing the "what if" scenario 1020 in Azure, along with the bandwidth requirement of the five virtual machines.

In "what if" scenario 1630, four workloads were chosen to be hypothetically moved to Microsoft Azure. The workload module 810 may determine the bandwidth requirement for these four virtual machines. The workload module 810 may determine the sum of the amount of network traffic between the four virtual machines, the amount of incoming and outgoing network traffic between any one of the four virtual machines and other virtual machines or entities of the enterprise network 705, and the amount of incoming and outgoing network traffic between any one of the four virtual machines and other entities outside the enterprise network. The sum of these may determine the bandwidth requirement of the four virtual machines. The workload module 810 may send a request to the cloud service provider profile datastore 822 for the Azure CSP profile entry. The reporting module 824 may receive a request from the workload module 810 to provide an estimated cost per month of storing the "what if" scenario 1030 in Azure. Row 1670 of chart 1640 of FIG. 16B provides the estimated cost per month of storing the "what if" scenario 1030 in Azure, along with the bandwidth requirement of the four virtual machines.

In step 1014, the reporting module 824 may receive a request from the workload module 810 to provide one or more of the targeted workload inventory, target workload dependency matrices, and a baseline assessment of the health, utilization, and performance aspects of the workloads' on-premises infrastructure. Examples of the output of the discovery phase 902 can be seen in FIG. 13A through 11C. Based on the "what if" scenarios and other output of the discovery phase 902, the IT administrator of the enterprise network 705 may identify and fine-tune applications or workloads to target for cloud migration.

Figure 11:
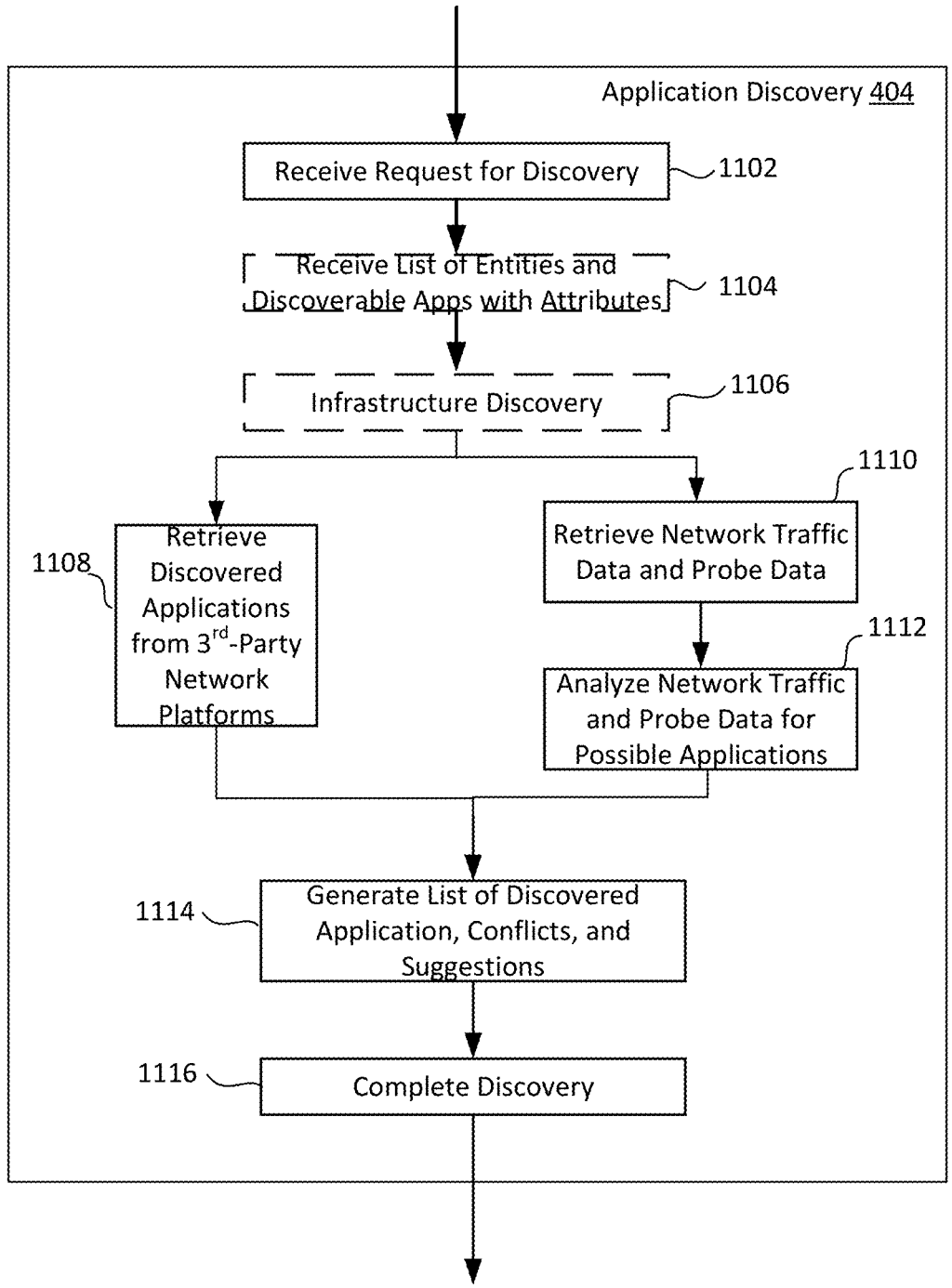
FIG. 11 depicts in further detail an application discovery step of the discovery phase according to some embodiments.

FIG. 11 depicts in further detail an application discovery step of the discovery phase according to some embodiments. In step 1102, the application discovery system 780 may function to determine if one of a plurality of trigger conditions is satisfied. The application discovery system 780 may receive a notification or indication that one of the plurality of trigger conditions has been satisfied. The trigger conditions may include a request to commence the application discovery process, a current time equaling a start time of a scheduled application discovery process, a signal, or resource utilization of one or more entities if less than an entity utilization threshold.

In optional step 1104, the application discovery system 780 may receive from the IT administrator a list of applications running on the enterprise network 705 and entities of the enterprise network 705 associated with each of the plurality of applications. In some embodiments, the application discovery system 780 is configured to receive attributes of any number of the applications running on the enterprise network 705 and attributes of each of the entities associated with each of the plurality of applications.

In various embodiments, the application discovery system 780 may create and store any number of discovered application entries based on information received from the IT administrator.

In optional step 1106, the application discovery system 780 determines the infrastructure of the enterprise network 705. In some embodiments, the application discovery system 780 discovers attributes of any number of entities of the enterprise network 705 and creates and stores entity entry. Building an infrastructure of the enterprise network 705 may aid users of the application discovery system 780 with a visual representation of the infrastructure in the context of key applications of the enterprise.

In step 1108, the application discovery system 780 may receive data regarding applications; the data received regarding the application may include attributes of the application, such as the name, the number of entities making up the application, the tier mapping of the application. The data received regarding the application may include attributes of each of the entities associated with the application. Attributes of the entities may include entity category, entity type, speed of the channel, and alarms. Some entity attributes may be dependent on the type of entity; for example, fiber channels may have an attribute describing the speed of the channel.

The application discovery system 780 may receive data from the IT management software platform subscribed to by the enterprise network 705, such as ServiceNow. In various embodiments, the application discovery system 780 may receive data regarding discovered applications from other IT management software platforms. In various embodiments, the application discovery system 780 may create or update entity entries with data received from ServiceNow or other IT management software platforms.

In some embodiments, if the application discovery system 780 discovers that a particular application has not changed in the last number of iterations of the application discovery process. In such a case, the application discovery system 780 may choose to limit the application discovery process to avoid re-identification and/or re-discovery of a subset of applications periodically. In various embodiments, the number of iterations which triggers the periodic discovery of an application may change according to attributes of the particular application, such as tier or criticality of the particular application.

The application discovery system 780 may receive data from application performance software platforms subscribed to by the enterprise network 705, such as AppDynamics. The application discovery system 780 may create or update entity entries with data received from AppDynamics or other application performance software platforms.

In some embodiments, if the application discovery system 780 discovers that a particular application has not changed in the last number of iterations of the application discovery process. In such a case, the application discovery system 780 may choose to identify or discover the application periodically. In various embodiments, the number of iterations which triggers the periodic discovery of an application may change according to attributes of the particular application, such as tier or criticality of the particular application.

In step 1110, the application discovery system 780 may receive a request from the flow source discovery system 770 to accept flow records between two IP addresses. The application discovery system 780 may receive flow records from switches that enable a network protocol that provides the ability to collect IP network traffic using software such as NetFlow. These flow records may be analyzed by the application discovery system 780 to determine possible network endpoints and possible applications on the enterprise network 705.

In some embodiments, the application discovery system 780 retrieves flow records from NetFlow during scheduled retrieval periods. In various embodiments, the application discovery system 780 retrieves flow records when the application discovery system 780 determines that the utilization of switches enabled with the NetFlow software is below the entity utilization threshold.

In some embodiments, the application discovery system 780 receives flow data to and from storage devices 710. Probe data may include IP address, probe type, network address, speed of the channel and status of the probe, number of CPUs, operating system (OS) version, and applications running on the host.

In step 1112, the application discovery system 780 may receive the network traffic data from the network traffic analyzing software platform 750. In some embodiments, the application discovery system 780 suggests, based on heuristic implications, applications that could exist. The result of the implications may be a possible discovered application. For example, the application discovery system 780 may observe that a particular IP address is the flow source/destination to/from thousands of seemingly random IP addresses and determine that the particular IP address belongs to an edge device.

In another example, through SSH or WMI, the application discovery system 780 may determine that one of the host 720 of the enterprise network 705, which is part of the SAP, is running out-of-date software, however, that particular host 720 may have been replaced with different software. The out-of-date software may not have been removed from one of the host 720. The attributes of the SAP application, as well as attributes associated with the out-of-date software running on one of the host 720, may be sent to the application discovery system 780.

In various embodiments, the application discovery system 780 may perform a heuristic analysis of the attributes of any number of entities of the enterprise network 705. Attributes may include the name of the entity when an entity was introduced to or became a part of the enterprise network 705. Attributes may be used to determine if any number of entities is a part of an application. For example, entities with names containing a prefix or suffix that are the same may be a part of the same application.

In some embodiments, a time when entities of the enterprise network are introduced into the enterprise network may be analyzed and compared with an entity's introduction threshold that may be used to determine potential applications. For example, entities introduced to the enterprise network 705 within the entity's introduction threshold of 5 minutes may be part of the same application; in either case, the application discovery system 780 may create a discovered application entry for each of the potential applications. The entities' introduction threshold may be set by the IT administrator or may be set by the application discovery system 780. In various embodiments, the application discovery system 780 may suggest that two particular entities of the network may comprise an application if the two particular entities are in constant contact throughout the day, with the amount of IP traffic passing back and forth between the two particular entities is more than any other pair of entities of the network.

In step 1114, the application discovery system 780 outputs a list of discovered application entries and/or a plurality of entity entries. The application discovery system 780 may output any number of the discovered application entries in the form of a chart, with each discovered application entry as well as application attributes displayed in text form. In some embodiments, entities associated with each discovered application, as well as attributes associated with each entity, may be displayed in text form.

Attributes of the discovered application entry output by the application discovery system 780 may include the software platform responsible for the application associated with the discovered application entry. Other attributes include tier mapping of applications discovered by different networks, names of the application. Attributes of the entities may include entity category, entity type, speed of the channel, and/or alarms. Some entity attributes may be dependent on the type of entity; for example, fiber channels may have an attribute describing the speed of the channel.

In some embodiments, an application conflict may be provided by the application discovery system 780 to the IT administrator to be resolved. Consider an example, if AppDynamics identifies a first SAP application with eight entities, including three cloud-based storage devices and four locally-based storage devices. The application discovery system 780 implies a second SAP application with the same eight entities, including the three cloud-based storage devices and the four locally-based storage devices, as the first SAP application plus an additional cloud-based storage device, which is not shown in the first SAP application. The discovered application entry may be created for each of the SAP application, and the application conflict may be outputted by the application discovery system 780. The application conflict may be resolved by the IT administrator.

In various embodiments, the application discovery system 780 may resolve the conflict without assistance from the IT administrator. In various embodiments, the application discovery system 780 may resolve the conflict by using the tier mapping of software platforms. For example, the IT administrator may choose to prioritize applications discovered by ServiceNow over applications discovered by AppDynamics, such that if there is an application conflict between applications discovered by ServiceNow and AppDynamics, the conflict will be automatically resolved by the application discovery system 780 by choosing the application discovered by ServiceNow as the correct one.

Once entities of the enterprise network 705 have been identified, data from the network software platforms and network probes may have been received and analyzed by the application discovery system 780, and the application discovery process may proceed to step 1116. In step 1116, an iteration of the application discovery process is complete. The output of the application discovery system 780 may output to the CMR service system 785 a list of application entries on the enterprise network 705, and entities of the enterprise system associated with each of the applications.

In some embodiments, the iteration application discovery process may be deemed as complete after the application discovery system 780 receives data from software platforms and network probes for a predetermined period of time. In some embodiments, the predetermined period of time is seven days. In various embodiments, the predetermined period of time is 24 hours. In one embodiment, the predetermined period of time is set by the IT administrator. In some embodiments, the iteration application discovery process may be deemed as complete if the application discovery system 780 determines that a duplicated application counter is greater than a duplicated application threshold.

Other details and feature values of the application discovery process may be to suspend the application discovery process and creating a bookmark of the last network data received from the network traffic monitoring platform, a request to suspend the application discovery process may be triggered when a suspension trigger condition is satisfied, for example, which may be combinable with those described here, can be found in U.S. patent application Ser. No. 16/234,353, filed on Dec. 27, 2018; the contents of which are hereby incorporated by reference in its entirety.

Figure 12:
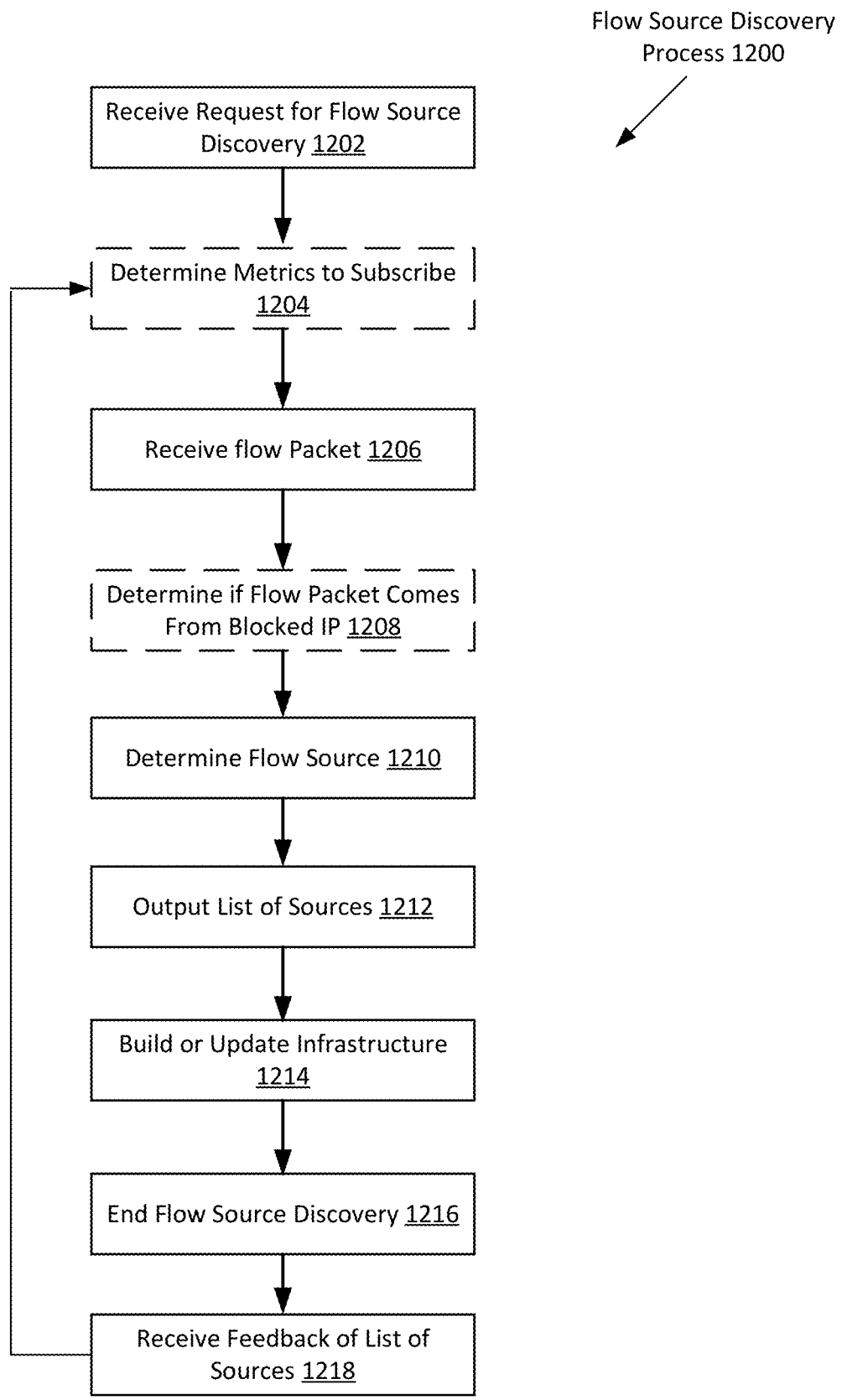
FIG. 12 depicts in further detail a flow source discovery of the discovery phase according to some embodiments.

FIG. 12 depicts a flowchart of a flow source discovery process 1200 of an enterprise network according to some embodiments. In step 1202, the flow source discovery system 770 may execute the flow source discovery. In some embodiments, the flow source discovery system 770 may receive a request to start the flow source discovery process when any number of trigger conditions are satisfied. For example, if a current time equals a predetermined start time, a trigger condition may be satisfied.

In optional step 1204, the flow source discovery system 770 may determine any number of attributes and/or metrics of discovered flow sources to monitor and provide. The flow source discovery system 770 may provide a set of attributes of discovered flow sources. The set of attributes and/or metrics may include the type of flow source, total byte count, incoming/outgoing byte count, incoming/outgoing bit rate, total packet rate, and/or incoming/outgoing endpoint count. In the subsequent flow source discovery process, the flow source discovery system 770 may monitor and output a subset of attributes of discovered flow sources.

In step 1206, the flow source discovery system 770 may receive IP network traffic data from any number of network traffic analyzing software platform 750 and/or TAP 740. The IP network traffic data may be in data packets. Data packets collected from different routers and switches with different network traffic analyzing software platforms may be in different formats. In some embodiments, the flow source discovery system 770 may store any number of the data packet entries associated with each of the data packets received from the network traffic analyzing software platform 750.

In optional step 1208, the flow source discovery system 770 may determine any number of entities of the switch fabric to monitor. In an initial flow source discovery process, the flow source discovery system 770 may analyze flow records associated with all entities of the switch fabric. In response to the output of the initial flow source discovery process, the flow source discovery system 770 may receive from the IT administrator of the enterprise network 705 a list of entities of the switch fabric that the IT administrator would like to continue monitoring. The flow source discovery system 770 may store the list. In the subsequent flow source discovery process, the flow source discovery system may ignore or reject flow records from entities of the switch fabric not listed in the first list.

In step 1210, the flow source discovery system 770 may analyze any number of received data packets and determine a flow source of flow records. In some embodiments, the flow source discovery system 770 does not begin to analyze any number of data packets until the end of the time frame. In various embodiments, the flow source discovery system 770 analyzes any number of data packets as it is being received by the flow source discovery system 770.

In step 1212, the flow source discovery system 770 may provide any number of flow source entries to an interface or report. For example, the flow source discovery system 770 may provide any number of flow source entries in the form of a chart, with each discovered flow source entry as well as attributes associated with discovered flow sources displayed in text form. In some embodiments, entities of the enterprise network 705 found along the data path associated with the discovered flow source entry, as well as attributes associated with each entity, may be displayed in text or in the form of an infrastructure topology view.

In step 1214, the flow source discovery system 770 may build or update the infrastructure of the enterprise network 705. In some embodiments, as any number of flow source entries are created or updated, the flow source discovery system 770 may obtain more information regarding the connectivity of entities of the enterprise network 705.

The flow source discovery system 770 may provide other information besides the connectivity of entities in the enterprise network 705. For example, the representation of entities of the enterprise network 705 may include alarms or alerts associated with one or more entities.

In some embodiments, once initiated, the flow source discovery process may continue until it is completed. In step 1216, the flow source discovery system 770 may determine that the flow source discovery process is complete after retrieving traffic data from the one or more network traffic analyzing software platform for a fixed interval of time. In various embodiments, the flow source discovery system 770 may determine that the flow source discovery process is complete when the flow source discovery time frame is over.

In step 1218, in response to the displaying or report any number of flow source entries, the flow source discovery system 770 may receive information from the IT administrator. The received feedback may include a first list containing any number of entities of the switch fabric that the IT administrator wants to continue monitoring. In some embodiments, the received feedback includes a second list containing any number of attributes of the switch fabric which the IT administrator would like to continue monitoring.

The second list may be used in optional step 1204 to determine any number of attributes or metrics of discovered flow sources to monitor and provide in subsequent flow source discovery processes. The first list may be used in step 1208 to determine any number of entities of the switch fabric to monitor and provide in subsequent flow source discovery processes.

Other details and feature values of the flow source discovery process may be to suspend the flow source discovery process may further comprise identifying a flow packet as belonging to one of at least two flow package types based on a format, for example, which may be combinable with those described here, can be found in U.S. patent application Ser. No. 16/234,402, filed on Dec. 27, 2018; the contents of which are hereby incorporated by reference in its entirety.

Figure 19:
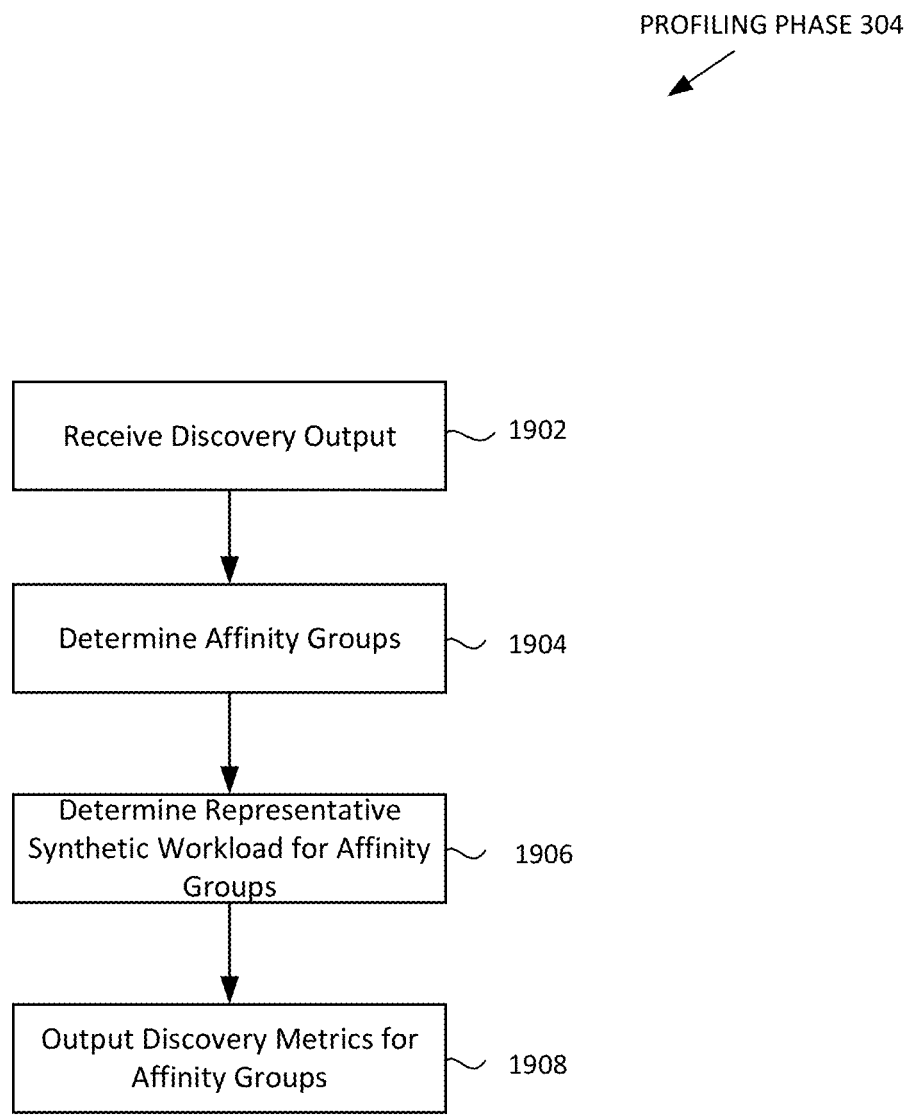
FIG. 19 depicts in further detail the profiling phase of the cloud migration process according to some embodiments.

FIG. 19 depicts in further detail the profiling phase 904 of the cloud migration process according to some embodiments. During the profiling phase 904, analytics are applied to the workloads that were characterized during the discovery phase 902. Depending on the organization's goals, the number of workloads under consideration may range from hundreds to thousands. In some embodiments, the first step in the profiling phase 904 may be to utilize the workload characterization data (e.g., attributes) to produce affinity groups.

The workload characterization or attribute data may include, for example, CPU, memory, IO, and network utilization for all or some on-premise workloads that have been targeted for migration to the cloud.

The affinity groups may each include workloads with similar resource utilization levels and temporal (time-based) characteristics. In some embodiments, the affinity group module 812 associate workloads into groups based on their utilization levels. It may be appreciated that the workloads may be associated with groups in many different ways.

In step 1902, the migration module 804 may send a request to the workload datastore 820 for the workloads discovered in the discovery phase 902. The discovery output may include workload characteristics and interdependencies among compute, network, and storage elements of an on-premises enterprise system.

In step 1904, the affinity group module 812 may categorize workloads identified by the workload module 810 into affinity groups. In some embodiments, the affinity group module 812 may receive performance metrics. In some embodiments, performance metrics may include utilization metrics. It will be appreciated that the metrics may be independent of any cloud service provider.

Utilization metrics may be received from any number of different sources. In some embodiments, the utilization metrics and measurements may be reported from applications, virtual machines, hypervisors, operating systems, applications, servers, or third-party performance service providers (e.g., NetFlow or ServiceNow). In some embodiments, the utilization metrics may include any number of the following:
1. CPU Utilization
2. Memory Utilization
3. IO Read Utilization
4. IO Writes Utilization
5. IO Number of Reads
6. IO Number of Writes
7. Network Receive Rate
8. Network Transmit Rate Affinity groups may consist of workloads with similar resource utilization levels and temporal or time-based characteristics. For example, workloads with similar CPU utilization, IO number of reads, and IO number of writes may be grouped into the same affinity group. In some embodiments, a workload may belong to more than one affinity group. In other embodiments, each workload may only belong to one affinity group.

In one method, the CMR service system 785 may utilize a machine learning algorithm to categorize or group workloads into affinity groups. In some embodiments, the workload module may apply a k-means clustering algorithm to the multiple workloads identified by the workload module 810. The k-means clustering algorithm may have a feature set represented by average, a percentile of maximum values of utilization metrics. In some embodiments, utilization metrics include CPU utilization, memory utilization, input/out (TO) read utilization, IO write utilization, IO number of reads, IO number of writes, network receive rate, and network transmit rate.

In some embodiments, the CMR service system 785 applies a k-means clustering algorithm with a feature set represented by average, the percentile of maximum values of the utilization metrics. This method may be independent of the cloud service provider and relies solely on the performance of the workloads.

K-means clustering aims to partition n observations into k clusters in which each observation belongs to the cluster with the nearest mean, serving as a prototype of the cluster. This results in a partitioning of the data space into Voronoi cells. K-means minimizes within-cluster variances such as squared Euclidean distances.

In one example, given a set of utilization metrics measurements $(x_1, x_2, \ldots, x_n)$, where each utilization metrics measurement is a d-dimensional real vector, the affinity group module 812 may utilize k-means clustering to partition the n utilization metrics measurement into k ($\leq$n) sets $S=\{S_1, S_2, \ldots, S_k\}$ so as to minimize the within-cluster sum of squares (WCSS) (i.e., variance). The objective may be to find:

$$\arg_s \min \sum_{i=1}^{k} \sum_{x \in S_i} \|x - \mu_i\|^2 = \arg_s \min \sum_{i=1}^{k} |S_i| VARS_i$$

where $\mu_i$ is the mean of points in $S_i$.

In another method, the affinity group module 812 groups workloads by their maximum or percentile utilization metric fitness into available cloud instances for a specific CSP. This method may be utilized when a particular CSP to use has already been determined. There can be other methods achieving the same goal of grouping workloads in addition to the two described above. As a result of such grouping, selection of a cloud instance for a group means selection of the cloud instance for all members of the group and, thus, a process of selecting thousands of instances and verification of the performance is reduced to selection and verification of several dozens of instances.

Once the affinity group module 812 determines the workloads that belong to each affinity group, the affinity group module 812 may determine the representative synthetic workload for each affinity group. The representative synthetic workload may reduce playback time by capturing relevant utilization attributes of the workloads within an affinity group.

In one example, time slices of a predetermined time duration (e.g., between 30 min-60 min long) may be selected containing the maximum performance values for each of the metrics among all virtual machines within the affinity group. A time slice may have statistics on all metrics for a chosen virtual machine containing a maximum value of a specific metric. Next, the selected time slices may be concatenated to build a synthetic representative workload for an affinity group. It may be constructed by concatenating temporal segments of various workloads to preserve relevant utilization levels for the group. The result is a high-fidelity synthetic representation of the hundreds or thousands of workloads.

It may be appreciated that armed with synthetic representative workloads, the number of workloads that require verification in the cloud is significantly reduced. The complexity and scale are condensed to a manageable set without losing the original and critical characteristics of the on-premise workloads.

The representative synthetic workload for each affinity group may be a sum of the multiple workloads which make up the affinity group. In various embodiments, the representative synthetic workload for each affinity group may be a weighted sum of the multiple workloads which make up the affinity group, with each of the multiple workloads given a weight based on attributes or characteristics of the workload. In some embodiments, the affinity group module 812 may send a request to the workload datastore 820 to store the representative synthetic workload associated with each affinity group.

The affinity group module 812 may generate a table or chart which comprises temporal data capturing utilization level for some or all of the utilization metrics during a temporal data capture period. An example of this may be seen in FIG. 21. Table 2100 of FIG. 21 contains temporal data capturing utilization levels of two example workloads of the enterprise network 705. The columns of the example table 2100 are associated pairs of date/time of data and the name of the workload that is being monitored by the infrastructure performance management appliance 760 for a particular utilization metric. The number of column pairs is equal to the number of workloads being monitored by the workload module 810. For example, column 2110 provides a timestamp for measuring the particular utilization metric, while column 2120 provides the measurement for the particular utilization metric associated with the timestamp in the same row.

Once the affinity groups have been created, step 1906 may proceed. In step 1906, the CMR service system 785 may utilize a machine learning algorithm to create a representative synthetic workload for each affinity group. The representative synthetic workload may reduce the time required to playback or simulate the workload on a CSP profile by capturing relevant utilization attributes of the workloads within an affinity group.

As discussed herein, the affinity group module 812 may select a workload time slice which contains the maximum performance values for each of the utilization metric among all virtual machines within the affinity group. In some embodiments, the workload time slice is predetermined by the CMR service system 785. In one embodiment, the workload time slice is between 30 to 60 minutes long. A workload time slice has statistics on all metrics for a chosen virtual machine containing a maximum value of a specific metric. A particular affinity group may have workload time slices of different lengths taken at different time frames of the temporal data capture period. For example, for a particular affinity group, the workload time slice containing a maximum value for memory utilization may be a 30-minute time slice taken on Monday between 9:00 a.m. and 9:30 a.m. For the same affinity group, the workload time slice containing a maximum value for CPU utilization may be a 45-minute time slice taken on Tuesday between 4:30 p.m. and 5:15 p.m. In various embodiments, a particular affinity group may have workload time slices of the same length taken at the same time frame of the temporal data capture period. For example, for the same affinity group, the workload time slice containing a maximum value for all utilization metrics may be a 60-minute time slice taken on Friday between 11:00 a.m. and 12:00 p.m. All selected time slices are concatenated to build a representative synthetic workload for an affinity group. It is constructed by concatenating temporal segments of various workloads to preserve relevant utilization levels for the group. The result is a high-fidelity synthetic representation of the hundreds or thousands of workloads. Armed with representative synthetic workloads, the number of workloads that require verification in the cloud is significantly reduced. The complexity and scale are condensed to a manageable set without losing the original and critical characteristics of the on-premise workloads.

Figure 20:
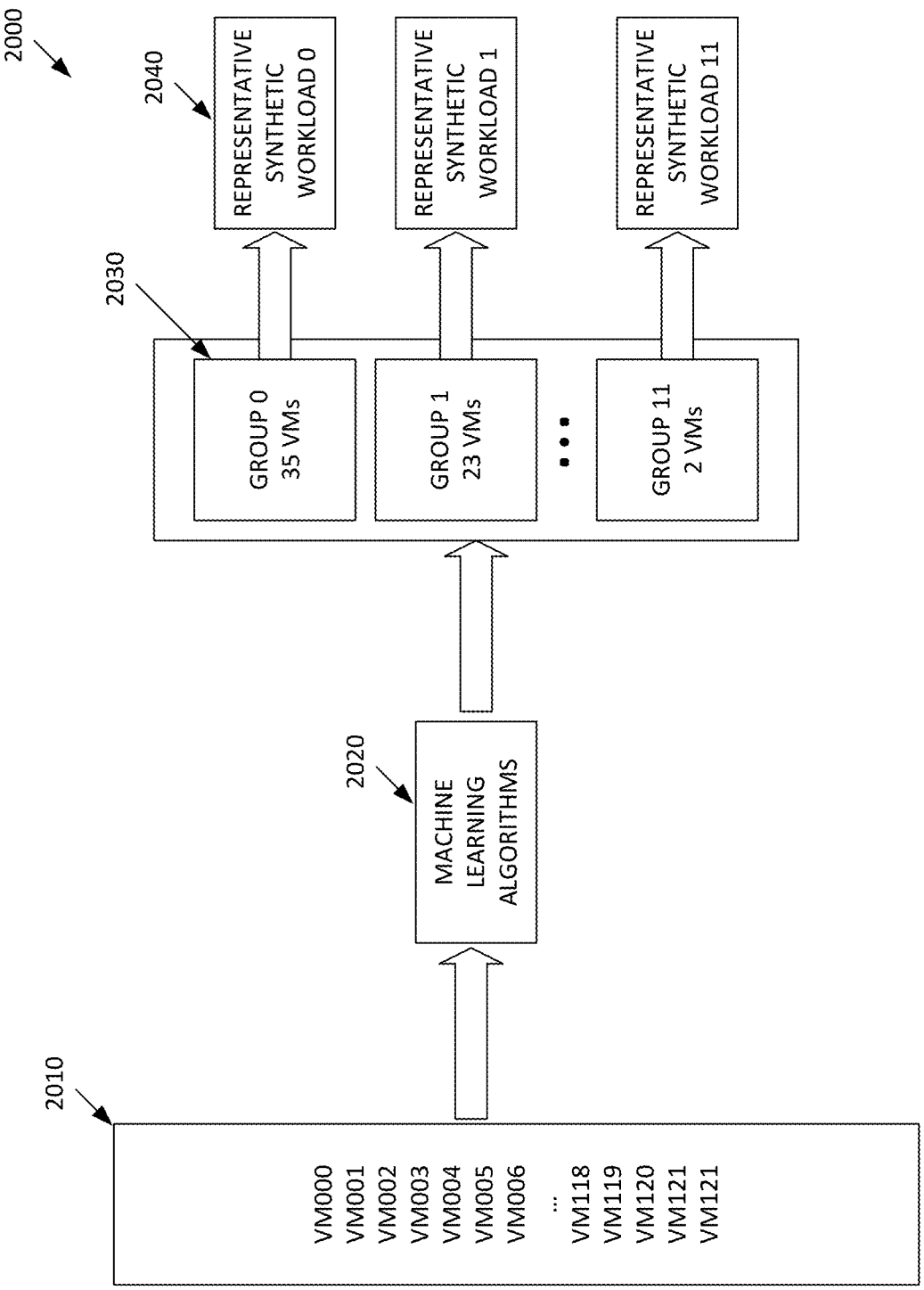
FIG. 20 depicts affinity groups and representative synthetic workloads of the enterprise network according to some embodiments.
Figure 22:
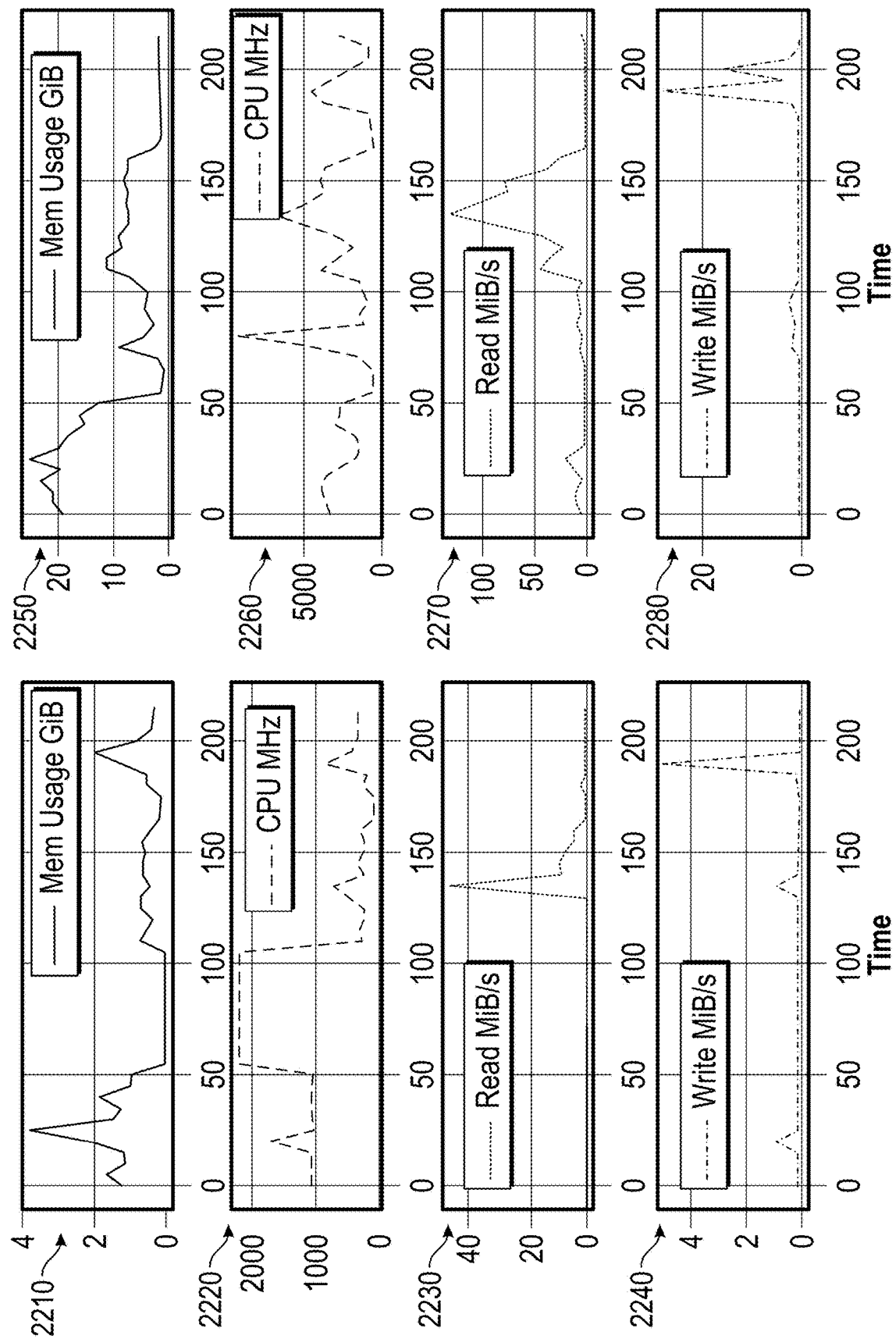
FIG. 22 depicts graphical charts of network traffic metrics of two example representative synthetic workloads according to some embodiments.

An example of affinity groups may be seen in FIG. 20, which depicts affinity groups and representative synthetic workloads of the enterprise network according to some embodiments. Area 2010 represents all virtual machines discovered by the CMR service system 785 in the enterprise network 705. Through machine learning algorithms 2020, the virtual machines are grouped into multiple affinity groups, such as affinity group 0 2030, which includes 35 virtual machines and representative synthetic workload 0 2040. FIG. 22 depicts graphical charts of network traffic metrics of two example representative synthetic workloads according to some embodiments. For example, charts 2210 through 2240 depict utilization metrics of a 4-hour workload for one affinity group, the utilization metrics include memory usage, CPU utilization, read speed, and write speed. Charts 2250 through 2280 depict the same utilization metrics of the 4-hour workload for another affinity group.

In step 1908, the reporting module 824 may receive a request from the workload module to provide one or more of a synthetic workload performance report, candidate cloud configuration, and candidate cloud configuration cost. Examples of the output of the profiling phase 904 can be seen in FIG. 20 through 17.

Based on the representative synthetic workloads and the on-premises inventory configurated determined during the discovery phase of the cloud migration readiness process, the workload module 810 may select an initial cloud configuration and estimate the cost of migrating the representative synthetic workload onto a CSP. The estimated cost of migrating the representative synthetic workload to the CSP can be seen in FIG. 23. Table 2300 of FIG. 23 depicts a candidate CSP computer and the on-demand cost of multiple applications and their associated virtual machines. For example, row 2310 depicts the estimated monthly cost of migrating each of the two virtual machines of the "Analysis" application to the Azure CSP. The estimated cost is seen in table 2300 of FIG. 23 may be a candidate cloud configuration cost. In some embodiments, the migration module 804 may suggest one or more workloads for the playback phase 906 and one or more CSPs best suited for the needs of the customer based on the representative synthetic workload, the one or more CSP profile entries, and the business objectives received from the customer in the discovery phase 902. The customer may receive some or all of the output of the profiling phase to determine one or more workloads to playback on one or more CSP profiles in the playback phase.

Figure 24:
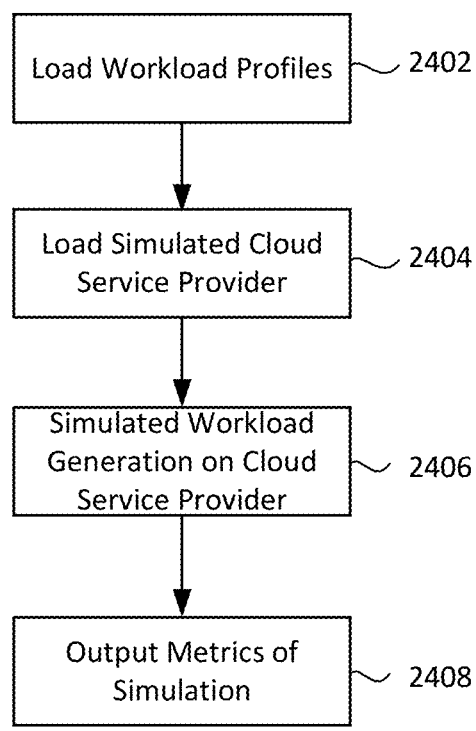
FIG. 24 depicts in further detail the playback phase of the cloud migration process according to some embodiments.

FIG. 24 depicts in further detail the playback phase 906 of the cloud migration process according to some embodiments. In step 2402, the input module 806 may receive from the customer one or more workloads to target for the playback phase 906. The migration module 804 may send a request to the cloud service provider profile datastore 822 for the CSP profile entry of one or more CSPs. Each CSP profile entry may include attributes of the CSP such as available memory storage, types of security levels available, cost per gigabyte, methods of retrieving data stored on the cloud, and types of deployment available to a consumer.

In step 2404, the migration module 804 may send a request to the workload datastore 820 for the one or more workload to simulate in the playback phase 906. In some embodiments, the customer may select the one or more workloads to simulate in the playback phase 906. In various embodiments, the migration module 804 may make a choice. Using the attributes of the CSP from the CSP profile entry, the migration module 804 may emulate the key dimensions of a workload with high fidelity. The dimensions include CPU MHz, memory utilization in gigabytes, read/write IOPs, read/write throughputs, and network received/transmit in bytes per second.

In step 2406, migration module 804 executes or runs the representative synthetic workload created during the profiling phase 904 of the cloud migration readiness process. In some embodiments, a CMR playback module (not shown) may execute the representative synthetic workload on top of the operating system in the target cloud service provider environment and configuration.

In step 2408, the performance of the representative synthetic workload on one or more CSP profiles as compared to the on-premises levels, and cost estimates are re-calculated. In various embodiments, by performing the representative synthetic workload on a CSP cloud services platform, types of virtual machines on the CSP cloud services platform may be identified, and types of storage (e.g., disk type) on the CSP cloud services platform may be identified. Periodic (e.g., monthly or yearly) cost on the CSP cloud services platform may be determined based at least in part on the types of virtual machines and the types of storage.

Figure 25:
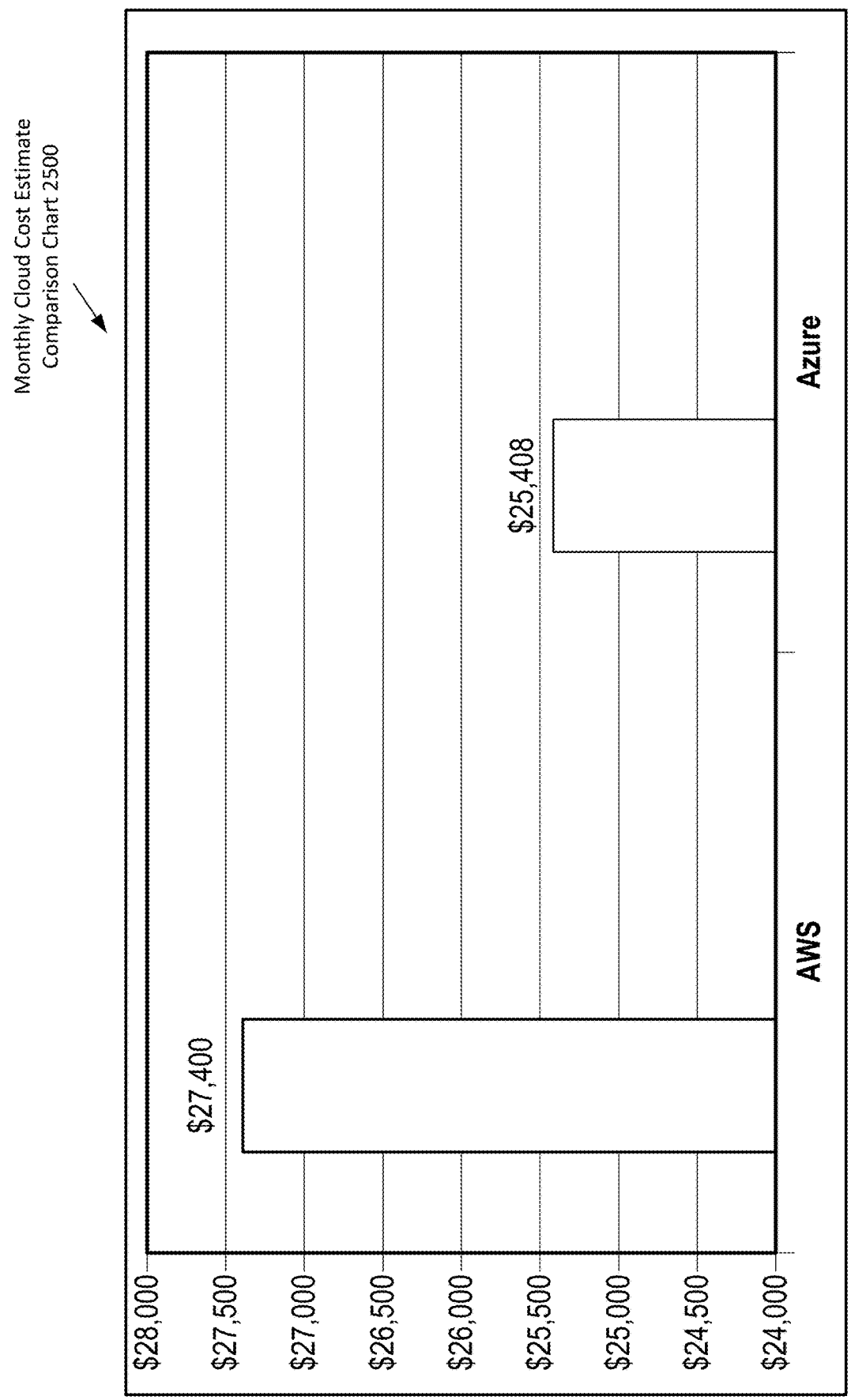
FIG. 25 depicts an example output of an estimated monthly cloud cost for two cloud service providers according to some embodiments.

The result of the calculation may be provided by the reporting module 824 in the form of a chart, such as a chart 2500 of FIG. 25. The chart 2500 depicts a monthly cloud cost estimate comparison of a representative synthetic workload of the enterprise network 705 for two CSPs, Amazon Web Services (AWS) and Microsoft Azure. In one embodiment, the result of the calculation done in step 2406 may be provided by the reporting module 824 in the form of a table, such as a table 2600 of FIG. 26. The table 2000 depicts a monthly cloud cost estimate of multiple applications or workloads of the enterprise network 705 on one CSP, such as Microsoft Azure. Note that in this example, the estimated monthly cost in table 2000 of FIG. 26 is the same as the estimated monthly cost seen in table 2300 of FIG. 23.

The cloud migration readiness process 900 is iterative until a cloud configuration that meets the performance criteria while minimizing cost is found. The goal of the cloud migration readiness process 900 is to determine a cloud configuration that meets the original on-premises levels at the lowest cost. Optionally, enterprises may be interested in testing higher levels of utilization or performance beyond those of the on-premises baseline. In some examples, higher levels of utilization may be executed as multiple of two times CPU utilization or four times the memory utilization, etc.

The migration module 804 generates utilization levels matching, as much as possible, the on-premises utilization levels. The on-premise utilization levels of synthetic workloads are the reference that is compared to the representative synthetic workload utilization levels in the cloud. The CMR service system 785 applies adapted linear correlation and relative error to compare cloud utilization values against the reference on-premises utilization values. Some example output of the playback phase 906 includes a synthetic workload cloud performance report, an updated candidate cloud configuration, and an updated candidate cloud configuration costs. The output of the playback phase 906 may be one or more recommendations of which workloads of the enterprise network to migrate to a CSP, and which CSP may be best suited for the customer's needs. The customer may utilize this information to determine which CSP to migrate their on-premises infrastructure to and which CSP to choose.

Figure 27:
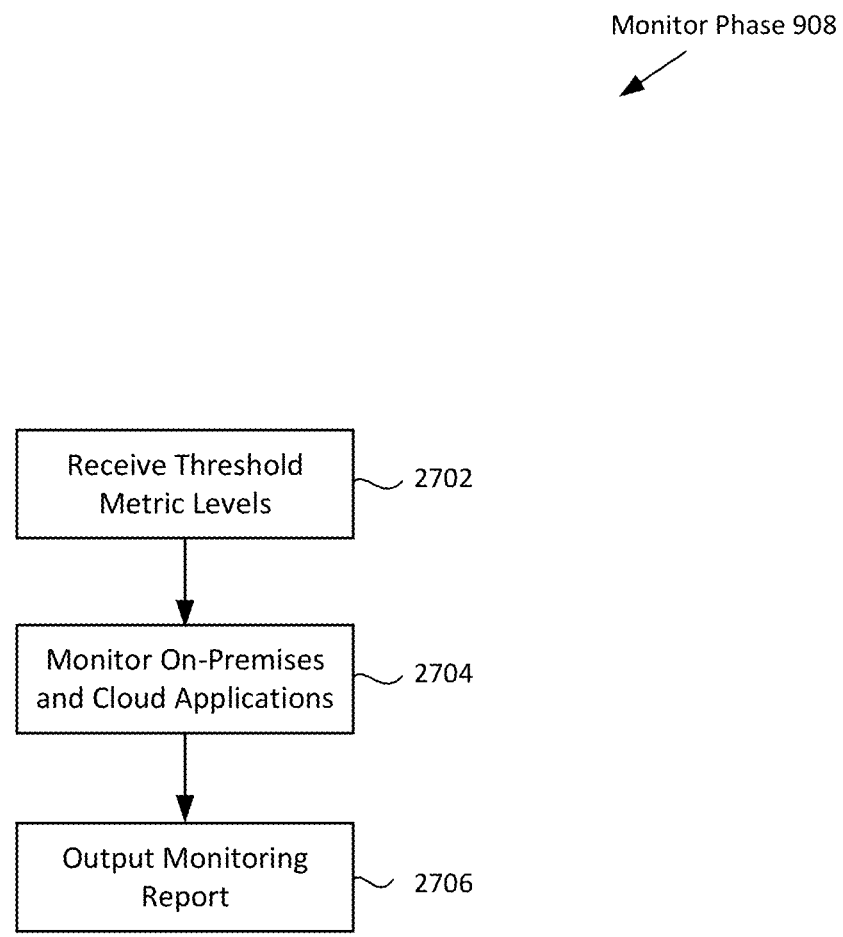
FIG. 27 depicts in further detail the monitor phase of the cloud migration process according to some embodiments.

FIG. 27 depicts in further detail the monitor phase 908 of the cloud migration process according to some embodiments. The monitor phase 908 takes place after the customer migrates the workload or application to a CSP. The CMR service system 785 may collect data from the application discovery system 780, the flow source discovery system 770, the network traffic analyzing software platform 750, and native CSP monitoring software to verify that the applications migrated to the cloud infrastructure is performing within acceptable levels.

In step 2702, the workload module 810 may receive utilization metrics from one or more of the network traffic analyzing software platform 750 or the flow source discovery system 770. In step 2704, the workload module 810 may compare received utilization metrics with predetermined utilization metric thresholds to determine if the applications with one or more entities migrated to the cloud infrastructure are performing at acceptable levels. The predetermined utilization metric thresholds may be set by the customer; in some embodiments, the predetermine utilization metric thresholds are set by the CMR service system 785.

In step 2706, the reporting module 824 may provide a utilization and performance report to the customer. The utilization and performance report findings include performance trend deviations and recommendations related to the remediation of issues and optimization opportunities. Based on the utilization and performance report, the customer may determine if additional cloud infrastructure resources are required.

Figure 28:
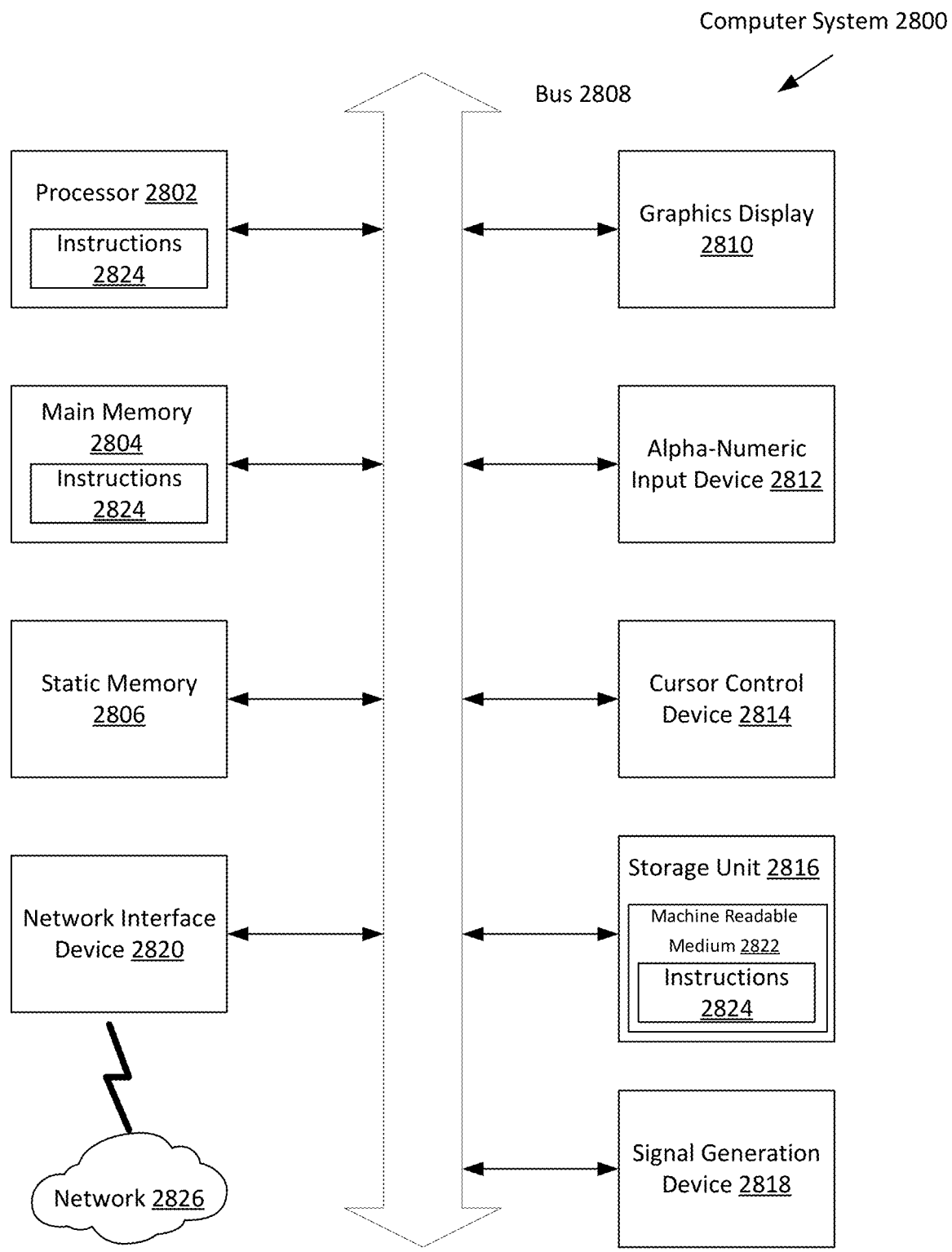
FIG. 28 depicts a block diagram illustrating entities of an example machine according to some embodiments.

FIG. 28 is a block diagram illustrating entities of an example machine able to read instructions from a machine-readable medium and execute those instructions in a processor to perform the machine processing tasks discussed herein, such as the engine operations discussed above. Specifically, FIG. 28 shows a diagrammatic representation of a machine in the example form of a computer system 2800 within which instructions 2824 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2824 (sequential or otherwise) that specify actions to be taken by that machine. Further, while only a single machine is illustrated, the term "machine" shall also be taken to include any collection of machines that individually or jointly execute instructions 2824 to perform any one or more of the methodologies discussed herein.

The example computer system 2800 includes a processor 2802 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 2804, and a static memory 2806, which are configured to communicate with each other via a bus 2808. The computer system 2800 may further include a graphics display unit 2810 (e.g., a plasma display panel (PDP), a liquid crystal display (LCD), a projector, or a cathode ray tube (CRT)). The computer system 2800 may also include an alphanumeric input device 2812 (e.g., a keyboard), a cursor control device 2814 (e.g., a mouse, a trackball, a joystick, a motion sensor, or other pointing instrument), a data store 2816, a signal generation device 2818 (e.g., a speaker), an audio input device 2826 (e.g., a microphone) and a network interface device 2820, which also are configured to communicate via the bus 2808.

The data store 2816 includes a machine-readable medium 2822 on which is stored instructions 2824 (e.g., software) embodying any one or more of the methodologies or functions described herein. The instructions 2824 (e.g., software) may also reside, completely or at least partially, within the main memory 2804 or within the processor 2 1402 (e.g., within a processor's cache memory) during execution thereof by the computer system 2800, the main memory 2804 and the processor 2 1402 also constituting machine-readable media. The instructions 2824 (e.g., software) may be transmitted or received over a network (not shown) via the network interface device 2820.

While machine-readable medium 2822 is shown in an example embodiment to be a single medium, the term "machine-readable medium" should be taken to include a single medium or multiple media (e.g., a centralized or distributed database, or associated caches and servers) able to store instructions (e.g., instructions 2824). The term "machine-readable medium" shall also be taken to include any medium that is capable of storing instructions (e.g., instructions 2824) for execution by the machine and that cause the machine to perform any one or more of the methodologies disclosed herein. The term "machine-readable medium" includes, but should not be limited to, data repositories in the form of solid-state memories, optical media, and magnetic media.

As discussed herein, one or more modules of the CMR service system 785 (see FIG. 8) may support tracking communication flows through one or more networks to identify ports that may be required to be controlled (e.g., opened on a firewall appliance, firewall software, switch, operating system and/or other network device). In order to preserve security, many operating systems and networks may disable ports that would otherwise allow communication from, to, or within the network. An entity (e.g., IT support, company, authorized personnel, or the like) may track ports that are used for communication within their network. For example, many ports are widely used as a standard for certain programs or functions. Other ports may be understood as being necessary for critical software or critical functions of the particular network (e.g., certain mission-critical programs and their parameters are likely to be well understood). Due to the growth of components, software, operating systems, virtual machines, and the like within an enterprise network, it is difficult, if not impractical, to know all the sources and destinations of all information flows and the ports that they use. As such, it may be important to discover or confirm ports that need to be open when considering cloud migration and simulation (e.g., playback) of workloads to confirm readiness and/or cost.

When considering a partial or full move to the cloud, the entity controlling the enterprise network may consider tracking the information within their network to identify ports, keep all ports open, or guess which ports to keep open or closed with the expectations that they can possibly make corrections when things cease to function. Keeping all ports open is insecure. Making guesses as to which ports should or should not be open renders any predictions about readiness for cloud migration speculative if not useless.

Figure 30:
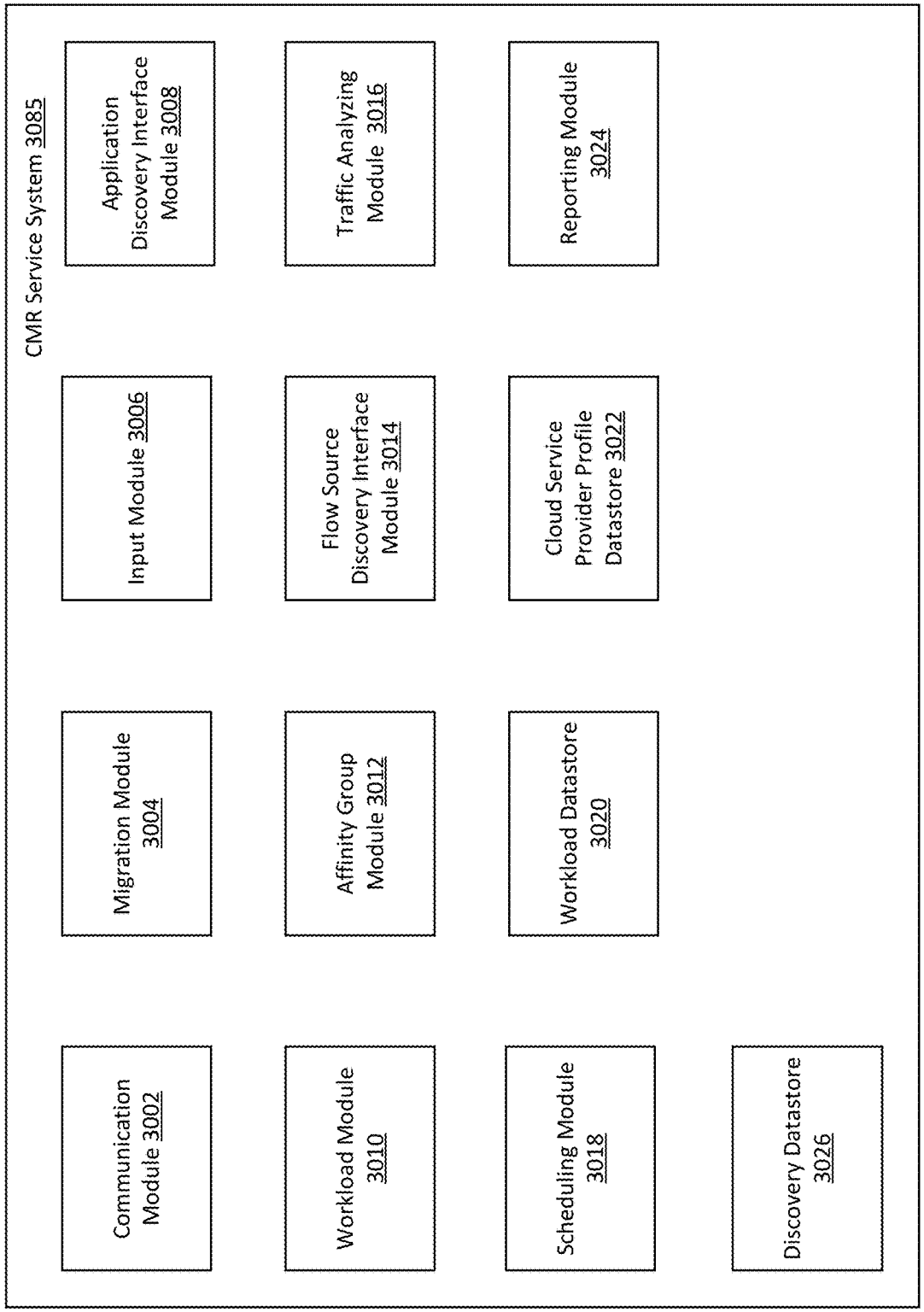
FIG. 30 depicts a block diagram of another example CMR server system according to some embodiments.

FIG. 30 depicts a block diagram of another example CMR service system 3085, according to some embodiments. The CMR service system 3085 may be similar to the CMR service system 785 of FIG. 8. The CMR service system 3085 includes a communication module 3002, a migration module 3004, an input module 3006, an application discovery interface module 3008, a workload module 3010, an affinity group module 3012, a flow source discovery interface module 3014, a traffic analyzing module 3016, a scheduling module 3018, a workload datastore 3020, a cloud service provider profile datastore 3022, a reporting module 3024, and a discovery datastore 3026. In some embodiments, any number of functions described with respect to FIGS. 30-26 may be performed within the modules depicted in FIG. 8.

The communication module 3002 may send and receive requests or data between any modules of the CMR service system 3085, the network traffic analyzing software platform 750, the application discovery system 780, and/or the flow source discovery system 770. The communication module 3002 may receive a request from the IT administrator of the enterprise network 705 to commence the cloud migration readiness process. In some embodiments, the communication module 3002 may send a request to the application discovery system 780 for data regarding applications of the enterprise network 705 discovered by the application discovery system 780.

The communication module 3002 may request any amount of data (e.g., any number of data packets) from the network traffic analyzing software platform 750. In some embodiments, the input module 3006 may receive data packets from the network traffic analyzing software platform 750. The communication module 3002 may send a request to the flow source discovery system 770 for discovered flow source(s) and their associated attributes (e.g., in a table, chart, graph, or the like). In some embodiments, the communication module 3002 may receive a request from the reporting module 3024 to provide the information in the form of charts or tables.

The migration module 3004 may identify entities of the enterprise network based on information contained within the data received from the network traffic analyzing software platform 750. For example, attributes of the data packets, such as an IP address, may be utilized to identify entities of the enterprise network.

Figure 29A:
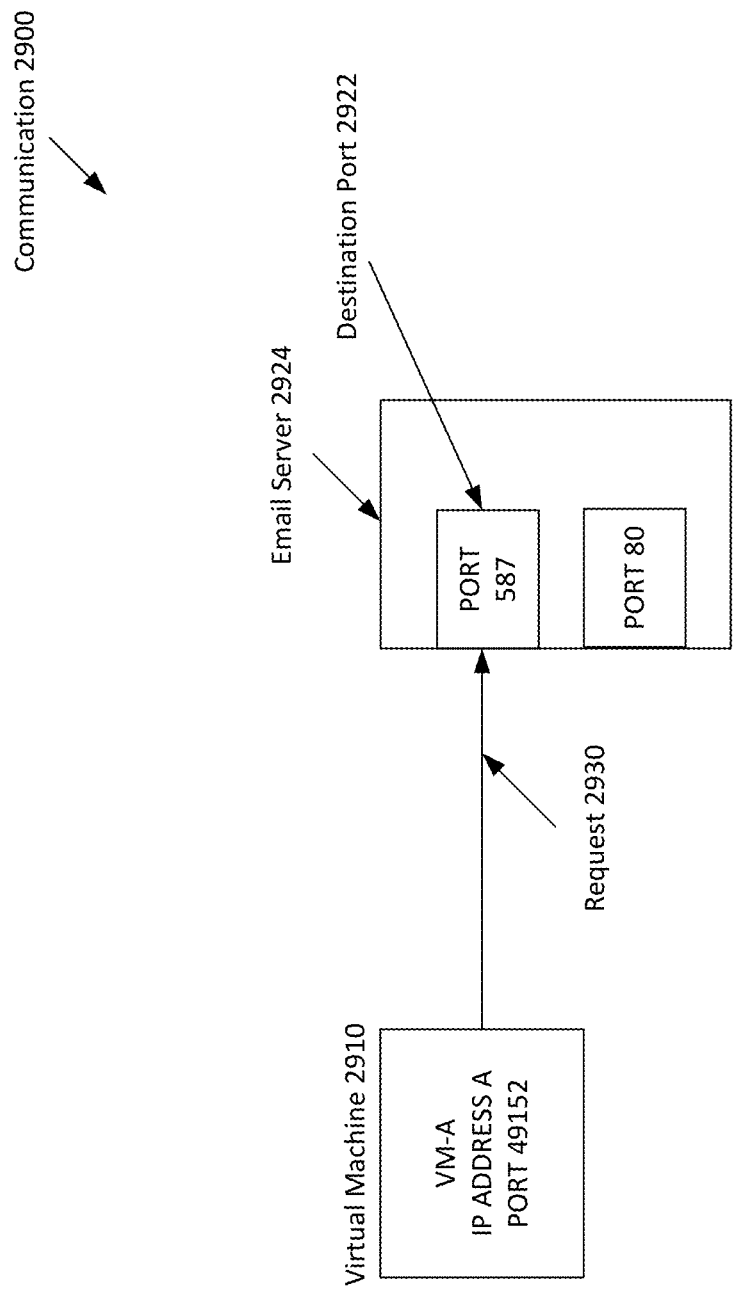
FIG. 29A depicts an example of a virtual machine sending a request to an email server illustrating a transport server and a transport client according to some embodiments.

FIG. 29A illustrates a transport server and a transport client according to some embodiments. For example, FIG. 29A depicts an example communication 2900 of a virtual machine 2910 sending a request 2930 to an email server 2924. The transport server may be the originator of the communication (e.g., the creator of a message), while the transport client may be the destination of the communication (e.g., a destination of the message). In the example of communication 2900, the transport server is the virtual machine 2910, while the transport client is the email server 2924. The communication message (e.g., tuple) captured by the network traffic analyzing software may include IP Address A, Port 30, IP Address B, and port 20. In this example, even though the email server 2924 has port 80 available, it is not used in this communication.

Figure 29B:
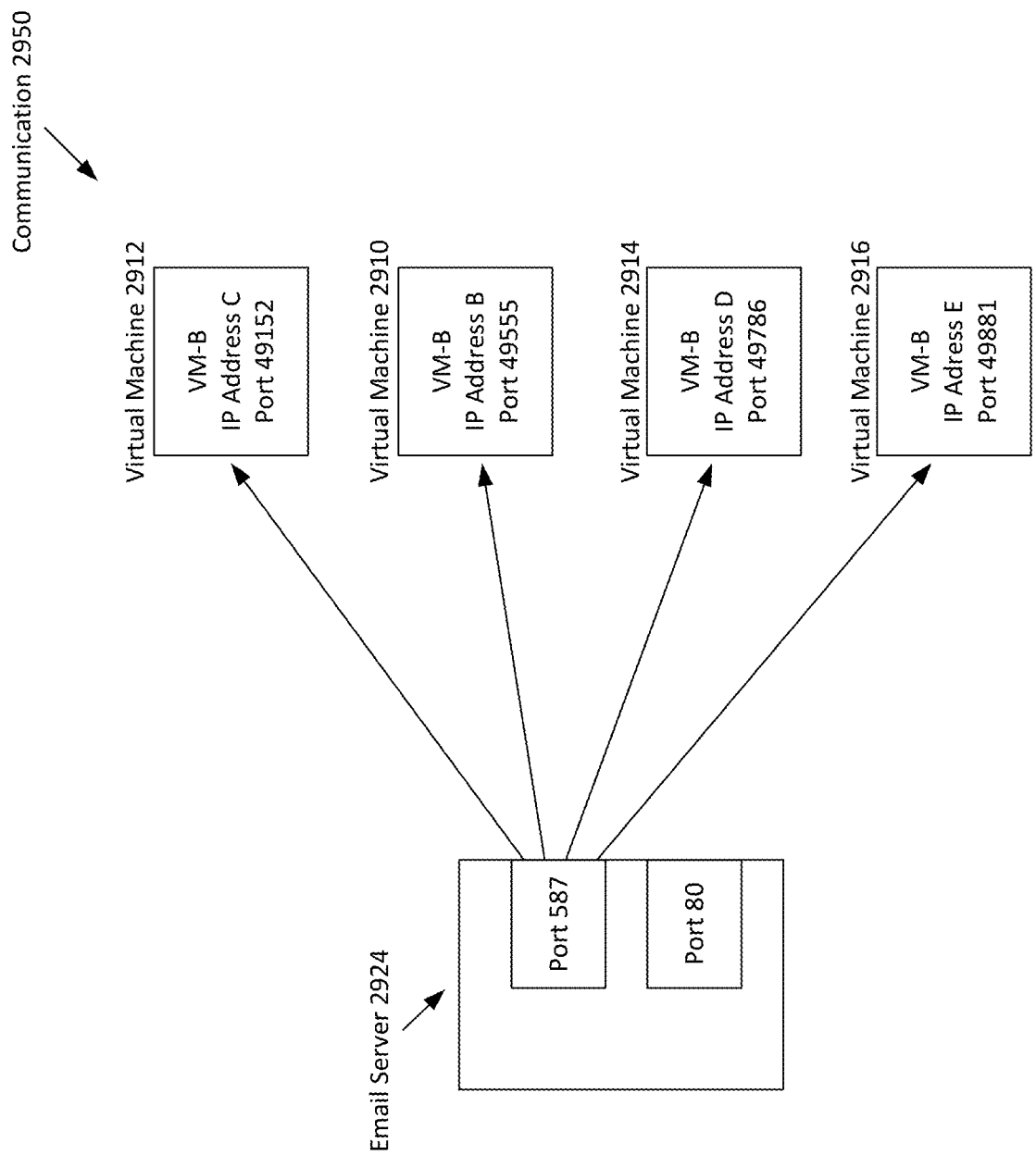
FIG. 29B depicts an example of the email server sending data to multiple entities of the enterprise network according to some embodiments.

FIG. 29B depicts an example communication 2950 of the email server 2924 sending data to multiple entities of the enterprise network, virtual machines 2910, 2912, 2914, and 2916 according to some embodiments. The example communication 2950 illustrates the email server 2924 sending data to multiple virtual machines. In this example, the transport server is the email server 2924, while the transport clients are the virtual machines 2910, 2912, 2914, and 2916. The communication tuple captured by the network traffic analyzing software may include, for example, IP Address B, port 20, IP Address A, and Port 30.

Specific port numbers may be reserved for specific transport protocols. The Internet Assigned Numbers Authority (IANA) is an organization that is responsible for maintaining the assignment of port numbers for specific uses. For example, ports 20 and 21 are assigned by the IANA to the File Transfer Protocol (FTP). Regardless of the assignment by the IANA, any port may be used for different, unassigned functions (i.e., there is no requirement that IANA assignments be followed). As such, even with the information regarding port registration for different tasks, an enterprise may respect some, none, or all of the port assignments of the IANA. For this reason, it may be important to assess network traffic and identify ports that are used from the monitored network traffic.

The migration module 3004 may build a port frequency distribution table (or any data structure) for the entities of the enterprise network. The port frequency distribution table, for example, may identify any or all of the following: an entity name, a port number, the transport protocol associated with the port number, and/or a count of the number of times data traffic traveled into or out of a particular port. An example port frequency distribution table 3100 can be seen in FIG. 31, which includes the port frequency distribution table for the enterprise network. Each row of the port frequency distribution table 3100 may represent a numbered port of the enterprise network and an access frequency of the particular port. In some embodiments, the access frequency of a particular port represents the number of times the particular port provides (e.g., sends and receives) data traffic (e.g., the number of times data is sent through the port). In yet another embodiment, the access frequency of the particular port represents a sum of the number of times the particular port sends and receives data traffic using a particular transport protocol.

In some embodiments, the migration module 3004 may determine a communication tuple based on the data packets received from the network traffic analyzing software platform 750. The communication tuple may include, for example, a source IP address, a source port number, a destination IPO address, and/or a destination port number. The source IP address and the source port number may be associated with a source entity. The destination IP address and the destination port number may be associated with a destination entity. The source entity and the destination entity may be an entity of the enterprise network. Values may be utilized in the generation of the port frequency distribution table 3100.

Based on any number of communication tuples, the migration module 3004 may designate source port(s) and/or destination port(s). For example, one of the ports may be designated as a server port, and another may be designated as a client port. The designation of the server port and the client port may be accomplished using a heuristic algorithm. For example, the algorithm may include: 1) for a communication tuple (source IP address, source port, destination IP address, destination port), the port with a higher port access frequency may be designated the server port; 2) if the source port and the destination port has the same access frequency, then the port that is registered with an organization such as IANA may be designated as the server port; and, optionally, 3) if neither the source port and the destination port have the same access frequency and if neither the source port and the destination port are registered, then the port with the lowest port number may be designated as the server port.

For example, the migration module 3004 may determine a communication tuple from the network traffic analyzing software platform 750. The communication tuple in this example includes: (1) port 161 of an entity VM-123, using the UDP protocol, and IP address IPC and (2) port 5353 of an entity HOST-45, using the UDP protocol. IP address IPF corresponds to rows 3110 and 3120, respectively of the port frequency distribution table 3100 of FIG. 31. The communication tuple may include (IPC, 161, IPF, 5353). The migration module 3004 may compare the access frequency of port 161 of the entity VM-123 and port 5353 of the entity HOST-45 and determine that port 161 of the entity VM-123 is the server port while port 5353 of the entity HOST-45 is the client port. In some embodiments, the migration module 3004 may send a request to the discovery datastore 3026 to update attributes associated with port 161 of the entity VM-123 and port 5353 of an entity HOST-45 with the designation of the server port and the client port, respectively.

In another example, the migration module 3004 may determine a communication tuple from the network traffic analyzing software platform 750. The communication tuple may include port 80 of an entity VM-123, using the TCP protocol, and IP address IPB and port 243 of an entity SERV-17, using the TCP protocol, and IP address IPD which correspond to rows 3130 and 3140 respectively of the port frequency distribution table 3100 of FIG. 31. The communication tuple may include (IPB, 80, IPD, 243). The migration module 3004 may compare the access frequency of port 80 of entity VM-123 and port 243 of entity SERV-17. In this example, the migration module 3004 may determine that port 80 of entity VM-123 and port 243 of entity SERV-17 have the same access frequency. In that case, the migration module 3004 may determine or confirm port(s) (if any) that are registered with IANA for their respective transport protocol. Port 80 is registered with TCP for the HTTP application, so port 80 of entity VM-123 is designated as the server port, while port 243 of the entity SERV-17 is designed as the client port. In some embodiments, the migration module 3004 may send a request to the discovery datastore 3026 to update attributes associated with port 80 of the entity VM-123 and port 243 of the entity SERV-17 with the designation of the server port and the client port, respectively. In some embodiments, the flow source discovery interface module 3014 determines the communication tuple from the network traffic analyzing software platform 750.

The migration module 3004 may manage the cloud migration readiness process and/or may commence the cloud migration readiness process. The migration module 3004 may commence the cloud migration readiness process when the migration module 3004 determines that any number of trigger conditions are satisfied. For example, a trigger condition may include the scheduling module 3018 determining that a current time equals a scheduled cloud migration readiness process start time. In some embodiments, one of the trigger conditions includes receiving from the input module 3006 a request to commence the cloud migration readiness process. Upon the reception of the request to commence the cloud migration readiness process from the scheduling module 3018 or the input module 3006, the migration module 3004 may commence the cloud migration readiness process.

The input module 3006 may initiate the cloud migration readiness process or a phase of the cloud migration readiness process (e.g., based on receiving a request from the IT administrator of the enterprise network 705). In some embodiments, the input module 806 may receive a request to start an application discovery process (e.g., as a part of the initiation of the cloud migration readiness phase), a request to start a flow source discovery process, and/or a schedule of the cloud migration readiness process. For example, the input module 3006 may receive a start date and time of the cloud migration readiness process start time. In some embodiments, the input module 3006 may receive, from the IT administrator of the enterprise network 705, known workloads.

The application discovery interface module 3008 may interface with the application discovery system 780. In some embodiments, the application discovery interface module 3008 may send an output of the application discovery process to the input module 3006. The output of the application discovery process may include a list of application entries found in the enterprise network 705. Each application entry may include attributes or characteristics (e.g., metrics) of the discovered application, such as a suggested name of the discovered application, as well as attributes associated with the entities which make up the discovered application. In some embodiments, the output may include discovered ports. The application discovery process is discussed further in FIG. 11.

During the discovery phase of the cloud migration readiness process, the workload module 3010 may identify multiple workloads of the enterprise network 705. In some embodiments, a workload represents an amount of work or processing accomplished by an entity of the enterprise network 705. Entities of the enterprise network 705 may include compute devices, network devices, network elements, and/or storage elements. In some embodiments, entities of the enterprise network 705 include enterprise network applications. In some embodiments, entities of the enterprise network 705 include virtual machines.

The workload module 3010 may identify workload based on the designation of server ports and client ports by the migration module 3004, as discussed above. The designation of the server ports and client ports may be utilized to identify workloads. For example, referring to the port frequency distribution table 3100 of FIG. 31, port 161 of the entity VM-123 is designated as the server port, while port 5353 of the entity HOST-45 is designated as the client port. The migration module 3004 may identify other client ports of the enterprise network, which is in a communication tuple with the designated server port. These other client ports, as well as port 161 of the entity VM-123 and port 5353 of the entity HOST-45 may be identified as being associated with a workload. For example, the migration module 3004 may receive, from the network traffic analyzing software platform 750, network traffic data. The migration module 3004 may identify a communication associated with network traffic data, such as the request 2930 of FIG. 29A. The migration module 3004 may designate port 20 of the email server 2924 as a server port, while port 30 of the virtual machine 2910 may be designated as the client port. The migration module 3004 may identify other client ports associated with port 20 of the email server 2924. For example, as seen in FIG. 29B, the migration module 3004 may designate port 30 of the virtual machines 2912, 2914, and 2916 as client ports as well. With the designations of the server port of the email server 2924 and the client ports of the virtual machines 2910, 2912, 2914, and 2916, the workload module 3010 may determine these entities of the enterprise network may be grouped together into a workload.

In various embodiments, a workload may comprise any number of workloads. For example, a workload may represent the amount of work or processing accomplished by an application of the enterprise network 705. In one example, one workload may represent the email service application of the enterprise network comprising multiple virtual machine workloads and server workloads (which function as part of the email service application).

In some embodiments, during the discovery phase of the cloud migration readiness process, the workload module 3010 may determine the characteristics of the workload. Characteristics of the workload may include attributes of the entity associated with the workload. For example, a workload of a virtual machine may include attributes of the virtual machine such as applications of the enterprise network 705 associated with the virtual machine and utilization such as maximum read speed, maximum write speed, central processing unit (CPU) MHz, memory utilization percentage, storage demand, and input/output operations per second (IOPS). For example, a workload of a storage device may include attributes of the storage device such as read and write latency.

In some embodiments, the workload module 3010 may send a list of workloads identified by the workload module 3010 to the affinity group module 3012. The affinity group module 3012 may receive the list of workloads and categorize or group some or all of the received workloads into one or more affinity groups. In some embodiments, each workload is categorized into a different affinity group. The affinity group module 3012 may group any number of workloads into synthetic workloads based, at least in part, on common resource utilization by the workloads (e.g., CPU utilization, memory utilization, storage utilization, and/or the like).

The workload module 3010 may determine workload interdependencies (e.g., how workloads depend on one another). Workload interdependencies help to determine the sequence of workloads, how services are migrated to the cloud, and what workloads and services should stay on-premise.

The affinity group module 3012 may categorize workloads identified by the workload module 3010 into affinity groups. As discussed herein, affinity groups (e.g., representative synthetic workloads) may consist of workloads with similar resource utilization levels and temporal or time-based characteristics. For example, workloads with similar read speed and write speeds may be grouped together into the same affinity group. In one example, workloads that have a CPU usage of greater than 90% during a particular time frame each day may be placed in the same affinity groups. In some embodiments, a workload may belong to more than one affinity group. In other embodiments, each workload may only belong to one affinity group.

In one method, the CMR service system 3085 may utilize a machine learning algorithm to categorize or group workloads into affinity groups. In some embodiments, the workload module may apply a k-means clustering algorithm to the multiple workloads identified by the workload module 3010. The k-means clustering algorithm may have a feature set represented by average, a percentile of maximum values of utilization metrics. In some embodiments, utilization metrics include CPU utilization, memory utilization, input/out (TO) read utilization, IO write utilization, IO number of reads, IO number of writes, network receive rate, and network transmit rate.

In another method, the affinity group module 3012 groups workloads by their maximum or percentile utilization metric fitness into available cloud instances for a specific CSP. This method may be utilized when a particular CSP to use has already been determined.

Once the affinity group module 3012 determines the workloads that belong to each affinity group, the affinity group module 3012 may determine the representative synthetic workload for each affinity group. The representative synthetic workload for each affinity group may be a sum of the multiple workloads which make up the affinity group. In various embodiments, the representative synthetic workload for each affinity group may be a weighted sum of the multiple workloads which make up the affinity group, with each of the multiple workloads given a weight based on attributes or characteristics of the workload. In some embodiments, the affinity group module 3012 may send a request to the workload datastore 3020 to store the representative synthetic workload associated with each affinity group.

The affinity group module 3012 may generate a table or chart (or any data structure) which comprises temporal data capturing utilization levels for some or all of the utilization metrics. An example of this may be seen in FIG. 21. Table 2100 of FIG. 21 contains temporal data capturing utilization levels of two example workloads of the enterprise network 705. The columns of the example table 2100 are associated pairs of date/time of data and the name of the workload that is being monitored by the infrastructure performance management appliance 760 for a particular utilization metric. The number of column pairs is equal to the number of workloads being monitored by the workload module 3010. For example, column 2110 provides a timestamp for measuring the particular utilization metric, while column 2120 provides the measurement for the particular utilization metric associated with the timestamp in the same row.

The flow source discovery interface module 3014 interfaces with the flow source discovery system 770. In some embodiments, the flow source discovery interface module 3014 may send the output of the flow source discovery process to the input module 3006. The output of the flow source discovery process may include a list (or any data structure) of flow source entries. The list of flow source entries may include attributes associated with discovered flow sources. Attributes may include the type of flow source, total byte count, incoming/outgoing byte count, incoming/outgoing bit rate, total packet rate, and/or incoming/outgoing endpoint count. In some embodiments, attributes associated with flow source entries may include applications associated with the flow source. The flow source discovery process will be discussed further in FIG. 12. In some embodiments, the flow source discovery interface module 3014 interfaces with the network traffic analyzing software platform 750.

In some embodiments, the traffic analyzing module 3016 analyzes network traffic received from the flow source discovery system 770. In some embodiments, the traffic analyzing module 3016 receives network traffic from the network traffic analyzing software platform 750. The traffic analyzing module 3016 may analyze IP communications between entities of the enterprise network 705 as well as IP communications between entities of the enterprise network and entities that are external to the enterprise network 705. The traffic analyzing module 3016 may provide the output of traffic dependency on internal and external network traffic. An example of this can be seen in FIG. 13A. Example chart 1300 depicts the amount and type of traffic that goes through a particular virtual machine. Row 1310 depicts the amount of traffic between the particular virtual machine to external entities of the enterprise network 705. Network traffic is separated by incoming and outgoing network traffic. Similarly, row 1320 depicts the amount of traffic between the particular virtual machine to other entities, which are not virtual machines, of the enterprise network 705. Row 1330 depicts the amount of traffic between the particular virtual machine and other virtual machines of the enterprise network 705. The traffic analyzing module 3016 may output the traffic dependency in forms other than a table. An example of this can be seen in FIG. 13B. An example output interface 1350 depicts the same information as the example chart 1300 of FIG. 13A, but in the form of a state diagram.

In one embodiment, the traffic analyzing module 3016 may provide a traffic dependency mapping of the various entities or workloads of the enterprise network 705. The dependency mapping of entities or workloads of the enterprise network may be done iteratively. For example, an initial internal and external communication map may be produced and reviewed by a customer, or alternately, the external communication map may be reviewed by an analytical system. The initial communication map may provide an overall view of the enterprise network. The customer or analytical system may review the overall view of the enterprise network to identify and filter entities or workloads which are not of interest and tune priorities, and data characteristics reveal during each iteration. An example of an initial communication map may be seen in FIG. 17A. The customer or analytical system may receive an example initial communication map 1700. Subsequent to receiving the initial communication map 1700 of FIG. 17A, the customer or analytical system may refine the IP addresses or entities to focus on a particular set of entities to produce a second communication map 1710 of FIG. 17B. Subsequently, the third iteration of the communication map 1720 of FIG. 17C may be produced. The initial communication map 1700, the second communication map 1710, and the third communication map 1720 may be used to determine or identify bully virtual machines and zombie virtual machines. A bully virtual machine is a virtual machine that utilizes too many resources and causes other virtual machines to be without resources. A bully virtual machine may cause cluster performance to degrade. Identifying bully virtual machines may help in analyzing whether one or more of these virtual machines need additional resources or need to be re-routed to other applications or workloads.

A zombie virtual machine is inactive or is used by very few or no applications or workloads. In one example, a virtual machine is considered a zombie when it is powered on but does fewer than 30 IOPS and receives or transfers fewer than 1000 bytes per day for the past 30 days. To prevent wasting host resources, zombie virtual machines may be identified and removed (or data flows of some workloads may be re-routed to other applications or network devices).

In some embodiments, the traffic analyzing module 3016 may receive network traffic data from the network traffic analyzing software platform 750 or the flow source discovery system 770 after the network traffic analyzing software platform 750 has performed flow source detection for a predetermined period of time. In some embodiments, the predetermined period of time is at least two weeks, a week, a month, several months, a day, several hours, and/or the like.

The scheduling module 3018 may receive from the input module 3006 the start time or end time of one or more of the phases of the cloud migration readiness process. In some embodiments, the scheduling module 3018 may suspend the cloud migration readiness process or any phase of the cloud migration readiness process when any number of trigger conditions is satisfied.

The workload datastore 3020 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The workload datastore 3020 may store the representative synthetic workload associated with each affinity group. In some embodiments, the workload datastore 3020 may create a workload entry for each workload identified by the migration module 3004. Each workload entry may include metrics or attributes associated with the workload. The attributes of the workload may depend on what the workload represents. For example, if the workload represents an application, the attributes of the workload may include attributes of the application, such as identifiers of the entities associated with the enterprise network 705, tier, or criticality of the application. In another example, if the workload represents a virtual machine, attributes of the workload may include attributes of the virtual machine such as maximum read speed, maximum write speed, central processing unit (CPU) MHz, memory utilization percentage, storage demand, and/or IOPS.

The cloud service provider profile datastore 3022 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The cloud service provider profile datastore 3022 may store a CSP profile entry for various CSPs such as Microsoft Azure, IBM Cloud, and the like. Each CSP profile entry may include attributes of the CSP, such as available memory storage, types of security levels available, cost per gigabyte, methods of retrieving data stored on the cloud, and types of deployment available to a consumer. The migration module 3004 may utilize the cloud service provider profile datastore 3022 to suggest one or more CSPs to the customer.

The reporting module 3024 may receive a request to provide an example output of the network traffic between a particular virtual machine and external entities, such as the example output 1400 of FIG. 14. During the discovery phase of the cloud migration readiness process, the reporting module 3024 may provide the example output 1400, which depicts the virtual machine 1410, given an identifier "ORDDB02." The example output 1400 also depicts identifiers of other virtual machines that are in communication with the "ORDDB02" virtual machine. Element 1402 of FIG. 14 depicts an entity external to the enterprise network, or an external entity that is in communication with the "ORDDB02" virtual machine. The reporting module 3024 may receive a request to provide example outputs from various phases of the cloud migration readiness process, such as the example workload utilization table 2100 of FIG. 21.

The discovery datastore 3026 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The discovery datastore 3026 may store the port frequency distribution table 3100. In some embodiments, the discovery datastore 3026 may receive a request from the migration module 3004 to generate the port frequency distribution table 3100. The port frequency distribution table 3100 includes multiple port entries for each port identified by the migration module 3004. In some embodiments, the discovery datastore 3026 stores the port frequency distribution table 3100 for each identified entity of the enterprise network. In various embodiments, the discovery datastore 3026 may generate one port frequency distribution table 3100 for the entire enterprise network. Each port entry includes a port number, the transport protocol associated with the port number, and a count of the number of times data traffic traveled into or out of a particular port.

Figure 32:
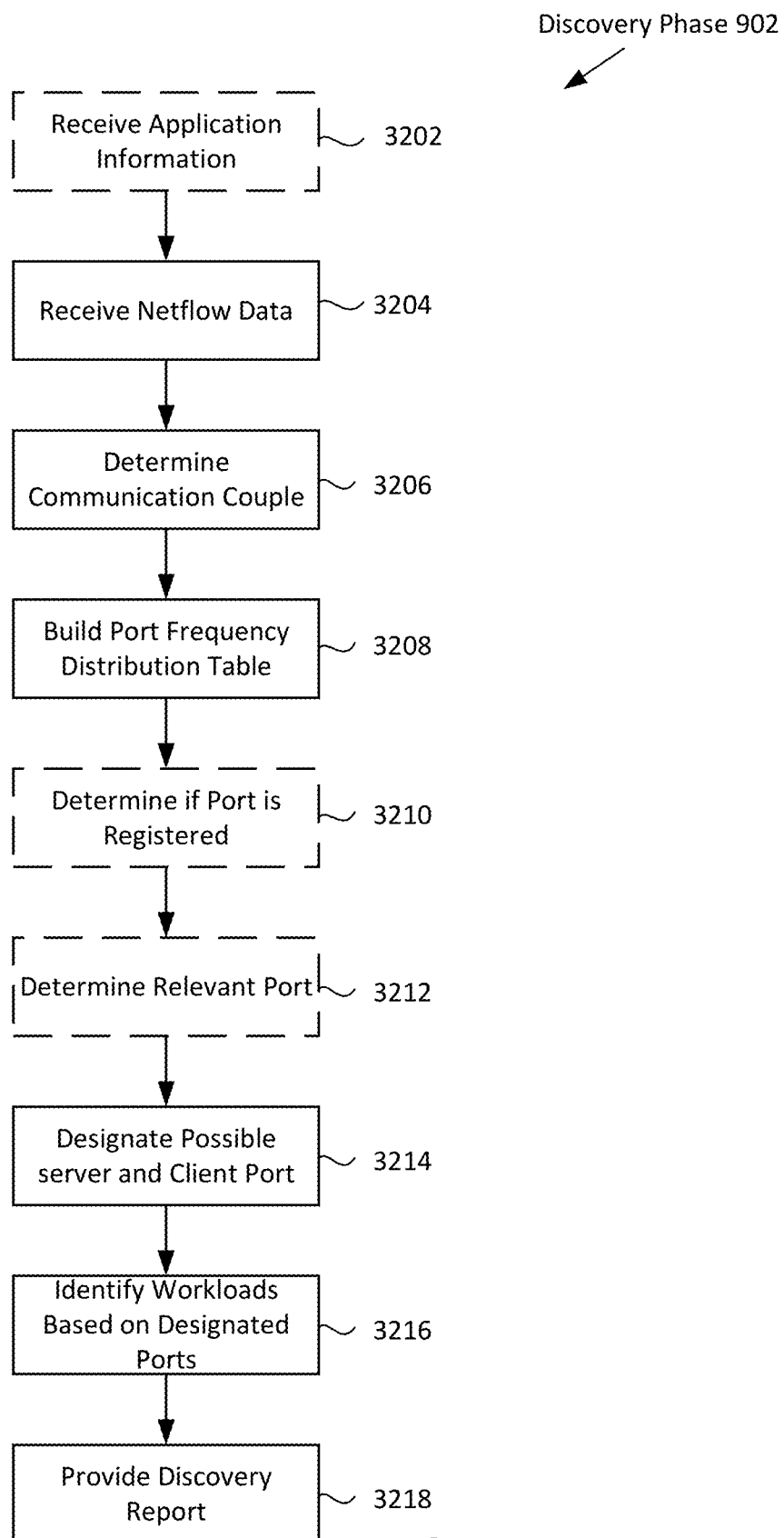
FIG. 32 depicts another example of the discovery phase of the cloud migration process according to some embodiments.

FIG. 32 depicts in further detail another example of the discovery phase 902 of the cloud migration process according to some embodiments. In optional step 3202, the application discovery interface module 3008 may interface with the application discovery system 780 and/or receive the output of the application discovery system 780. In some embodiments, the application discovery interface module 3008 may send the output of the application discovery process to the input module 3006. The output of the application discovery process may include a list of applications found in the enterprise network 705. Each application discovered may include attributes or characteristics (e.g., metrics) of the discovered applications, such as a suggested name of each of the discovered applications, as well as attributes associated with the entities which make up the discovered application. In some embodiments, attributes or characteristics of the discovery application may include a tier of service associated with the application. The migration module 3004 may utilize the output of the application discovery process to identify workloads. In some embodiments, attributes, or characteristics of the discovered application may include entities and attributes associated with any number of the entities. Such attributes and/or characteristics may include, for example, the communication ports of each entity associated with the discovered application. In one embodiment, attributes or characteristics of the discovered application may include a server port and a client port associated with the discovered application.

In step 3204, the communication module 3002 may provide a request to receive from the network traffic analyzing software platform 750 any amount of data. In some embodiments, the input module 3006 may receive data from the network traffic analyzing software platform 750.

In step 3206, the migration module 3004 may determine a communication message based on the data packets received by the network traffic analyzing software platform 750. In various embodiments, the migration module 3004 may receive flow information regarding any number of data packets (e.g., flow packets) between components and/or entities of the enterprise network. The flow information may include a list of data packets and/or attributes of data packets, including, for example, a source IP address, a source port number, a destination IPO address, and/or a destination port number The communication message may include a source IP address, a source port number, a destination IPO address, and a destination port number. The source IP address and the source port number may be associated with a source entity. The destination IP address and the destination port number may be associated with a destination entity. In some embodiments, one or both of the source entity and the destination entity may be an entity of the enterprise network.

In various embodiments, the migration module 3004 may receive a message with information regarding any number of source IP addresses, source port numbers, destination IPO addresses, and/or destination port numbers regarding any number of communications. For example, the network traffic analyzing software platform 750 may monitor and collect data (e.g., attributes) of communication over time. The information may be collected in one or more messages and sent to the migration module 3004. A message may contain any number of tuples and may include attribute information (as discussed herein) regarding any number of communications (e.g., sufficient to support or assist in supporting the creation of the frequency distribution table as discussed herein).

In some embodiments, in step 3208, the migration module 3004 may identify entities of the enterprise network based on the data packets and/or messages received from the network traffic analyzing software platform 750. Attributes of the data packets contained within the message, such as IP addresses, may be utilized to identify entities of the enterprise network. The migration module 3004 may build a port frequency distribution table for the entities of the enterprise network. The port frequency distribution table may identify an entity name, a port number, the transport protocol associated with the port number, and a count of the number of times data traffic traveled into or out of a particular port. The port frequency distribution table 3100 includes the port frequency distribution table for the enterprise network. Each row of the port frequency distribution table 3100 represents a numbered port of an entity of the enterprise network and an access frequency of the particular port.

In some embodiments, there may be any number of TAPs (e.g., TAP 740) coupled to fiber optic cables to assess information passing through a fiber optic cable. In one example, the TAP 740 is an optical splitter that provides a copy of data passing through a fiber optic channel of the enterprise network 705 without affecting the integrity of the data. There may be any number of Taps, appliances, software, or the like that tracks or monitors attributes of data as discussed herein. The migration module 3004 may receive data from the TAPs 740 and/or receive information from any number of appliances, software, or the like to assist in collecting the attributes and creating the port frequency distribution table.

In step 3210, the migration module 3004 may optionally determine if one or more of the identified ports of entities of the enterprise network is registered with an organization such as IANA. In some embodiments, if the migration module 3004 determines that a particular port is registered, the migration module 3004 may send a request to the discovery datastore 3026 to update a 'registered' attribute of the particular port.

In step 3212, the migration module 3004 may optionally determine if each of the ports identified based on the data packets received from the network traffic analyzing software platform 750 is a relevant port. A port that is not identified as a relevant port may be categorized as an irrelevant port. In some embodiments, only ports that are deemed relevant may be designated as a server port or a client port. Ports that are categorized as irrelevant may be ignored for the next step of the discovery phase 902 and may be left out of the discovery report.

The relevance of a particular port of an entity of the enterprise network may be based on one or more relevancy factors. Relevancy factors may include an access frequency that is greater than a predetermined access threshold. The access threshold may depend on the tier of service of an application associated with the entity of the enterprise network associated with the particular port. For example, a port associated with a tier 0 or mission-critical application may have a lower predetermined access threshold than another port associated with a tier 4 application. In some embodiments, the predetermined access threshold may depend on whether or not the port is registered. For example, a port registered with IANA may have a lower predetermined access threshold than another port that is not registered with IANA.

The relevancy factors, for example, may include whether or not the particular port of the entity of the enterprise network has been identified as the server port or the client port of an application discovered by the application discovery system 780. In optional step 3202 of the discovery phase 902, the application discovery interface module 3008 may receive an output of the application discovery system 780. The output of the application discovery system 780 may include attributes or characteristics of the discovered application, such as the server port or the client port associated with the discovered application, ports used in communication, data flow information, and/or the like.

In some embodiments, a particular port of an entity of the enterprise network may be categorized as a relevant port if a substantial part of the access frequency of the particular port occurs over specific time ranges. For example, if the migration module 3004 determines that more than 50% of the access frequency of a particular port of the enterprise network occurs between the hours of 9 a.m. through 4 p.m., Monday through Friday.

In various embodiments, if one port of a communication tuple is categorized as relevant, the other port of the communication tuple is also identified or categorized as relevant. In one embodiment, ports of the communication tuple are categorized independently of each other. In some embodiments, an entity of the enterprise network may include both relevant and irrelevant ports. In other words, just because one port of an entity of the enterprise network does not mean that other ports of the entity of the enterprise network are relevant ports.

In step 3214, for each of the determined communication messages (e.g., tuple), the migration module 3004 may designate one of the source port and the destination port as a server port and the other of the source port and the destination port as a client port. The designation of the server port and the client port may be accomplished using a heuristic algorithm. The algorithm may include: 1) if the source port and the destination port have the same access frequency, then the port that is registered with an organization such as IANA is designated as the server port; 2) for a communication tuple (source IP address, source port, destination IP address, destination port), the port with a higher port access frequency is designated the server port; and 3) if neither the source port and the destination port have the same access frequency and if neither the source port and the destination port are registered, then the port with the lowest port number is designated as the server port.

In some embodiments, the heuristic algorithm to designate the server port and the client port may only be applied to ports that are categorized as relevant.

In some embodiments, the migration module 3004 may confirm the designation of the server port and the client port from the heuristic algorithm using the designation of the server port and the client port from the application discovery system 780. In one example, the heuristic algorithm determines that port 20 of the email server 2924 of FIG. 29B is the client server of the enterprise network application, while port 30 of the virtual machine 2910 is the server port. The migration module 3004 may confirm this designation with the application discovery system 780, which determines that port 20 of the email server 2924 is the server port, while port 30 of the virtual machine 2910 is the client server of the email application. In the case of a mismatch or conflict between the designation of the heuristic algorithm and the application discovery system 780, a rule may use to prefer one over the other (e.g., there may be a rule that the designation of the application discovery system 780 may be used). In some embodiments, in the case of a conflict between the application discovery system 780 and the migration module 3004, the designation of the migration module 3004 may be used. In various embodiments, the conflict may be provided to the reporting module 3024.

In some embodiments, in the case of a conflict between the application discovery system 780 and the migration module 3004, the CMR service system 3085 may repeat any number of the steps of the discovery phase 902. For example, the CMR service system 3085 may repeat steps 3204 through 3216 with data packets from the network traffic analyzing software platform 750. In step 3204, the CMR service system 3085 may send a request to receive data packets from the network traffic analyzing software platform 750. The CMR service system 3085 may receive data packets of the enterprise network collected over a period of time different from the previous round of the discovery phase 902. In step 3206, the migration module 3004 may determine a communication message based on the data packets received from the network traffic analyzing software platform 750. In step 3208, the migration module 3004 may identify entities of the enterprise network based on the data packets and/or messages received from the network traffic analyzing software platform 750 and build a different port frequency distribution table for entities of the enterprise network. In some embodiments, the migration module 3004 may update rows of the port frequency distribution table 3100 based on the data packets received from the network traffic analyzing software platform 750, where each row of the port frequency distribution table 3100 represents a numbered port of an entity of the enterprise network and an access frequency of the particular port. In step 3212, the relevancy of each port may be determined based on one or more relevancy factors. In step 3214, the migration module 3004 may designate one of the source port and the destination port as a server port and the other of the source port and the destination port as a client port using the heuristic algorithm.

In step 3216, the workload module 3010 may identify workload(s) based on the designation of server ports and client ports by the migration module 3004. Client ports communicating with the same server port may be identified as a workload, such as an email server 2924 and the virtual machines 2910 through 2916 of FIG. 29B. These entities of the enterprise network may be identified or categorized into one workload.

In some embodiments, a workload represents the amount of work or processing accomplished by an entity of the enterprise network 705. Entities of the enterprise network 705 may include compute devices, network elements, and storage elements. In one embodiment, entities of the enterprise network 705 include enterprise network applications. In some embodiments, entities of the enterprise network include virtual machines.

In various embodiments, a workload may comprise multiple workloads. For example, the workload represents the amount of work or processing accomplished by an application of the enterprise network 705. Thereby, one workload representing the email service application of the enterprise network comprises multiple virtual machine workloads and server workloads, which function as part of the email service application.

In some embodiments, during the discovery phase of the cloud migration readiness process, the workload module 3010 may determine the characteristics of the workload. Characteristics of the workload may include attributes of the entity associated with the workload. For example, a workload of a virtual machine may include attributes of the virtual machine such as applications of the enterprise network 705 associated with the virtual machine and utilization such as maximum read speed, maximum write speed, central processing unit (CPU) MHz, memory utilization percentage, storage demand, and input/output operations per second (IOPS). For example, a workload of a storage device may include attributes of the storage device such as read and write latency. In some embodiments, characteristics of the workload include the communication ports associated with the particular workload.

Referring to the examples FIG. 29A and FIG. 29B, which represents communication between the email server 2924 and the virtual machines 2910, 2912, 2914, and 2916, the migration module 3004 may determine that these entities of the enterprise network 705 make up at least a part of an email application of the enterprise network 705. The workload module 3010 may determine that the server port of the email application is port number 20 of the email server 2924, while the client port of the email application is port 30 of a number of virtual machines (including virtual machines 2910, 2912, 2914, and 2916).

In various embodiments, the migration module 3004 may send a request to the workload datastore 3020 to store workloads discovered in the discovery phase 902. The discovery output may include workload characteristics and interdependencies among compute, network, and storage elements of an on-premises enterprise system.

In step 3218, the migration module 3004 may send a request to the workload datastore 3020 for some or all of the workloads discovered in the discovery phase 902.

In some embodiments, the migration module 3004 may send a request to the reporting module 3024 to provide some or all components of the discovery report. For example, the reporting module 3024 may provide a port frequency distribution table such as the example port frequency distribution table 3100 of FIG. 31. The port frequency distribution table 3100 includes multiple port entries for each port identified by the migration module 3004. Each port entry includes a port number, the transport protocol associated with the port number, and a count of the number of times data traffic traveled into or out of a particular port. In one embodiment, the reporting module 3024 may provide a visual representation of the infrastructure corresponding to one identified workload, an example of which can be seen in FIG. 29B, which illustrates at least some entities of the enterprise network 705 which make up the email application.

In various embodiments, for each of the workloads identified during the discovery phase 902, the migration module 3004 may send a request to access or configure any number of network devices (e.g., virtual, hardware, or software router, firewall, switch, and/or the like) top open server port(s) and client port(s) of an identified workload. For example, the migration module 3004 may send a request to a router serving the email server 2924 to open port 20. Furthermore, the migration module 3004 may send a request to the same or different virtual or hardware network device to open port 30 of the virtual machine 2910. In some embodiments, the migration module 3004 may confirm that any number of ports are open or closed by accessing the virtual, hardware, or software network device (e.g., virtual, hardware, or software router, firewall, switch, and/or the like).

The profiling phase, playback phase, and the monitor phase of the cloud migration readiness process 900 may be similar to the profiling phase 904, the playback phase 906, and the monitor phase 908, as described in FIG. 19, FIG. 24, and FIG. 27, respectively. The profiling phase 904 may, in some embodiments, utilize the identified workloads, server ports, client ports, entities, applications, and servers discovered through one or more steps of the method discussed regarding FIG. 32. The CMR service system 785 may send attributes associated with enterprise network applications identified during the profiling phase to the application discovery system 780. Attributes associated with the application may include such as a suggested name for the discovered application, the tier of service of the application. In some embodiments, attributes associated with the application include entities, as well as attributes associated with the entities which make up the discovered application. The application discovery system 780 may receive information from the CMR service system 785 and create or update an application entry stored in the application discovery system 780.

In some embodiments, the affinity group module 812 utilizes a machine learning algorithm to categorize or group workloads identified in the discovery phase 902 into affinity groups. The affinity group module 812 determines the workloads that belong to each affinity group. The affinity group module 812 may determine the representative synthetic workload for each affinity group. The representative synthetic workload may reduce playback time by capturing relevant utilization attributes of the workloads within an affinity group.

In some embodiments, the migration module 3004 sends a request to access or configure particular ports of routers or switches according to server ports or client ports associated with an identified workload. The migration module 3004 may send a request to determine if the router or switches associated with the identified workload are correctly configured. In various embodiments, the migration module 3004 sends the request to access or configure particular ports of routers or switches associated with workloads identified in the discovery phase 902. In some embodiments, the migration module 3004 sends the request to access or configure particular ports of routers or switches for simulation of workloads during the migration process and/or after the migration process for a particular workload has been completed in order to determine if the ports of routers or switches were correctly migrated to cloud-based infrastructure. It may be important that pre-migration and post-migration, the correct ports of routers or switches are kept open for a migrating workload such that after the workload has been migrated to the cloud-based infrastructure, network traffic will be able to travel from the server port to the client port of the workload.

In various embodiments, the migration module 3004 may determine if particular ports of a network device were or will be correctly configured for an identified workload. The migration module 3004 may send a request to determine if the particular ports of the network device associated with the identified workload are correctly configured. In various embodiments, the migration module 3004 configures particular ports of a firewall associated with workloads identified in the discovery phase 902. In some embodiments, the migration module 3004 sends the request to one or more firewalls (or any number of network devices) during the migration process or after the migration process for a particular workload has been completed in order to determine if the ports of routers or switches were correctly migrated to cloud-based infrastructure. It is important that pre-migration and post-migration, the correct ports of network devices are kept open for a migrating workload such that after the workload has been migrated to the cloud-based infrastructure, network traffic will be able to travel from the server port to the client port of the workload.

In some embodiments, the output of the profiling phase may be utilized to model data traffic of the enterprise network. The CMR service system 3085 may utilize data packets received from the software platform 750 to model data traffic. Data packets received from the software platform 750 include information such as a byte count, packet count, source IP address, destination IP address, and transport protocol. The CMR service system 3085 may utilize the data packets to simulate network traffic.

In some embodiments, during the playback phase 906, the migration module 804 may send a request to the workload datastore 820 to simulate one or more workloads identified during the discovery phase 902. In some embodiments, the customer may select one or more workloads to simulate in the playback phase 906. Before or while simulating workloads during the playback phase 906, the migration module 3004 may access or configure particular ports of routers or switches (e.g., virtual, hardware, or software) associated with a particular simulated workload. In various embodiments, the migration module 3004 configures particular ports of network devices associated with a particular simulated workload. It is important to determine if the correct ports of routers, switches, or firewalls associated with an identified workload are opened or configured. If the wrong ports of routers, switches, or firewalls associated with the identified workload are opened, then the data traffic associated with the identified workload may not be able to travel from the server port to the client port.

In some embodiments, one or more of steps 3206 through 3214 of the discovery phase 902 may be performed in step 1008 of the discovery phase 902 of FIG. 10. In step 1008, the traffic analyzing module 3016 analyzes network traffic received from the flow source discovery system 770 and the application discovery system 780. For example, similar to step 3206 of the discovery phase 902, the traffic analyzing module 3016 may send a request to the migration module 3004 to determine a communication message based on the data packets received from the network traffic analyzing software platform 750.

Step 1008 may include step 3208. The traffic analyzing module 3016 may identify entities of the enterprise network based on the data packets and/or messages received from the network traffic analyzing software platform 750 and build a different port frequency distribution table for entities of the enterprise network. In some embodiments, the traffic analyzing module 3016 may update rows of the port frequency distribution table 3100 based on the data packets received from the network traffic analyzing software platform 750, where each row of the port frequency distribution table 3100 represents a numbered port of an entity of the enterprise network and an access frequency of the particular port. Step 1008 may include optional step 3210. The traffic analyzing module 3016 may determine if one or more of the identified ports of entities of the enterprise network is registered with an organization such as IANA. In some embodiments, if the migration module 3004 determines that a particular port is registered, the migration module 3004 may send a request to the discovery datastore 3026 to update a 'registered' attribute of the particular port. Step 1008 may include optional step 3212, and the relevancy of each port may be determined based on one or more relevancy factors. In step 3214, the traffic analyzing module 3016 may designate one of the source port and the destination port as a server port and the other of the source port and the destination port as a client port using the heuristic algorithm.

Figure 33:
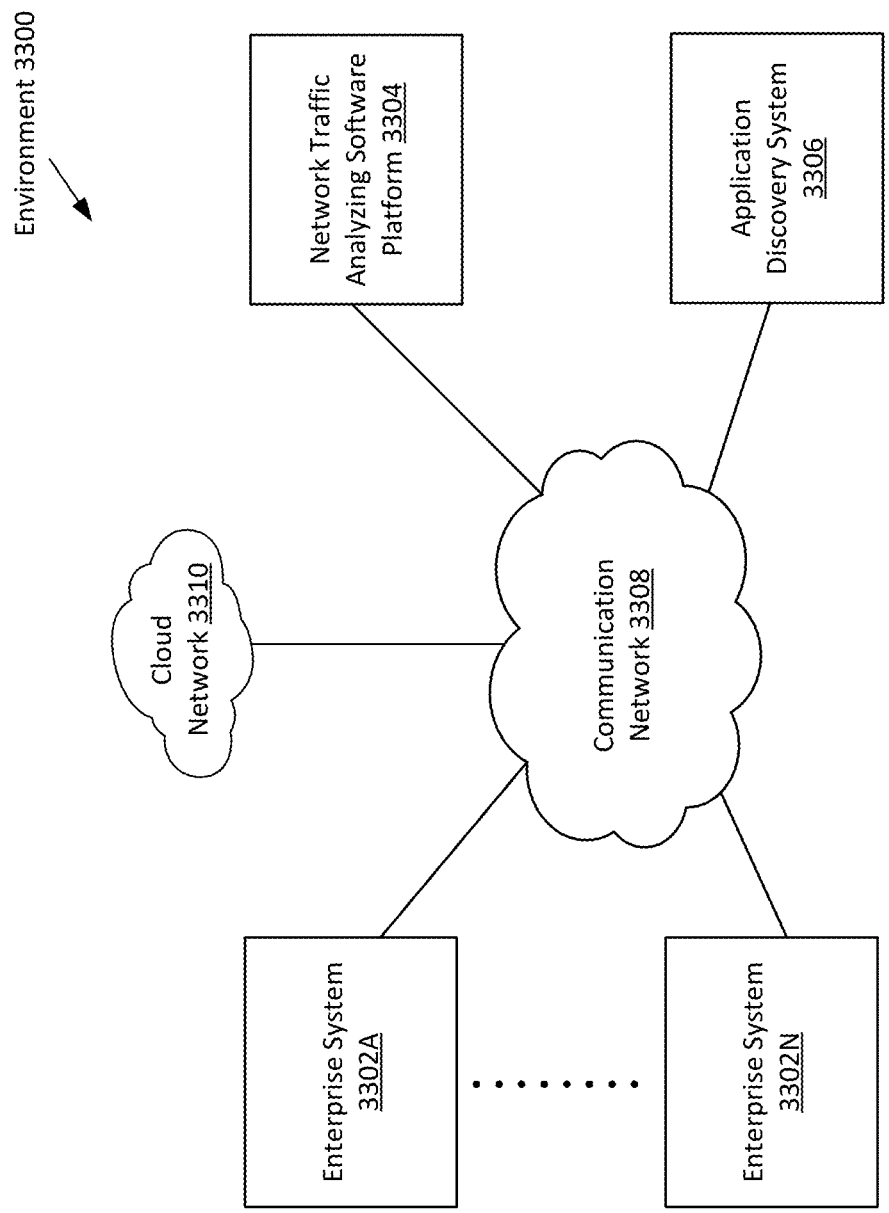
FIG. 33 depicts an example enterprise system with application discovery according to some embodiments.

FIG. 33 depicts an example environment 3300 with application discovery according to some embodiments. The example environment 3300 includes enterprise systems 3302A through 3302N (individually, enterprise system 3302, collectively), an application discovery system 3306, a network traffic analyzing software platform 3304, a communication network 3308, and a cloud network 3310.

The enterprise system 3302 may include one or more systems run by separate enterprises. An enterprise system may refer to the physical, virtual, and logical design of one or more enterprise networks and how the various software, hardware, and protocols work together to transmit data. Each enterprise may be an independent entity.

An enterprise system may include any number of digital devices for performing services, supporting communication, and the like for the enterprise. An enterprise system may include any number of digital devices communicating over any number of networks. The enterprise system may include compute resources from multiple physical locations (e.g., many buildings within a city, state, country, continent, or combination of continents). An enterprise system may communicate and receive services from cloud networks (e.g., public or private cloud networks) such as the cloud network 3310.

The network traffic analyzing software platform 3304 may discover flow sources on the enterprise system 3302. The network traffic analyzing software platform 3304 may be any third-party platform that is integrated into routers or switches by their respective manufacturers to aid users in monitoring the performance of traffic data entering and exiting that specific switching hardware. An example of a network traffic analyzing software platform 3304 is Netflow. Although the network traffic analyzing software platform 3304 of a particular provider may perform some flow source detection, the network traffic analyzing software platform 3304 may provide only limited information about some flow sources, there may be only limited metrics, and/or the network traffic analyzing software platform 2204 may not include information regarding switches of other manufacturers (e.g., that are not a part of that particular providers network traffic analyzing software platform 3304).

The network traffic analyzing software platform 3304 (e.g., NetFlow) may include components such as a flow exporter, a flow collector, and an analysis application. NetFlow and other network traffic analyzing software platforms may have different flow exporters, flow collectors, and analysis applications to export, collect, and analyze data packets in different ways and may focus on different aspects of the data traffic metrics.

The flow exporter may aggregate flow records into data packets and export data packets to one or more flow collectors. The flow exporter may aggregate flow records with the same IP source address and the same IP destination address over a period of time. For example, if two IP addresses have 100 different conversations during a one-minute interval, these 100 different conversations may not be saved as 100 flow records. The flow exports may save the 100 different conversations as one flow record with an aggregate set of data traffic metrics. In some embodiments, the flow exporter outputs a new flow record when it determines that a flow is finished (e.g., the "conversation" is terminated). This may be accomplished by flow aging. For example, when a router detects new data traffic for an existing flow, the router may reset an aging counter. In various embodiments, a TCP session termination signal in a TCP flow causes the router to determine that the flow is finished. The network traffic analyzing software platform 3304 may be configured to output a flow record at a fixed interval, even if the flow is still ongoing.

The flow collector may collect, store, and pre-process flow data from the flow records received from the flow exporter. The analysis application may receive and analyze the flow data. In some embodiments, the flow collector may package any number of flow records into any number of data packets.

The application discovery system 3306 may be a digital device that communicates with any one of the enterprise systems 3302. The application discovery system 3306 may be a part of the enterprise system 3302 (e.g., there may be a separate application discovery system 3306 for each enterprise system). In some embodiments, the application discovery system 3306 may communicate over the communication network 3308 to assist in identifying any number of applications from any number of enterprises.

The application discovery system 3306 may receive and/or retrieve any number of data packets or flow records from the flow collector of the network traffic analyzing software platform 3304 and provide or divert at least a portion of the signals being transmitted from the flow exporter component to the flow collector component.

In some embodiments, the application discovery system 3306 may receive a list of applications (or a subset of the list) from the IT administrator or a user of the enterprise system. The list of applications may include application data which may include, for example, application identifiers, tier of service identifiers of one or more applications, application metrics, and/or application polling interval(s). An application identifier may identify an application instance of the enterprise system 3302. Application metrics may be measurable properties of the application, such as application read-response time. Application data may include, for example, entities of the enterprise system which make up each of the applications of the enterprise system listed in the list and properties or attributes associated with the entities. Entities of the enterprise system represent physical and virtual components of the enterprise system and may include applications, compute devices, network elements, and storage elements. For example, the application data includes a name or identifier for a host of the enterprise system associated with an email server, along with properties of the host, including one or more ports of the host that transfer data associated with the email application. In some embodiments, the process of application discovery includes integrating information from software platforms that manage or monitor the performance of applications on the enterprise system 3302.

The application discovery system 3306 may receive data packets and application data from the enterprise system 3302 to identify one or more hosts of the enterprise system. In some embodiments, the application discovery system 3306 identifies communication tuples associated with the hosts of the enterprise system. The communication may include, for example, a source IP address, a source port number, a destination IP address, and/or a destination port number. The source IP address and the source port number may be associated with a source entity. The destination IP address and the destination port number may be associated with a destination entity. The source entity and the destination entity may be an entity of the enterprise system. Values may be utilized to generate a distribution table to obtain a port signature of a particular host of the enterprise system.

Figure 37A:
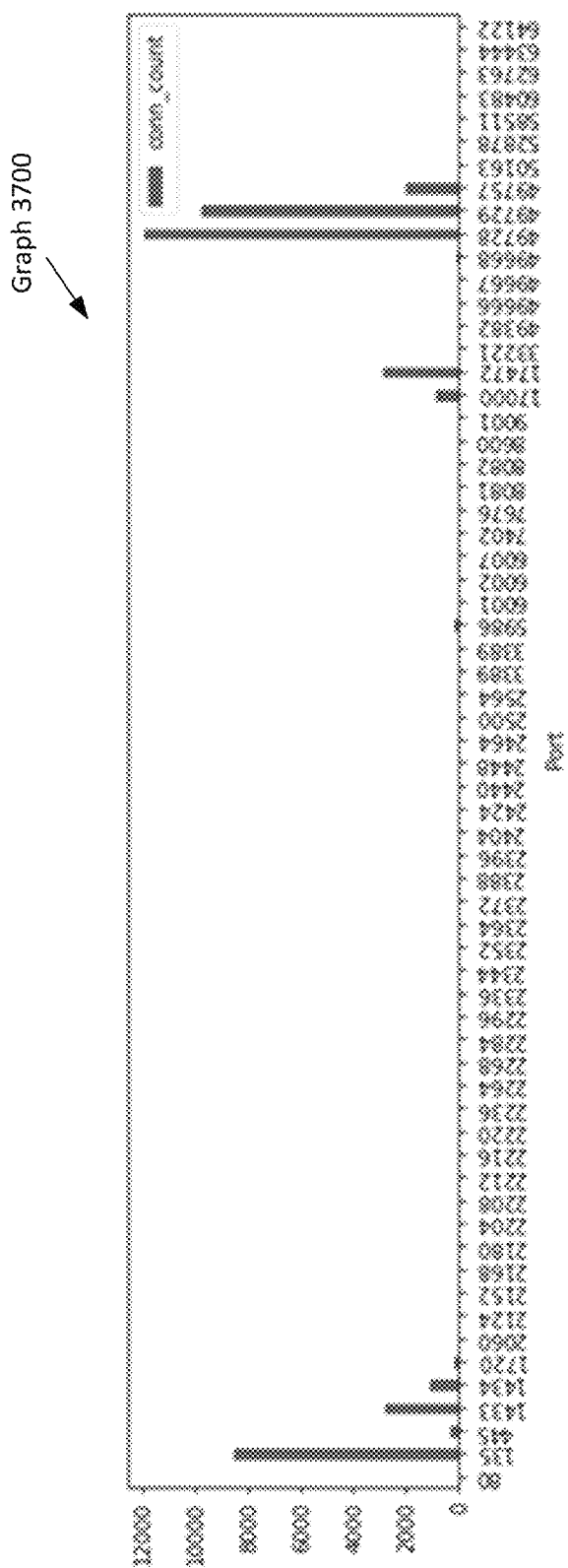
FIG. 37A depicts a graph of a port signature of an example entity of the enterprise network.

The application discovery system 3306 may create a signature port distribution for each of the identified hosts of the enterprise system based on the received data packets and application data. An example of the signature port distribution is depicted within example graph 3700 in FIG. 37A. Graph 3700 depicts the number of connections of each server port of an example host of the enterprise system. It will be appreciated that the signature port distribution may be a table, list, or the like identifying ports and communications (e.g., number of data packets) over a particular time.

The application discovery system 3306 may utilize the port signature of a particular host of the enterprise system to identify one or more enterprise applications being executed by the particular host. The application discovery system 3306 may identify the enterprise application and the one or more ports of the particular host responsible for sending and receiving data associated with the enterprise application. The application discovery system 3306 may use any number of approaches to determine or identify enterprise applications being executed by the hosts of an enterprise system.

In one example, the application discovery system 3306 may apply a cosine similarity of the port signature of a particular host of the enterprise system to identify applications being executed on the particular host. In another example, the application discovery system 3306 applies a Jensen-Shannon divergence to measure the similarity between the signature port distribution of a particular host and the signature port distribution of known enterprise applications. In some embodiments, the application discovery system 3306 may utilize supervised or unsupervised machine learning algorithms to recognize applications and the hosts executing the applications.

In one example, $S_1$ and $S_2$ are two port signatures having non-zero values on sets of ports $\{P_1\}$ and $\{P_2\}$. The discovery module 3406 may define a port set $\{P\}$ on which $S_1$ and $S_2$ are defined such that it includes all ports present in both sets $\{P_1\}$ and $\{P_2\}$ such that:

$\{P\} \supseteq \{P_1\} \cup \{P_2\}$

In this example, port signatures (or modified port signatures) are redefined on $\{P\}$ such that the port set $\{P\}$ does not include zero values that are not present in the original set of ports $\{P_1\}$ and $\{P_2\}$. A cosine measure of similarity may be applied, where the cosine measure of similarity is defined as:

$$\cos(\emptyset) = \frac{S_1 \cdot S_2}{\|S_1\| \cdot \|S_2\|}$$

The application discovery system 3306 may apply the cosine similarity to the port signature of two or more hosts of the enterprise system to group hosts with similar port signatures. Hosts with similar port signatures are more likely to execute the same enterprise application. The application discovery system 3306 may provide a similarity matrix that includes the cosine similarity of multiple hosts.

An example of a similarity matrix may be found in FIG. 39. The similarity matrix 3900 is a result of a cosine measure of similarity applied between a pair of hosts. For example, value 3910 corresponds to the cosine measure of host_1 and host_2. The value 3910 illustrates that the port signatures of host_1 and host_2 are not similar. The diagonal of the similarity matrix 3900 illustrates that each host is identical to itself. The values 3920, 3930, and 3940 show that hosts host_1, host_3, and host_5 have a high value of similarity, as indicated by the high cosine measure. This may signify a possibility that these three hosts are executing the same enterprise applications. Hosts host_2 and host_6 also have a high value of similarity, as seen in a value 3950.

In another example, the application discovery system 3306 may receive and/or retrieve any number of hostnames of compute resources, filter the hostnames to create feature values, determine distances (e.g., using similarity metrics discussed herein, such as the cosign measure) between feature values of the hostnames of compute resources and the hostnames of known hosted applications, and group feature values using the distances to identify one or more applications being executed by compute resources such as hosts of the enterprise system. In various embodiments, the application discovery system 3306 may determine the distances between feature values of two or more hostnames. Hosts with similar hostnames are more likely to execute the same enterprise application.

The communication network 3308 may represent one or more computer networks (e.g., LANs, WANs, and/or the like). The communication network 102 may provide communication between or among an enterprise system (e.g., enterprise systems 3302), application discovery system 3306, and network traffic analyzing software platform 3304. In some implementations, the communication network 3308 comprises computer devices, routers, cables, uses, and/or other network topologies. In some embodiments, the communication network 3308 may be wired and/or wireless. In various embodiments, the communication network 3308 may comprise the Internet, one or more networks that may be public, private, IP-based, non-IP based, and so forth.

The cloud network 3310 may include an infrastructure in which some or all of one or more enterprise's network capabilities and resources are hosted. The cloud network 3310 may be a public or private cloud platform, managed in-house or by a service provider, and available on demand.

While there is only one cloud network 3310 depicted in FIG. 33, it may be appreciated that there may be any number of cloud networks operated by any number of different entities providing services to the enterprises. Further, in some embodiments, the enterprise that owns and/or controls the enterprise system may own or operate the cloud network 3310 or purchase services from the cloud network 3310.

Further, although the cloud network 3310 is depicted in FIG. 33, it may be appreciated that the cloud network 106 is optional (e.g., there may not be a cloud network).

Different enterprises may utilize services within their own enterprise system and/or the cloud network 3310.

Figure 34:
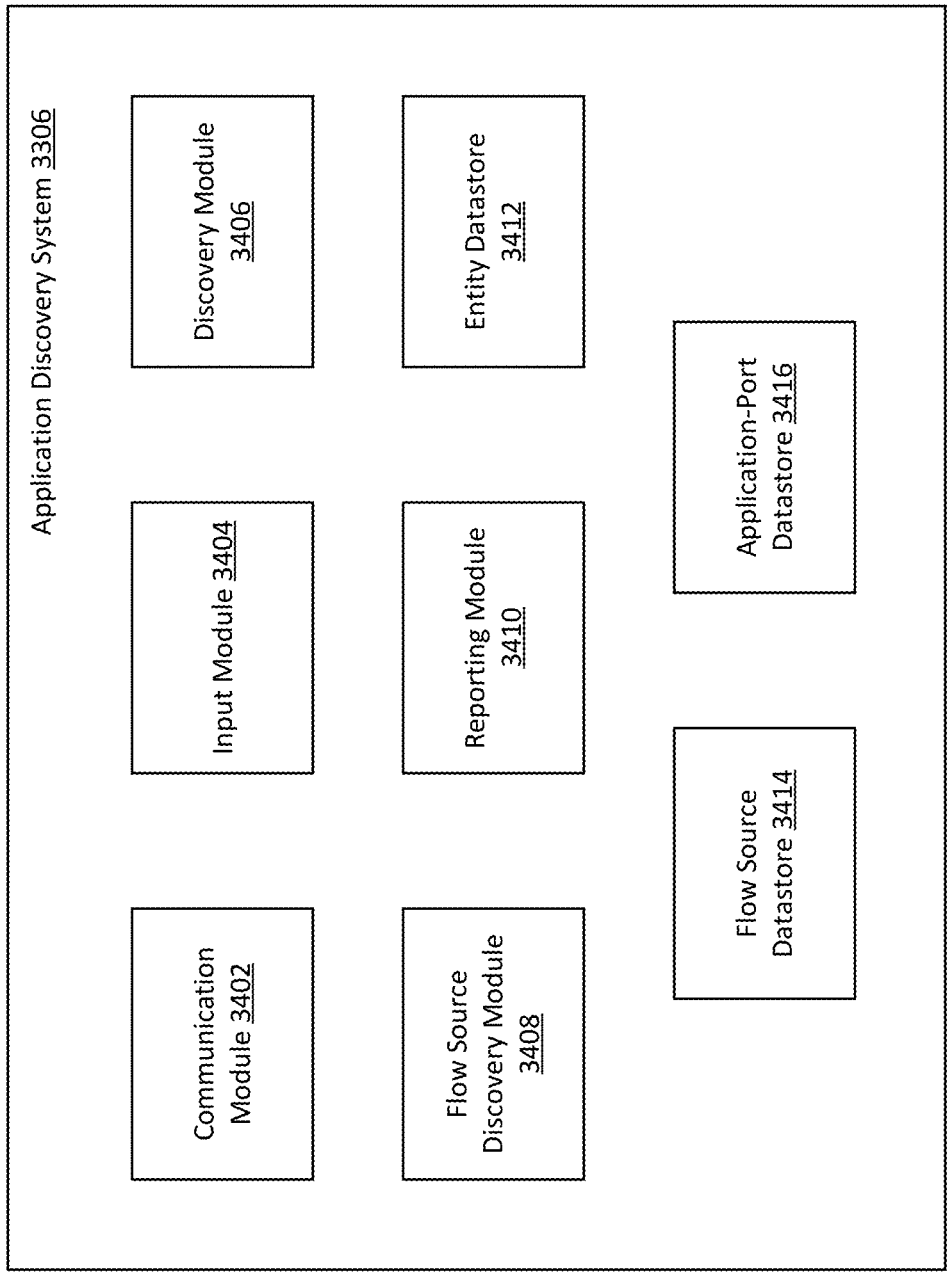
FIG. 34 depicts a block diagram of an example application discovery system of an enterprise system according to some embodiments.

FIG. 34 depicts a block diagram of the application discovery system 3306 of an enterprise system according to some embodiments. The application discovery system 3306 includes a communication module 3402, an input module 3404, a discovery module 3406, a flow source discovery module 3408, a reporting module 3410, an entity datastore 3412, a flow source datastore 3414, and an application-port datastore 3416.

The communication module 3402 may send and receive requests or data between any of the application discovery system 3306, enterprise system 3302, and the network traffic analyzing software platform 3304. The communication module 3402 may receive requests from an IT administrator or another user of the enterprise system 3302 to commence the application discovery process.

The input module 3404 may receive a request from the IT administrator or user of the enterprise system 3302. In some embodiments, the input module 3404 receives a start date and time of the application discovery process. In various embodiments, the input module 3404 may receive information from the IT administrator or authorized device of the enterprise system 3302. The received information may include a list of applications known to the user. The list of applications may include application data. Application data includes attributes of the application such as application identifiers, a tier of service of the application, application metrics, and entities of the enterprise system which make up the application. In some embodiments, application data includes properties of entities that make up the application. For example, a web service application of the enterprise system may utilize port 80 of hosts associated with the web service application.

The tier of service may be used to prioritize one application or group of applications over another. The tier of service may also be used to group similar service levels, which may correspond to critical levels of applications. In one example, the enterprise system may comprise four tiers, with the most important and business-critical tier named "tier 0," followed by, in order of decreasing importance, "tier 1," "tier 2", and "tier 3." The tier of service of an application propagates to the entities associated with the application. When an entity is a member of a tier, it becomes subject to SLA alarms and tiered alarm thresholds associated with the tier. It will be appreciated that the tiers of service may be in any order, and prioritization may change based on the different tier orderings.

The input module 3404 may receive a list including all or some of the entities of the enterprise system 3302, as well as metadata associated with entities of the enterprise system 3302, such as a network tier associated with the entity, name of the entity, or type of entity. In some embodiments, metadata associated with entities of the enterprise system 3302 may be different depending on the type of entity. Entities of enterprise system 3302 represent the physical and virtual entities of the enterprise system and may include applications, compute devices, network elements, and storage elements.

In some embodiments, the input module 3404 receives application data from a subscribed IT management software platform, such as ServiceNow. In various embodiments, the input module 3404 may receive data regarding discovered applications from other IT management software platforms. For example, application discovery system 3306 may take information regarding applications discovered by ServiceNow along with information from SSH or WMI to obtain a more accurate topology of entities involved in applications of the enterprise system 3302. The enterprise may choose to subscribe to software platforms such as ServiceNow and AppDynamics to monitor entities of the enterprise system 3302 known to be associated with business-critical applications.

It will be appreciated that platforms such as ServiceNow and AppDynamics may not be able to discover enterprise applications running on an entity of the enterprise system 3302 which are not monitored by these platforms. Furthermore, ServiceNow, AppDynamics, and the like may not be able to recognize an application being executed by an entity of the enterprise system 3302 if the entity is not being monitored by the platform or if the application is not being monitored by the platform.

The input module 3404 may receive and/or retrieve any number of data packets from the flow collector of the network traffic analyzing software platform 3304 and divert at least a portion of the signals being transmitted from the flow exporter component to the flow collector component.

The discovery module 3406 may utilize the data packets received from the input module 3404 to identify one or more similar hosts of the enterprise system. The discovery module 3406 may use a number of approaches to identify similar hosts. For example, the discovery module 3406 may group similar hosts based on a name of compute resource or host of the enterprise system, data packets or network traffic patterns of the compute resource, and application data received from an IT management software platform such as ServiceNow.

In some embodiments, the discovery module 3406 filters the hostnames, or the name of hosts of the enterprise system, to create feature values, determine distances between feature values of the hostnames of compute resources and the hostnames of known hosted applications, and group feature values using the distances to identify one or more applications being executed by compute resources such as hosts of the enterprise system. In various embodiments, the application discovery system 3306 may determine the distances between feature values of two or more hostnames.

Each enterprise system may have its own naming patterns for entities of the enterprise system, such as hosts. For example, a naming pattern allows an IT person to categorize a compute resource by name and manually group them together based on the enterprise's definition of the application. It will be appreciated that different parts of an enterprise may have different naming conventions. Various embodiments and processes discussed herein may identify compute resources using different names across different parts of the enterprise regardless of whether the naming conventions are consistent.

Figure 37B:
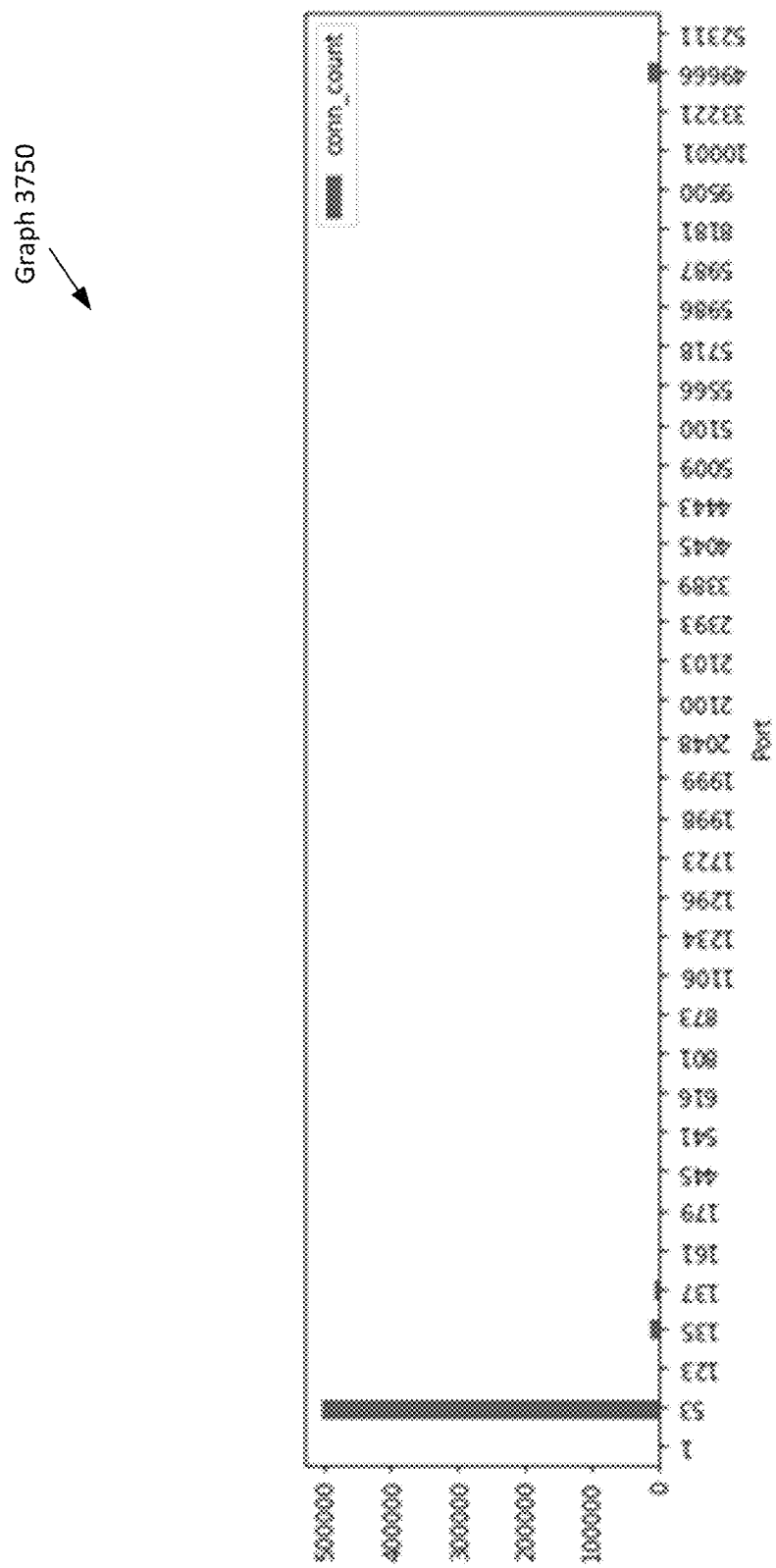
FIG. 37B depicts a graph of a port signature of another example entity of the enterprise network.

In some embodiments, the discovery module 3406 creates a signature port distribution for each of the identified hosts of the enterprise system based on the received data packets and application data. The signature port distribution may provide a graphical representation of the number of connections for each server port associated with the identified host. An example of the signature port distribution is an example graph 3750 in FIG. 37B. In some embodiments, the application discovery system 3306 may provide the signature port distribution using data packets or flow records received from the network traffic analyzing software platform 3304 over a predetermined period of time. In one example, the predetermined period of time is two weeks.

In order to reduce the amount of processing power required to identify similar hosts, the discovery module 3406 may simplify or modify the port signature of the hosts of the enterprise system. In some embodiments, the port signature may be modified by identifying a subset of ports for each of the identified hosts of the enterprise system. Similar hosts may be identified or determined based on the subset of ports. The subset of ports that make up the modified port signature may be determined in a number of ways.

In one example, the subset of ports which make up the simplified or modified port signature includes ports with a number of connections that is greater than a connection threshold. For example, ports with a negligible number of connections may not be included in the subset of ports. The connection threshold may be determined based on many factors, including, for example, a tier of service of the host or port.

Port numbers in the range of 1 to 1023 may be referred to as well-known ports and/or may be registered by the Internet Assigned Numbers Authority (IANA). As such, ports 1 to 1023 may be excluded from the subset of ports that make up the port signatures.

The IANA is responsible for assigning ports to universally agreed-upon conventions or standards, as such may be not useful in identifying applications of the enterprise system which utilize the port. For example, ports 20 and 21, for TCP, are generally used by the File Transfer Protocol (FTP) for data transfer and control, respectively. The Hypertext Transfer Protocol (HTTP) generally uses port 80 in both TCP and UDP. In this example, Ports 20, 21, and 80 may be excluded from the subset of ports as many different applications may utilize these ports.

In various embodiments, the subset of ports excludes dynamic ports (e.g., ports that are used temporarily). For example, the subset of ports may exclude commonly used dynamic ports (e.g., port numbers that range from 49152 to 65535). Ports in this range are not well-known and support commonly used services. It is difficult to identify applications utilizing dynamic ports. As a result, dynamic ports may be removed from the subset of ports as "noise."

It can be appreciated that not all of the criteria listed above may be used to identify the subset of ports that may be used to obtain the modified port signature. Given the discussion regarding common usage (ports 1-1023) and dynamic ports (49152-65535), in some embodiments, the subset of ports includes ports with port numbers between 1024 to 49151 (above the list of well-used and/or registered ports).

Once the signature port distribution has been created, a number of approaches may be used to identify similar hosts. These approaches may be applied to all the ports of the host or to a subset of ports to identify similar hosts. Similar hosts are more likely to execute the same enterprise application.

The discovery module 3406 may apply a cosine similarity to the port signature of a particular host of the enterprise system to identify applications being executed on the particular host. In some embodiments, the discovery module 3406 may apply a cosine similarity to a subset of ports of a particular host to identify applications being executed on the particular host.

In some embodiments, the discovery module 3406 may apply the cosine similarity to the port signature of two or more hosts of the enterprise system to group hosts with similar port signatures to produce a measure of similarity between the hosts. In some embodiments, the discovery module 3406 applies the cosine similar to the modified port signature of two or more hosts of the enterprise system. In some embodiments, a pair of hosts with a measure of similarity greater than a predetermined connection threshold may be grouped together. The predetermined connection threshold may depend on a variety of factors, such as the tier of service of one or more hosts and the number of connections to the port. Hosts with similar port signatures are more likely to execute the same enterprise application.

In some embodiments, the discovery module 3406 applies a Jensen-Shannon divergence to measure the similarity between the signature port distribution of a particular host and the signature port distribution of known enterprise applications. In one example, the discovery module 3406 applies the Jensen-Shannon divergence to measure the similarity between the signature port distribution between two or more hosts of the enterprise system. In various embodiments, the discovery module 3406 utilizes other techniques of measuring distribution similarities, such as the Kullback-Leibler Divergence or Kolmogorov-Smirnov test.

The measure of similarity, which quantitatively measures the "similar-ness" of the pattern of communication (via the number of connections of each port of the host) of one host to another. The measure of similarity may be provided in a user interface in the form of a similarity matrix. In various embodiments, the measure of similarity is based on a distance measurement wherein shorter distances may be considered more similar than longer distances.

Once a subset of similar hosts of the enterprise system has been grouped, a request may be sent to the reporting module 3410 to present or provide the hosts of the subset hosts to the user of the application discovery system 3306. The user may apply labeling to a group of similar hosts. In some embodiments, the discovery module 3406 may identify hosts which belong to a subset based on the modified port signature between two or more hosts of the enterprise system.

The discovery module 3406 may utilize supervised or unsupervised machine learning algorithms to recognize applications and the hosts executing the applications. A training set may be created with labeled port signatures as well as a list of specific ports utilized by known enterprise applications. The training set may be used to create a model that may be applied to other unlabeled ports for the identification and/or classification of applications and/or hosts.

The training set may be used to train machine-learning algorithm(s) (e.g., using a CNN, DNN, random forest, decision trees, and/or the like). The training set may include a modified port signature, or port signature distribution may be inputted into the machine learning algorithm to recognize hosts executing enterprise applications and one or more ports being utilized to execute the enterprise application. Once the machine training algorithm identifies an enterprise application and one or more ports of a host of the enterprise system, the discovery module 3406 may send a request to the application-port datastore 3416 to create and store a port-application entry.

The flow source discovery module 3408 may assess any number of data packets and determine a flow type. In one example, a flow type is a type of packet based on a type of network traffic analyzing software platform. For example, a flow type may be a NetFlow packet, a sFlow data packet, a Jflow data packet, a Cflow data packet, or other types of packet. The NetFlow data packet may be generated by the NetFlow software platform found in Cisco switching hardware. The sFlow data packet may be generated by the software platform found in Juniper switching hardware. The Cflow data packet may be generated by a software platform found in switching hardware manufactured by Alcatel-Lucent.

The flow source discovery module 3408 may identify the type of data packet and parse the flow records from the data packet using a template (e.g., to retrieve needed data from the correct portions of the data packet). The template may be a map indicating how all or some information within a data packet may be formatted. In some embodiments, without a template, information from the data packet may not be retrieved because the information will not be in an understood location within the packet. Similarly, if the template is not correct, information from the data packet may not be retrieved.

The data packet may include any number of flow records, a template record, and a packet header. Any number of flow records may provide information associated with each flow. In various embodiments, the data packet includes one or more template identifiers.

Each of the flow records may be generated by one of any number of flow sources in a data path. The data path may include any number of flow sources. In some embodiments, there may be duplicate flow records. The flow source discovery module 3408 may optionally deduplicate any duplicate flow records, which may misrepresent the actual amount of data traffic that is reported.

A template record may be used to recognize a format of the subsequent flow records that may be received in the current or future data packets. For example, there may be different formats (e.g., therefore, different template records to recognize the different formats) for sFlow data packets, Jflow data packets, and Cflow data packets. In various embodiments, different versions of the same type of data packet may have different templates. For example, there are multiple versions of Cisco's NetFlow software platform, and each version may have a different template record because data from different versions of the platform may have different formats. In some embodiments, the flow source discovery module 3408 may need to match the template record of an incoming data packet with a template record stored in the flow source discovery module 3408 before the incoming data packet can be parsed. In some embodiments, the flow source discovery process may reject a data packet if the data packet does not include a template record that the flow source discovery module 3408 recognizes. A template record is data including or identifying a template.

A packet header may include information regarding the packet, such as the version of the network traffic analyzing software platform associated with the data packet, the number of flow records contained within the data packet, and a sequence number. The sequence number may aid in detecting lost data packets.

A template identifier (ID) may distinguish one template record from other template records produced by the same export device. A flow collector may receive export packets from different switching hardware devices, and the uniqueness of template records may not be guaranteed across different switching hardware devices. In some embodiments, the flow collect may store the IP address of the switching hardware device that produced the template ID in order to assist in the enforcement of uniqueness.

In order to parse the data packet to obtain any number of flow records, flow source discovery module 3408 may match a template record to a format of a data packet in order to parse the received data packet. In some embodiments, the flow source discovery module 3408 scans a header of the data packet to identify a template. The flow source discovery module 3408 may retrieve data from a data packet based on a template and then determine if the retrieved data includes expected information. Once the correct template is identified, the template may be used to assist in parsing information from the data packet.

The result of the parsing of the data packet may be a flow record representing communication between two entities of the enterprise system 3302. The flow source discovery module 3408 may validate the flow record and discover and/or identify a flow source of the enterprise system 3302, along with attributes (e.g., metrics) associated with the discovered flow source. Once a flow source has been identified, the flow source discovery module 3408 may send a request for a flow source entry in the entity datastore 3412 to store attributes associated with the discovered flow source. The attributes associated with the discovered flow source may include the type of flow source, total byte count, incoming/outgoing byte count, incoming/outgoing bit rate, total packet rate, and/or incoming/outgoing endpoint count. In some embodiments, all or some attributes may be found in the flow record. In various embodiments, the flow source discovery system 170 may assess flow records to identify performance attributes based on data from an identified flow source in order to generate attributes/metrics regarding the flow source (e.g., generate the attributes/metrics in real-time for current performance and/or generate aggregations of attributes/metrics to show performance over time).

The flow source discovery system may provide the discovered flow sources and attributes/metrics associated with the discovered flow sources in the form of a table or a chart. In some embodiments, the flow source discovery system may provide attributes/metrics of the discovered flow sources or data traffic metrics in a meaningful way and output graphs organizing top IP address by total bit rate, top conversations as seen by the network traffic analyzing software platform 3304 (e.g., NetFlow), and/or the like.

The reporting module 3410 may receive a request to provide a report or an example output of the port signature of one or more hosts in a variety of formats. For example, the port signature may be provided or displayed in the form of a graph, such as graph 3750 of FIG. 37B to a graphics display of a computer system available to the IT administrator or authorized user of the enterprise system. In some embodiments, the reporting module 3410 provides port signature or port distribution in the form of a chart or table, such as the port frequency distribution table 3100 of FIG. 31. The reporting module 3410 may provide the port signature, such as the graph 3750 of FIG. 37B, of a host to a user of the enterprise system 3302. Graph 3750 indicates the ports of the host on the x-axis and the number of connections associated with the host, as monitored by the software platform 3304 over the predetermined period of time. Graph 3750 indicates that connections of this particular host are predominantly on port 53, with a smaller number of connections on ports 135, 137, and 49666 and a negligible number of connections on the other ports that are provided in the graph.

The entity datastore 3412 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). In some embodiments, the entity datastore 3412 is configured to receive the attributes or properties of entities of the enterprise system 3302. Attributes and/or metrics associated with entities of the enterprise system may be received from the software platform 3304, determined by the discovery module 3406 or the flow source discovery module 3408. In some embodiments, the entity datastore 3412 may store a list containing entities of the switch fabric that the IT administrator wants to continue monitoring. In various embodiments, attributes and/or metrics are associated with entities such as hosts of the enterprise system.

The flow source datastore 3414 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). In some embodiments, the flow source datastore 3414 is configured to receive data packets from the network traffic analyzing software platform 3304.

The application-port datastore 3416 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). In some embodiments, the application-port datastore 3416 is configured to receive a request to create a port-application entry from the discovery module 3406. The port-application entry maps one or more ports of a host of the enterprise system to an enterprise application of the enterprise system. In various embodiments, one or more ports of the host may be mapped to more than one enterprise application.

Figure 35:
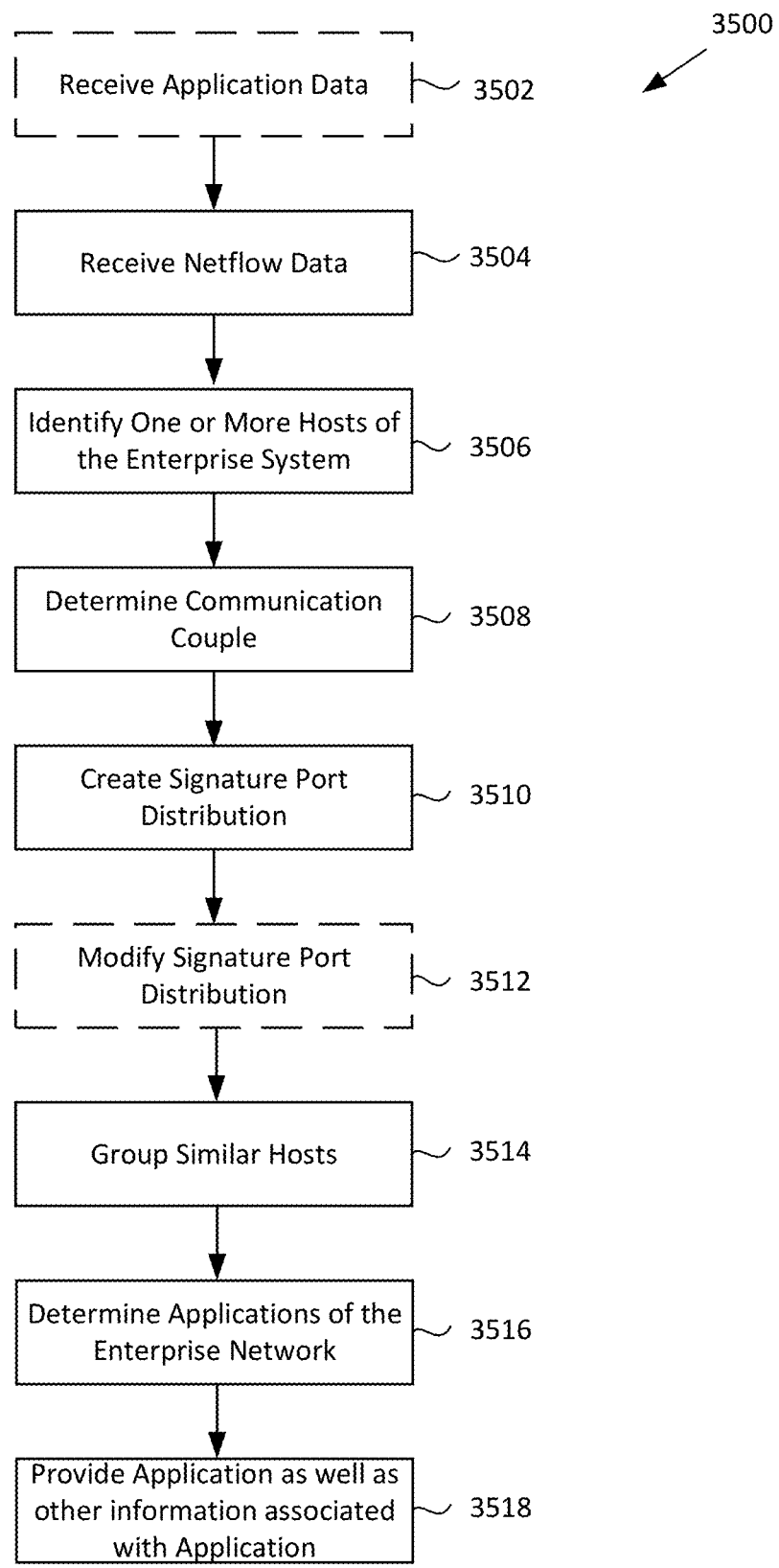
FIG. 35 depicts an example application discovery method according to some embodiments.

FIG. 35 depicts an example application discovery method 3500 according to some embodiments. In optional step 3502, the input module 3404 receives a list of applications from the IT administrator or user of the enterprise system 3302. The list of applications may include application data. Application data includes attributes of the application such as application identifiers, a tier of service of the application, application metrics, and entities of the enterprise system which make up the application. In some embodiments, application data includes properties of entities that make up the application, such as the names of entities.

In step 3504, the flow source discovery module 3408 may receive data packets from the input module 3404 or the network traffic analyzing software platform 3304. In some embodiments, data packets may be stored in the flow source datastore 3414.

The flow source discovery module 3408 may utilize the data packets received from the input module 3404 to identify one or more similar hosts of the enterprise system. In response to identifying one or more flow sources or entities of the enterprise system, the flow source discovery module 3408 may send a request to the entity datastore 3412 to create or store an entity entry. The entity entry may include attributes associated with the discovered flow source In step 3506, the discovery module 3406 identifies one or more hosts of the enterprise system based on the network traffic data received from the network traffic analyzing software platform 3304. In some embodiments, the discovery module 3406 identifies hosts of the enterprise system based on application data received in step 3502. In response to identifying one or more flow sources or entities of the enterprise system, the flow source discovery module 3408 may send a request to the entity datastore 3412 to create or store an entity entry. The entity entry may include attributes associated with the discovered host.

In step 3508, the discovery module 3406 may determine, for data packets associated with identified hosts of the enterprise system, a list of communication attributes (e.g., a communication tuple). The list of communication attributes (e.g., communication tuple) may include, for example, a source IP address, a source port number, a destination IP address, and/or a destination port number. The source IP address and the source port number may be associated with a source entity. The destination IP address and the destination port number may be associated with a destination entity. The source entity and the destination entity may be an entity of the enterprise system. Values may be utilized in the generation of the port frequency distribution table, such as the port frequency distribution table 3100 of FIG. 31.

The discovery module 3406 may designate source port(s) and/or destination port(s). For example, one of the ports may be designated as a server port, and another may be designated as a client port. The designation of the server port and the client port may be accomplished using a heuristic algorithm. For example, the algorithm may include: 1) for a communication tuple (source IP address, source port, destination IP address, destination port), the port with a higher port access frequency may be designated the server port; 2) if the source port and the destination port has the same access frequency, then the port that is registered with an organization such as IANA may be designated as the server port; and, optionally, 3) if neither the source port and the destination port have the same access frequency and if neither the source port and the destination port are registered, then the port with the lowest port number may be designated as the server port.

Communication tuples in which a particular host is identified as the server port may be utilized as connections used to create a signature port distribution associated with the particular host in step 3510. The signature port distribution may provide a graphical representation of the number of connections for each server port associated with the identified host. An example of a signature port distribution is graph 3700 of FIG. 37A. The bars of graph 3700 shows the number of connections and indicate that a large number of connections occurred on ports 135, 445, 1443, 1434, 1700, 17472, 49728, 49729, and 49757.

In optional step 3512, the discovery module 3406 simplifies or modifies the port signature. More details regarding the steps to obtain a modified port signature will be discussed in FIG. 36.

Once the signature port distribution has been created, a number of approaches may be used to identify similar hosts. These approaches (examples discussed herein) may be applied to all the ports of the host or to a subset of ports to identify similar hosts.

In step 3514, the discovery module 3406 may apply the cosine similarity to the port signature of two or more hosts of the enterprise system to group hosts with similar port signatures to produce a measure of similarity between the hosts. In some embodiments, the discovery module 3406 applies the cosine similar to the modified port signature of two or more hosts of the enterprise system. In some embodiments, a pair of hosts with a measure of similarity greater than a predetermined connection threshold may be grouped into a subset of hosts. The predetermined connection threshold may depend on a variety of factors, such as a tier of service of one or more hosts and the number of connections from the port. Hosts with similar port signatures are more likely to execute the same enterprise application.

In some embodiments, the discovery module 3406 applies a Jensen-Shannon divergence to measure the similarity between the signature port distribution of a particular host and the signature port distribution of known enterprise applications. In various embodiments, the discovery module 3406 utilizes other techniques of measuring distribution similarities, such as the Kullback-Leibler Divergence or Kolmogorov-Smirnov test.

The measure of similarity, which quantitatively measures the "similar-ness" of the pattern of communication (via the number of connections of each port of the host) of one host to another host, may be provided in a user interface in the form of a similarity matrix.

In some embodiments, the application discovery system 3306 may apply the cosine similarity to the port signature of two or more hosts of the enterprise system to group hosts with similar port signatures. Hosts with similar port signatures are more likely to execute the same enterprise application. The application discovery system 3306 may provide a similarity matrix. The similarity matrix may include the cosine similarity of multiple hosts. An example of a similarity matrix may be found in FIG. 39. A similarity matrix 3900 applies a cosine measure of similarity between a pair of hosts. For example, a value 3910 corresponds to the cosine measure of host_1 and host_2. The value 3910 illustrates that the port signatures of host_1 and host_2 are not similar. The diagonal of the similarity matrix 3900 illustrates that each host is identical to itself. The values 3920, 3930, and 3940 show that hosts host_1, host_3, and host_5 have a high value of similarity, as indicated by the high cosine measure. This may signify a possibility that these three hosts are executing the same enterprise applications. Hosts host_2 and host_6 also have a high value of similarity, as seen in a value 3950.

Step 3516 may utilize supervised or unsupervised machine learning algorithms to recognize applications and the hosts executing the applications. As discussed herein, a training set may be created with labeled port signatures as well as a list of specific ports utilized by known enterprise applications. The training set may be used to create a model that may be applied to other unlabeled ports for the identification and/or classification of applications and/or hosts.

In optional step 3518, the reporting module 3410 may provide or display recognized or identified applications and entities of the enterprise system. In some embodiments, the reporting module 3410 may provide or display ports of the entities which make up each recognized or identified application. An example of the identified port-application entries may be provided to a user interface. An example of a port-application interface 4000 of FIG. 40. In some embodiments, the reporting module 3410 may provide or display other information, such as application identifiers, a tier of service identifiers of one or more applications, application metrics, and/or application polling interval(s). In various embodiments, the reporting module 3410 may provide or display the similarity matrix. An example of a similarity matrix can be found in FIG. 39.

Figure 36:
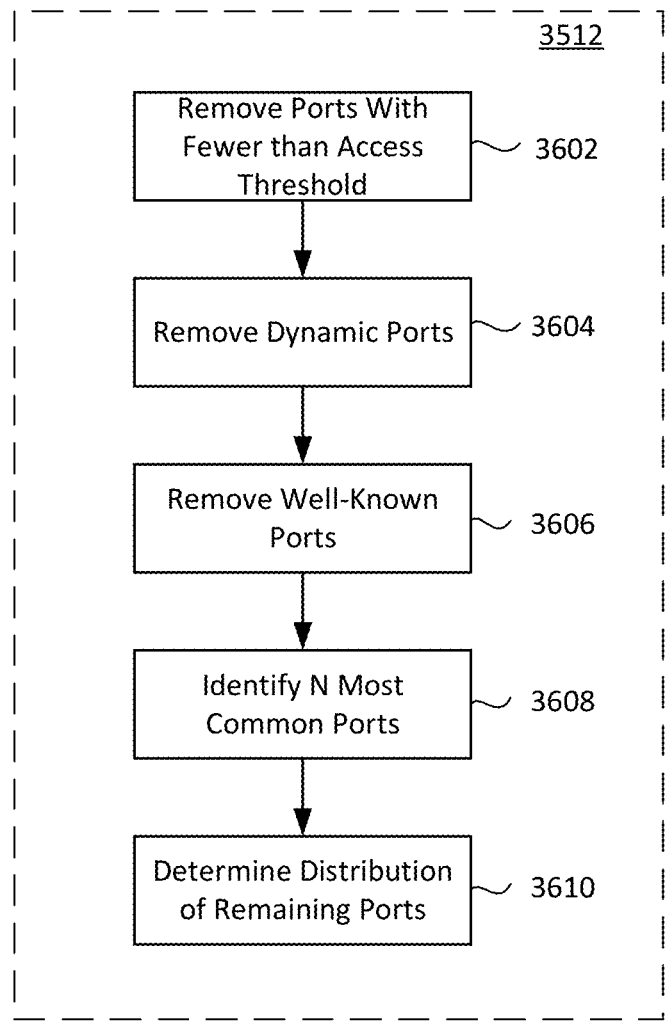
FIG. 36 depicts in further detail one step of the application discovery method of FIG. 35.

FIG. 36 depicts a simplification of a method to obtain a modified port signature. In some embodiments, the modified port signature includes a subset of ports. In step 3602, the discovery module 3406 may choose the subset of ports to include ports with a number of connections that is greater than a connection threshold. The connection threshold may be determined based on many factors, including the tier of service of the host or port. For example, a port associated with a tier 0 or mission-critical application may have a lower predetermined connection threshold than another port associated with a tier 4 application. In some embodiments, the predetermined connection threshold may depend on whether or not the port is registered. For example, a port registered with IANA may have a lower predetermined access threshold than another port that is not registered with IANA.

In step 3604, the discovery module 3406 may choose the subset of ports to include any number of ports or a subset of ports. The discovery module 3406 may, for example, choose any number of ports and then exclude any number of the chosen ports in step 3606. Alternately, the discovery module 3406 may choose ports in a desired range and make exclusions or not make exclusions. For example, the discovery module 3406 may choose ports that have a port number in the range of 1024 to 49151. The discovery module 3406 may not choose well-used ports (e.g., ports 1-1023) or dynamic ports from the subset of ports. Dynamic ports, for example, may have port numbers that range from 49152 to 65535. Dynamic ports are typically assigned to a client port end of a network connection. Ports in range of 1024-49151 may not be: 1) well-known and support commonly used services; 2) reserved or registered ports assigned to specific services by IANA and are not assigned or reserved; and 3) less apt to be dynamic ports.

In step 3606, the discovery module 3406 may exclude ports from the chosen list of ports. As discussed herein, the discovery module 3406 may exclude well-known (or well-used ports) such as ports that are registered by the IANA (e.g., the discovery module 3406 may exclude port numbers in the range of 1 to 1023. These universally agreed-upon conventions may not be helpful in aiding the identification of applications which utilize these ports if many different applications of the enterprise system utilize the same port numbers for similar purposes. Similarly, the discovery module 3406 may exclude ports associated with commonly used dynamic ports.

In step 3608, the discovery module 3406 may choose the subset of ports to include the N most connected ports where N is 4, 8, 16, or some other integer. By reducing the number of ports in the subset of ports in the modified port signature, the amount of processing power required to identify similar hosts may be reduced. In some embodiments, N is a specific number of ports, e.g., a threshold of ports, or a percentage of used ports, e.g., the top 3% of the most connected ports.

Figure 38A:
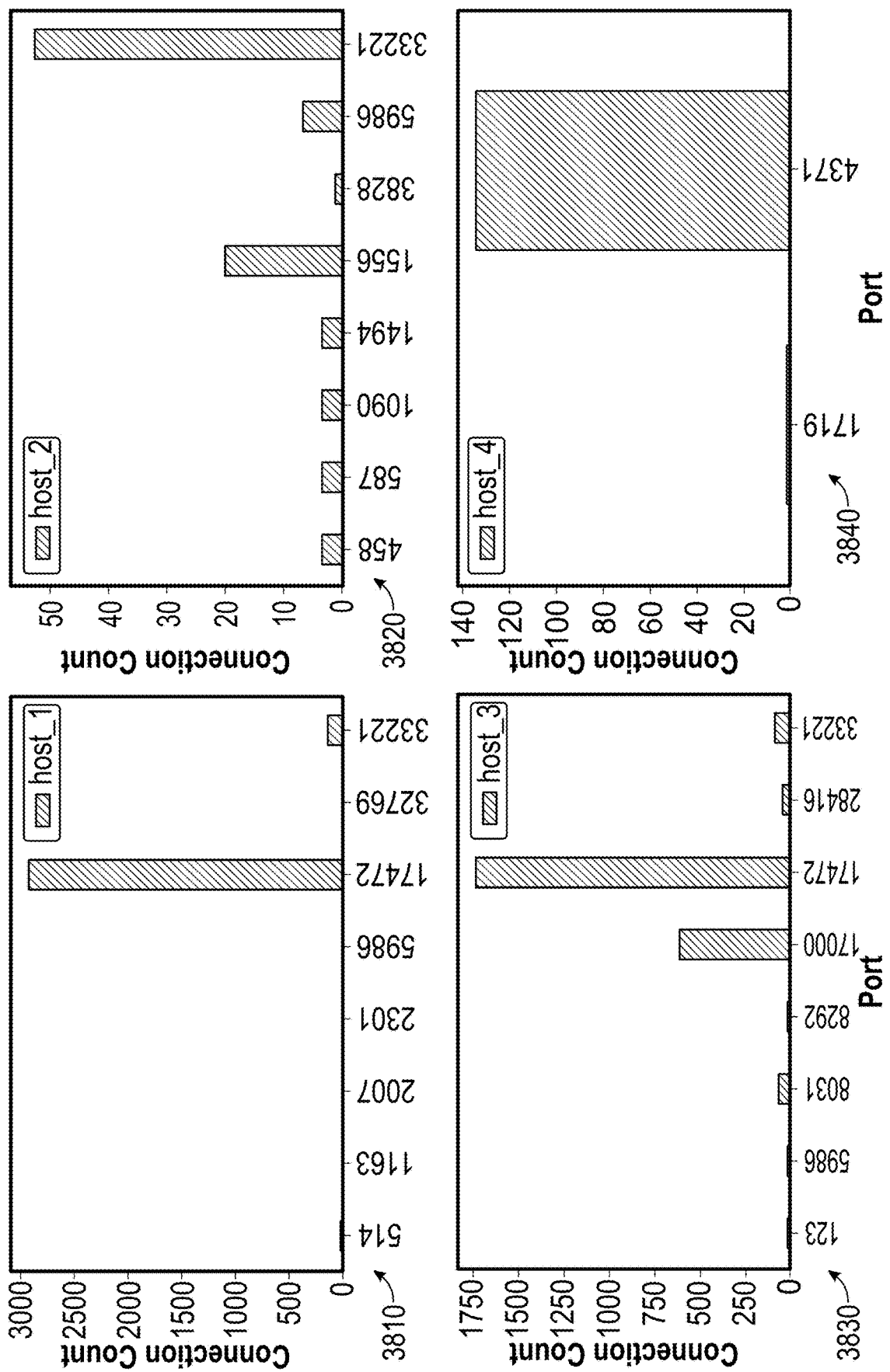
FIG. 38A depicts graphs of modified port signatures according to some embodiments.
Figure 38B:
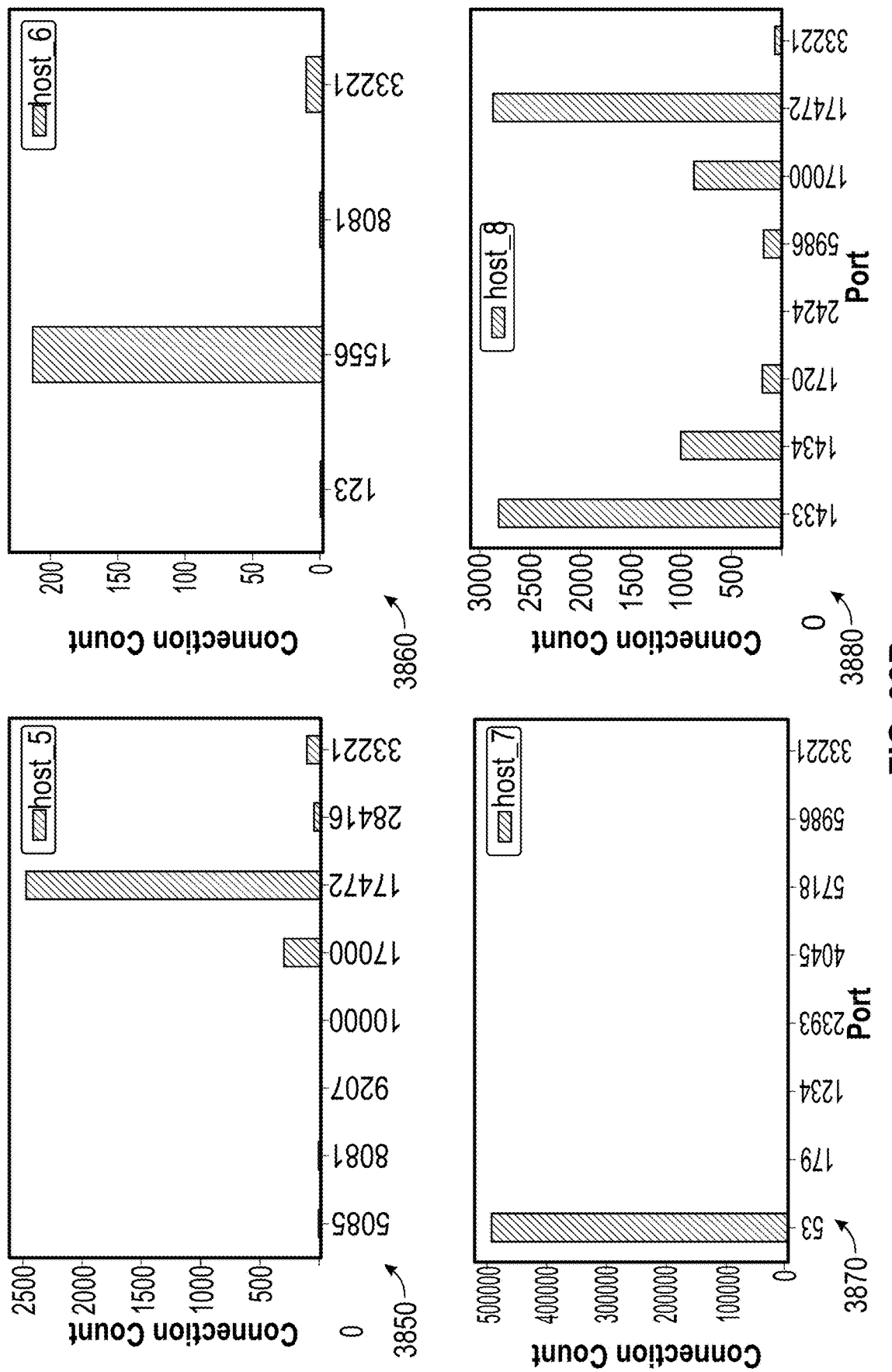
FIG. 38B depicts graphs of modified port signatures according to some embodiments.

In step 3610, one or more of steps 3602 through 3608 may be applied to one or more of the hosts of the enterprise system to obtain a subset of ports. Graphs 3810, 3820, 3830, and 3840 of FIG. 38A depict a modified port signature of host host_1, host_2, host_3, and host_4 respectively. Similarly, graphs 3850, 3860, 3870, and 3880 of FIG. 38B depict a modified port signature of host host_5, host_6, host_7, and host_8 respectively. As a comparison, the port signature of host_7 is depicted by graph 3750 of FIG. 37B, while the port signature of host_8 is depicted by graph 3700 of FIG. 37A.

It can be appreciated that one or more of the steps of 3512, as depicted in FIG. 36, may be omitted. It can also be appreciated that the order of the steps is in FIG. 36 may be changed without affecting the resultant modified port signature.

In this description, the term "module" refers to computational logic for providing the specified functionality. A module can be implemented in hardware, firmware, and/or software. Where the modules described herein are implemented as software, the module can be implemented as a standalone program but can also be implemented through other means, for example, as part of a larger program, as any number of separate programs, or as one or more statically or dynamically linked libraries. It will be understood that the named modules described herein represent one embodiment, and other embodiments may include other modules. In addition, other embodiments may lack the modules described herein and/or distribute the described functionality among the modules in a different manner. Additionally, the functionalities attributed to more than one module can be incorporated into a single module. In an embodiment where the modules as implemented by software, they are stored on a computer-readable persistent storage device (e.g., hard disk), loaded into the memory, and executed by one or more processors as described above in connection with FIG. 28. Alternatively, hardware or software modules may be stored elsewhere within a computing system.

As referenced herein, a computer or computing system includes hardware elements used for the operations described here regardless of specific reference in FIG. 28 to such elements, including, for example, one or more processors, high-speed memory, hard disk storage, and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
   at least one processor; and
   memory including executable instructions that are executable by the at least one processor to:
   identify a plurality of compute resources of an enterprise network, each of the plurality of compute resources including a plurality of ports associated with each compute resource, each of the plurality of ports being in communication with entities within the enterprise network and outside the enterprise network;
   for each of the identified plurality of compute resources:
      identify a subset of ports of the plurality of ports associated with a particular compute resource, the subset of ports being identified based on a number of connections of each port of the subset of ports and a port number of each port of the subset of ports, and the ports of the subset of ports being an N most frequently used ports of a particular compute resource of the plurality of compute resources;
      determine a port signature associated with the particular compute resource based on the identified subset of ports; and
      determine one or more applications of the enterprise network being executed by the particular compute resource based on the port signature associated with the particular compute resource; and
   provide a report of the one or more applications of the enterprise network.

2. The system of claim 1, the executable instructions that are executable by the at least one processor to further: receive network traffic data to identify at least some of the plurality of compute resources of the enterprise network, the network traffic data identifying communication between entities of the enterprise network.

3. The system of claim 2, wherein the network traffic data is received from a network traffic monitoring platform, the network traffic monitoring platform being in communication with the enterprise network.

4. The system of claim 1, wherein the one or more applications of the enterprise network is determined by comparing the port signature associated with the particular compute resource with port signatures of known applications.

5. The system of claim 1, wherein the number of connections of each port of the subset of ports is greater than a predetermined connection threshold.

6. The system of claim 1, wherein each port of the subset of ports has a port number in a range 1 to 49151.

7. The system of claim 1, wherein the one or more applications of the enterprise network is determined using a cosine similarity.

8. The system of claim 7, wherein the cosine similarity is applied to the port signature of two of the plurality of compute resources of the enterprise network to group similar compute resources based on distance.

9. The system of claim 8, wherein similar compute resources are determined using a similarity matrix that indicates, for each host, a result of the cosine similarity with another host.

10. The system of claim 1, wherein the one or more applications of the enterprise network is determined by comparing the port signature associated with the particular compute resource with port signatures of known applications.

11. A non-transitory computer readable medium including instructions, the instructions being executable by a processor to perform a method, the method comprising:
   identifying a plurality of compute resources of an enterprise network, each of the plurality of compute resources including a plurality of ports associated with each compute resource, each of the plurality of ports being in communication with entities within the enterprise network and outside the enterprise network;
   for each of the identified plurality of compute resources:
      identifying a subset of ports of the plurality of ports associated with a particular compute resource, the subset of ports being identified based on a number of connections of each port of the subset of ports and a port number of each port of the subset of ports, and the ports of the subset of ports being an N most frequently used ports of a particular compute resource of the plurality of compute resources;
      determining a port signature associated with the particular compute resource based on the identified subset of ports; and
      determining one or more applications of the enterprise network being executed by the particular compute resource based on the port signature associated with the particular compute resource; and
   providing a report of the one or more applications of the enterprise network.

12. The non-transitory computer readable medium of claim 11, the executable instructions that are executable by the processor to further: receiving network traffic data to identify at least some of the plurality of compute resources of the enterprise network, the network traffic data identifying communication between entities of the enterprise network.

13. The non-transitory computer readable medium of claim 12, wherein the network traffic data is received from a network traffic monitoring platform, the network traffic monitoring platform being in communication with the enterprise network.

14. The non-transitory computer readable medium of claim 11, wherein the one or more applications of the enterprise network is determined by comparing the port signature associated with the particular compute resource with port signatures of known applications.

15. The non-transitory computer readable medium of claim 11, wherein the number of connections of each port of the subset of ports is greater than a predetermined connection threshold.

16. The non-transitory computer readable medium of claim 11, wherein each port of the subset of ports has a port number in a range 1 to 49151.

17. The non-transitory computer readable medium of claim 11, wherein the one or more applications of the enterprise network is determined using a cosine similarity to two of the plurality of compute resources of the enterprise network to group similar compute resources based on distance.

18. The non-transitory computer readable medium of claim 17, wherein similar compute resources are determined using a similarity matrix that indicates, for each host, a result of the cosine similarity with another host.

19. The non-transitory computer readable medium of claim 11, wherein the one or more applications of the enterprise network is determined by comparing the port signature associated with the particular compute resource with port signatures of known applications.

20. A method comprising:
identifying a plurality of compute resources of an enterprise network, each of the plurality of compute resources including a plurality of ports associated with each compute resource, each of the plurality of ports being in communication with entities within the enterprise network and outside the enterprise network;
for each of the identified plurality of compute resources:
identifying a subset of ports of the plurality of ports associated with a particular compute resource, the subset of ports being identified based on a number of connections of each port of the subset of ports and a port number of each port of the subset of ports, and the ports of the subset of ports being an N most frequently used ports of a particular compute resource of the plurality of compute resources;
determining a port signature associated with the particular compute resource based on the identified subset of ports; and
determining one or more applications of the enterprise network being executed by the particular compute resource based on the port signature associated with the particular compute resource; and
providing a report of the one or more applications of the enterprise network.

* * * * *